United States Patent
Hokkyo et al.

(10) Patent No.: US 6,387,483 B1
(45) Date of Patent: May 14, 2002

(54) PERPENDICULAR MAGNETIC RECORDING MEDIUM AND MANUFACTURING PROCESS THEREFOR

(75) Inventors: Hirotaka Hokkyo; Shinzo Tsuboi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/172,911

(22) Filed: Oct. 15, 1998

(30) Foreign Application Priority Data

| Dec. 18, 1997 | (JP) | 9-349810 |
| Jan. 9, 1998 | (JP) | 10-003309 |
| Jan. 9, 1998 | (JP) | 10-003310 |

(51) Int. Cl.$^7$ ................................................. G11B 5/66
(52) U.S. Cl. .................... 428/332; 428/336; 428/694 T; 428/394 TS; 428/694 TR; 428/694 SG; 428/900; 427/128; 427/129; 427/130; 427/131
(58) Field of Search ....................... 428/694 T, 694 TS, 428/694 TR, 694 SG, 900, 332, 336; 427/128–131

(56) References Cited

U.S. PATENT DOCUMENTS

| 5,543,221 A | * | 8/1996 | Kitakami | 428/332 |
| 5,815,342 A | * | 9/1998 | Akiyama | 380/97.01 |
| 5,863,631 A | * | 1/1999 | Sonobe | 428/65.3 |
| 5,942,342 A | * | 8/1999 | Hikosaka | 423/694 R |
| 6,083,599 A | * | 7/2000 | Hirayama | 428/65.3 |

FOREIGN PATENT DOCUMENTS

| JP | 57-36435 | 2/1982 |
| JP | 57-55531 | 4/1982 |
| JP | 59-75429 | 4/1984 |
| JP | 61-77125 | 4/1986 |
| JP | 62-145530 | 6/1987 |
| JP | 63-317922 | 12/1988 |
| JP | 1-287818 | 11/1989 |
| JP | 4-269814 | 9/1992 |
| JP | 97150 | 1/1997 |
| JP | 11-185237 | 7/1999 |

OTHER PUBLICATIONS

Hokkyo et al, Media Noise Characteristics of CoCrTa/FeSiAl Perpendiculer Magnetic Recording Media, Journal of the Magnetics Society of Japan, vol. 21; Supplement, No. S2, pp 517–520, 1997.* by Hirotaka Hokkyo et al., "Media Nosie Characteristics of CoCrTa/FeSiAl Perpedicular Magnetic Recording Media", *Journal of The Magnetics Society of Japan*, vol. 21, Supplement, No. S2, 1997, pp. 517–520.

* cited by examiner

Primary Examiner—Leszek Kiliman
(74) Attorney, Agent, or Firm—Young & Thompson

(57) ABSTRACT

It is intended to reduce the media noise, and to improve the recording density dependence of read output voltage. The present invention provides a perpendicular magnetic recording media and its manufacturing process, wherein a perpendicular magnetic recording medium comprises a soft magnetic underlayer film and a perpendicular magnetizing film, these films being formed on a substrate in this order, a smoothness control film such as Cr film, being inserted between the substrate and the soft magnetic underlayer film. Therefore, perpendicular orientation and surface smoothness are improved for the perpendicular magnetizing film laminated on the smooth surface of the soft magnetic underlayer film. As the perpendicular orientation is improved for the perpendicular magnetizing film, the initial layer is reduced, thereby media noise being lowered and recording density dependence of read output voltage being improved. In addition, as the surface smoothness is improved for the perpendicular magnetizing film, sliding characteristics of a recording/reproducing head is also improved, thereby this also lowering the media noise.

80 Claims, 89 Drawing Sheets

| | Cr | FeSiAl with Cr | FeSiAl without Cr |
|---|---|---|---|
| Average roughness on centerline Ra [nm] | 0.48 | 0.49 | 0.88 |

| $Co_{78}Cr_{19}Ta_3$ film thickness [nm] | 20 | 50 | 75 | 100 | 150 |
|---|---|---|---|---|---|
| Coercivity [kOe] | 0.25 | 2.7 | 2.8 | 2.8 | 2.4 |

FIG. 16

| | Surface roughness of C film Ra [nm] | Surface roughness of FeSiAl film Ra [nm] | Surface roughness of CoCrTa film Ra [nm] | $\Delta\theta_{50}$ of CoCrTa film (degree) |
|---|---|---|---|---|
| Inventive medium A1 (C film thickness 10 nm) | 0.471 | 0.902 | 1.14 | 4.2 |
| Comparative medium A2 (C film thickness 20 nm) | 0.861 | 1.23 | 1.54 | 7.1 |

FIG.20

| C film thickness [nm] | 1 | 2 | 5 | 9 | 10 | 13 | 15 | 17 | 20 |
|---|---|---|---|---|---|---|---|---|---|
| Ra of C film [nm] | 2.12 | 0.425 | 0.398 | 0.452 | 0.471 | 0.405 | 0.417 | 0.723 | 0.861 |
| Media noise [μ Vrms] | 20.7 | 10.1 | 10.5 | 10.6 | 9.9 | 10.2 | 9.2 | 15.9 | 18.3 |

FIG.22

| | Surface roughness of Ti film Ra [nm] | Surface roughness of FeSiAl film Ra [nm] | Surface roughness of CoCrTa film Ra [nm] | $\Delta\theta_{50}$ of CoCrTa film (degree) |
|---|---|---|---|---|
| Inventive medium B1 (Ti film thickness 10 nm) | 0.490 | 0.901 | 1.09 | 4.6 |
| Comparative medium B2 (Ti film thickness 20 nm) | 0.858 | 1.31 | 1.48 | 7.5 |

FIG. 26

| Ti film thickness [nm] | 1 | 2 | 5 | 9 | 10 | 13 | 15 | 17 | 20 |
|---|---|---|---|---|---|---|---|---|---|
| Ra of Ti film [nm] | 2.30 | 0.469 | 0.482 | 0.453 | 0.490 | 0.442 | 0.416 | 0.719 | 0.858 |
| Media noise [μVrms] | 20.2 | 10.5 | 10.5 | 9.5 | 9.8 | 10.4 | 9.7 | 14.7 | 18.8 |

FIG. 28

| | Surface roughness of $Cr_{50}Ti_{40}C_{10}$ film Ra [nm] | Surface roughness of FeSiAl film Ra [nm] | Surface roughness of CoCrTa film Ra [nm] | $\Delta\theta_{50}$ of CoCrTa film [degree] |
|---|---|---|---|---|
| Inventive medium C1 (CrTiC film thickness 10 nm) | 0.441 | 0.904 | 1.09 | 4.2 |
| Comparative medium C2 (CrTiC film thickness 20 nm) | 0.871 | 1.31 | 1.62 | 7.0 |

FIG.32

| $Cr_{50}Ti_{40}C_{10}$ film thickness [nm] | 1 | 2 | 5 | 9 | 10 | 13 | 15 | 17 | 20 |
|---|---|---|---|---|---|---|---|---|---|
| Ra of $Cr_{50}Ti_{40}C_{10}$ film [nm] | 3.06 | 0.403 | 0.422 | 0.416 | 0.441 | 0.415 | 0.416 | 0.692 | 0.871 |
| Media noise [μVrms] | 19.7 | 10.2 | 10.3 | 10.2 | 10.9 | 9.4 | 9.7 | 14.7 | 20.2 |

FIG. 34

| | Surface roughness of $Cr_{80}Ti_{20}$ film Ra [nm] | Surface roughness of FeSiAl film Ra [nm] | Surface roughness of CoCrTa film Ra [nm] | $\Delta\theta_{50}$ of CoCrTa film (degree) |
|---|---|---|---|---|
| Inventive medium D1 (Film formation speed 13nm/s) | 0.475 | 0.479 | 0.792 | 4.1 |
| Comparative medium D2 (Film formation speed 25nm/s) | 6.987 | 7.121 | 7.529 | 10.2 |

FIG.38

| Cr₈₀Ti₂₀ film thickness [nm] | 0.1 | 1 | 3 | 6 | 13 | 18 | 20 | 22 | 25 |
|---|---|---|---|---|---|---|---|---|---|
| Ra of Cr₈₀Ti₂₀ film [nm] | 0.423 | 0.426 | 0.423 | 0.434 | 0.475 | 0.469 | 4.117 | 7.065 | 6.987 |
| Media noise [μVrms] | 10.4 | 10.2 | 9.6 | 9.1 | 10.1 | 10.9 | 14.3 | 16.8 | 19.7 |

FIG. 40

| | Surface roughness of $Cr_{50}Ti_{50}$ film Ra [nm] | Surface roughness of FeSiAl film Ra [nm] | Surface roughness of CoCrTa film Ra [nm] | $\Delta\theta_{50}$ of CoCrTa film (degree) |
|---|---|---|---|---|
| Inventive medium E1 (Film formation speed 4mTorr) | 0.478 | 0.486 | 0.770 | 4.3 |
| Comparative medium E2 (Film formation speed 20mTorr) | 6.928 | 7.682 | 6.056 | 11.7 |

FIG. 44

| Argon gas pressure in forming Cr$_{50}$Ti$_{50}$ film [nm] | 0.5 | 2 | 4 | 12 | 18 | 20 | 30 | 35 | 40 |
|---|---|---|---|---|---|---|---|---|---|
| Ra of Cr$_{50}$Ti$_{50}$ film [nm] | 0.423 | 0.459 | 0.478 | 0.467 | 0.415 | 4.275 | 7.385 | 7.362 | 7.322 |
| Media noise [μVrms] | 10.9 | 10.2 | 9.7 | 9.4 | 10.7 | 14.1 | 16.4 | 16.3 | 20.5 |

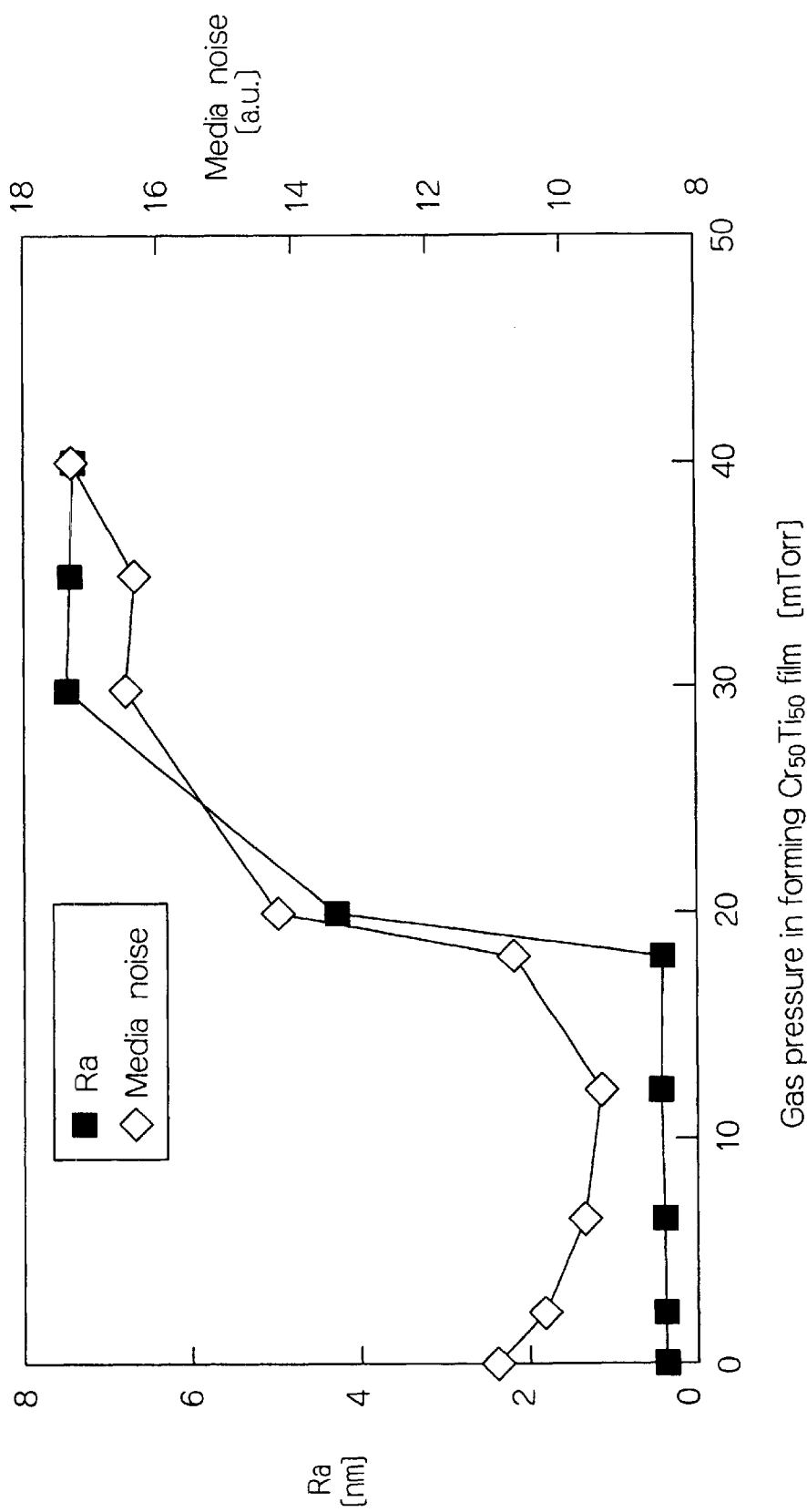
F I G. 4 5

FIG.46

| | Surface roughness of Cr$_{90}$C$_{10}$ film Ra [nm] | Surface roughness of FeTaN film Ra [nm] | Surface roughness of CoCrTa film Ra [nm] | $\Delta\theta_{50}$ of CoCrTa film (degree) |
|---|---|---|---|---|
| Inventive medium F1 (Film formation speed 13nm/s) | 0.399 | 0.479 | 0.770 | 4.2 |
| Comparative medium F2 (Film formation speed 25nm/s) | 6.835 | 7.053 | 7.123 | 9.9 |

FIG.50

| $Cr_{90}C_{10}$ film thickness [nm] | 0.1 | 1 | 3 | 6 | 13 | 18 | 20 | 22 | 25 |
|---|---|---|---|---|---|---|---|---|---|
| Ra of $Cr_{90}C_{10}$ film [nm] | 0.379 | 0.412 | 0.429 | 0.434 | 0.399 | 0.403 | 3.919 | 7.092 | 6.835 |
| Media noise [μ Vrms] | 10.1 | 10.6 | 8.9 | 9.5 | 9.1 | 9.9 | 14.5 | 16.6 | 19.2 |

FIG.52

| | Surface roughness of Ti$_{90}$C$_{10}$ film Ra [nm] | Surface roughness of FeTaN film Ra [nm] | Surface roughness of CoCrTa film Ra [nm] | Δθ$_{50}$ of CoCrTa film (degree) |
|---|---|---|---|---|
| Inventive medium G1 (Film formation 4 mTorr) | 0.397 | 0.456 | 0.772 | 3.9 |
| Comparative medium G2 (Film formation 20 mTorr) | 7.131 | 7.235 | 8.121 | 15.6 |

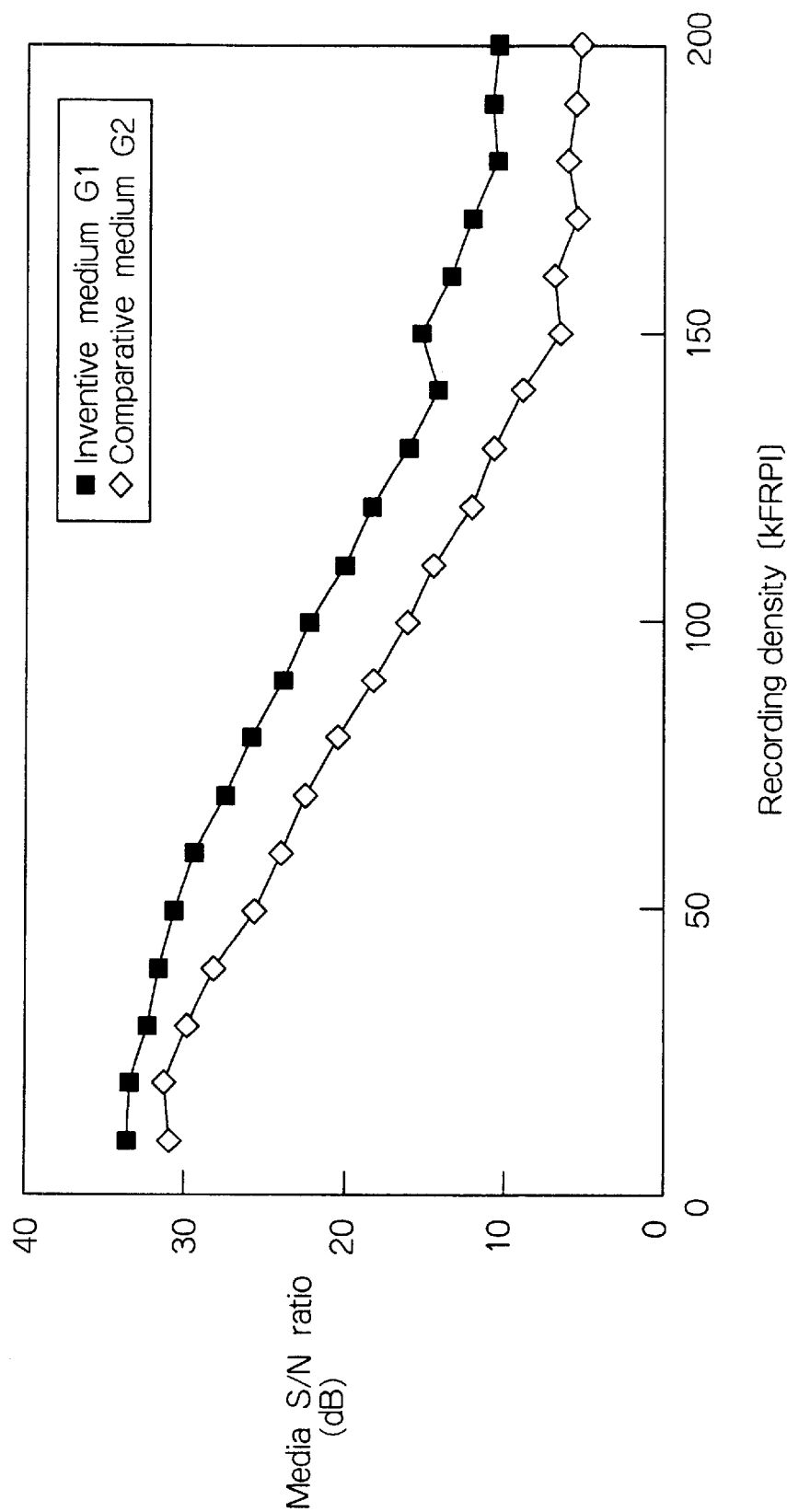
F I G. 55

FIG. 56

| Argon gas pressure in forming $Ti_{90}C_{10}$ film [nm] | 0.5 | 2 | 4 | 12 | 18 | 20 | 30 | 35 | 40 |
|---|---|---|---|---|---|---|---|---|---|
| Ra of $Ti_{90}C_{10}$ film [nm] | 0.413 | 0.479 | 0.397 | 0.427 | 0.405 | 5.127 | 7.152 | 7.122 | 7.349 |
| Media noise [μ Vrms] | 9.9 | 9.2 | 8.7 | 8.4 | 9.5 | 14.9 | 17.5 | 16.3 | 21.9 |

FIG.59

| | Surface roughness of Cr film Ra [nm] | Surface roughness of FeSiAl film Ra [nm] | Surface roughness of CoCrTa film Ra [nm] | $\Delta\theta_{50}$ of CoCrTa film (degree) |
|---|---|---|---|---|
| Inventive medium AA1 (Cr film thickness 10 nm) | 0.411 | 0.902 | 1.05 | 3.9 |
| Comparative medium AA2 (Cr film thickness 20 nm) | 0.852 | 1.11 | 1.37 | 7.0 |

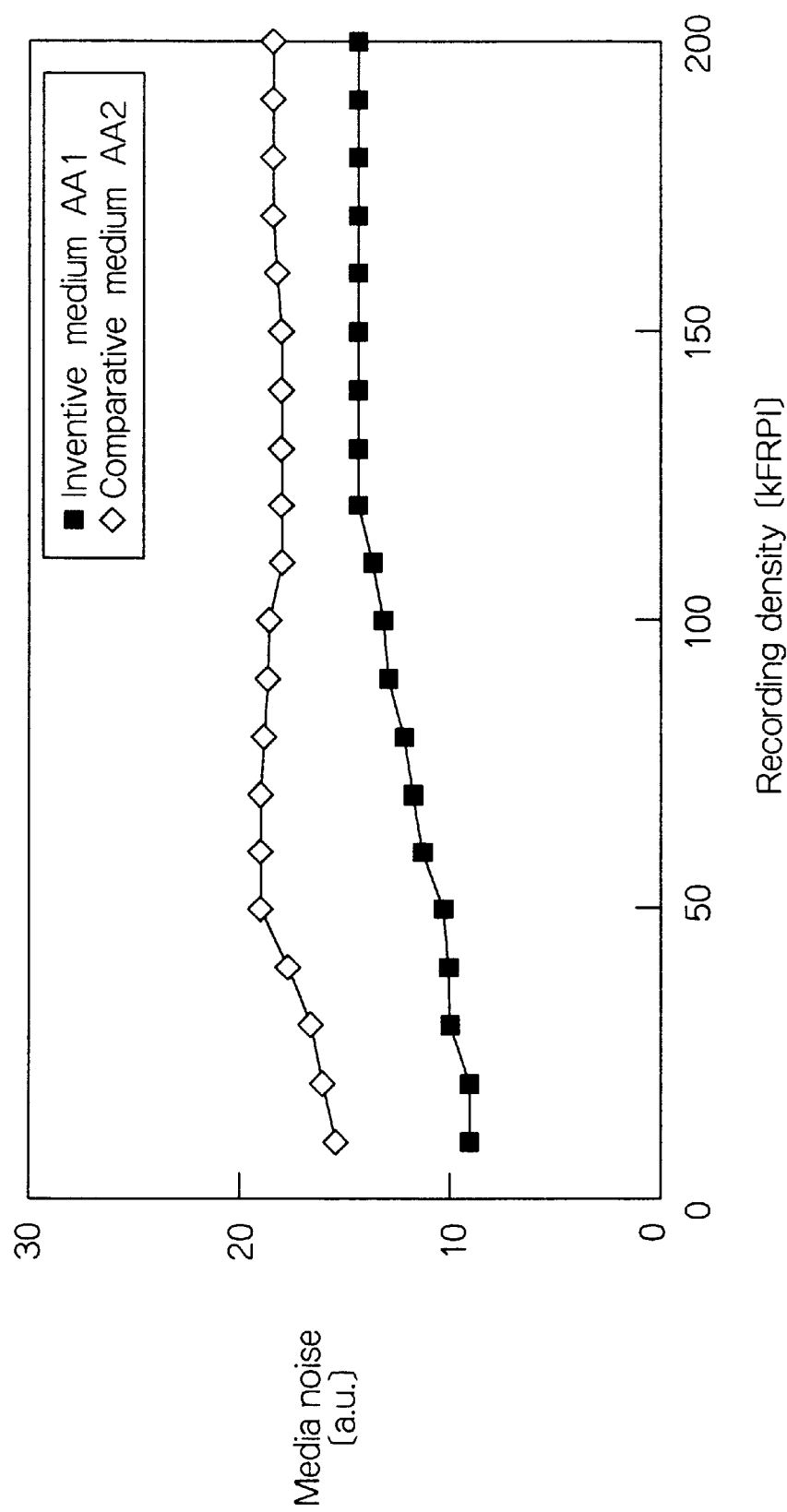
F I G. 6 0

| Cr film thickness [nm] | 1 | 2 | 5 | 9 | 10 | 13 | 15 | 17 | 20 |
|---|---|---|---|---|---|---|---|---|---|
| Ra of C film [nm] | 2.04 | 0.435 | 0.429 | 0.482 | 0.411 | 0.461 | 0.436 | 0.841 | 0.852 |
| Media noise [μVrms] | 19.4 | 10.2 | 9.8 | 9.6 | 9.5 | 10.6 | 10.1 | 16.8 | 19.7 |

FIG. 63

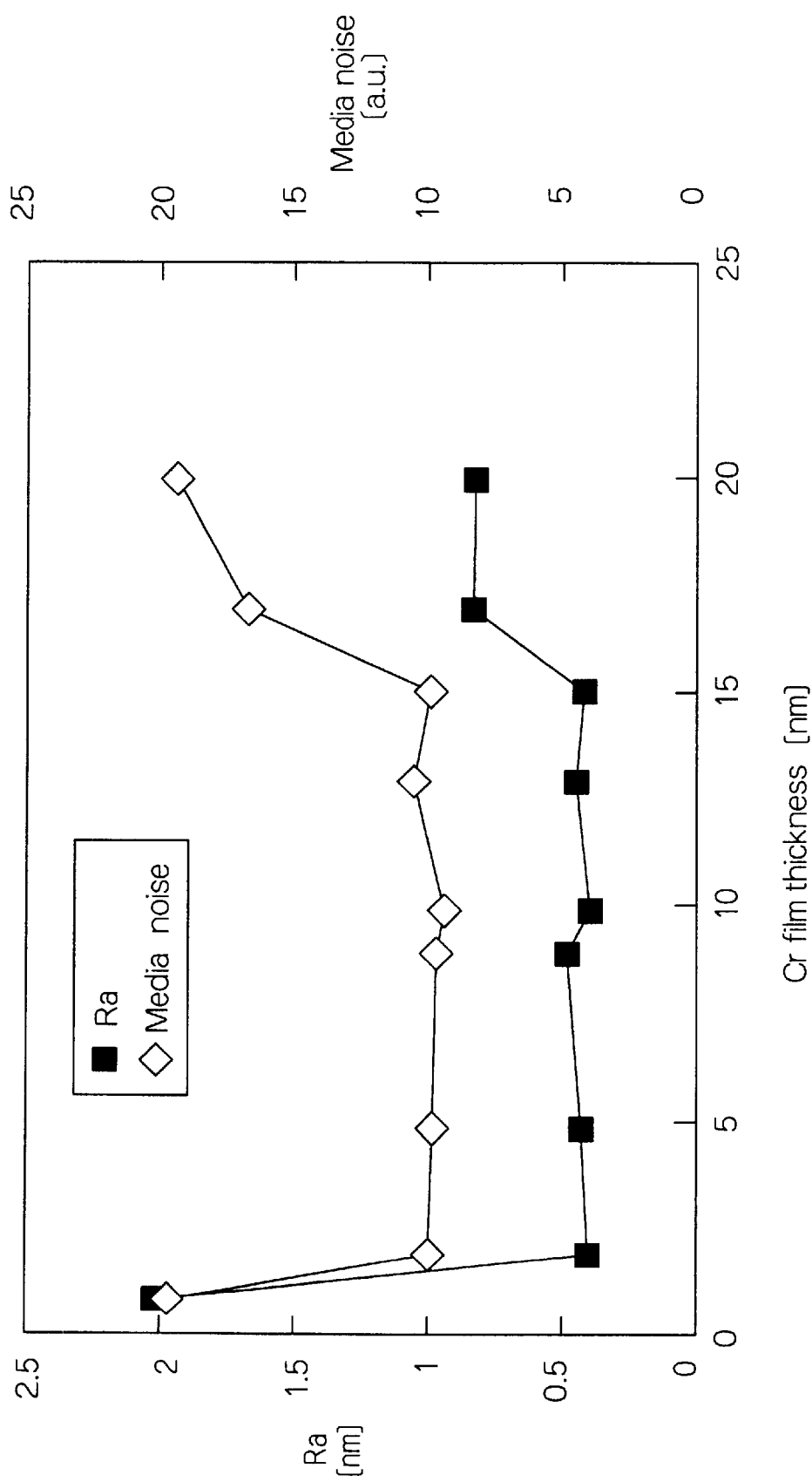
F I G. 64

FIG. 65

| | Surface roughness of Cr film Ra [nm] | Surface roughness of FeSiAl film Ra [nm] | Surface roughness of CoCrTa film Ra [nm] | $\Delta \theta_{50}$ of CoCrTa film (degree) |
|---|---|---|---|---|
| Inventive medium BB1 (Film formation 4 mTorr) | 0.411 | 0.902 | 1.05 | 3.9 |
| Comparative medium BB2 (Film formation 20 mTorr) | 7.125 | 7.235 | 8.121 | 15.6 |

FIG.69

| Argon gas pressure in forming Cr film [mTorr] | 0.5 | 2 | 4 | 12 | 18 | 20 | 30 | 35 | 40 |
|---|---|---|---|---|---|---|---|---|---|
| Ra of Cr film [nm] | 0.420 | 0.426 | 0.411 | 0.426 | 0.455 | 4.152 | 7.132 | 7.142 | 7.411 |
| Media noise [μVrms] | 9.7 | 9.5 | 9.5 | 9.3 | 9.3 | 12.2 | 17.6 | 16.9 | 20.6 |

FIG.71

| | Surface roughness of Cr film Ra [nm] | Surface roughness of FeSiAl film Ra [nm] | Surface roughness of CoCrTa film Ra [nm] | $\Delta\theta_{50}$ of CoCrTa film (degree) |
|---|---|---|---|---|
| Inventive medium CC1 (Film formation speed 13nm/s) | 0.411 | 0.902 | 1.05 | 3.9 |
| Comparative medium CC2 (Film formation speed 25nm/s) | 6.915 | 7.053 | 7.123 | 9.9 |

FIG.75

| Cr film formation speed | 0.1 | 1 | 3 | 6 | 13 | 18 | 20 | 22 | 25 |
|---|---|---|---|---|---|---|---|---|---|
| Ra of Cr film [nm] | 0.398 | 0.401 | 0.436 | 0.434 | 0.411 | 0.433 | 4.223 | 7.088 | 6.915 |
| Media noise [μ Vrms] | 9.6 | 9.2 | 8.5 | 9.5 | 9.5 | 9.4 | 13.6 | 17.4 | 18.2 |

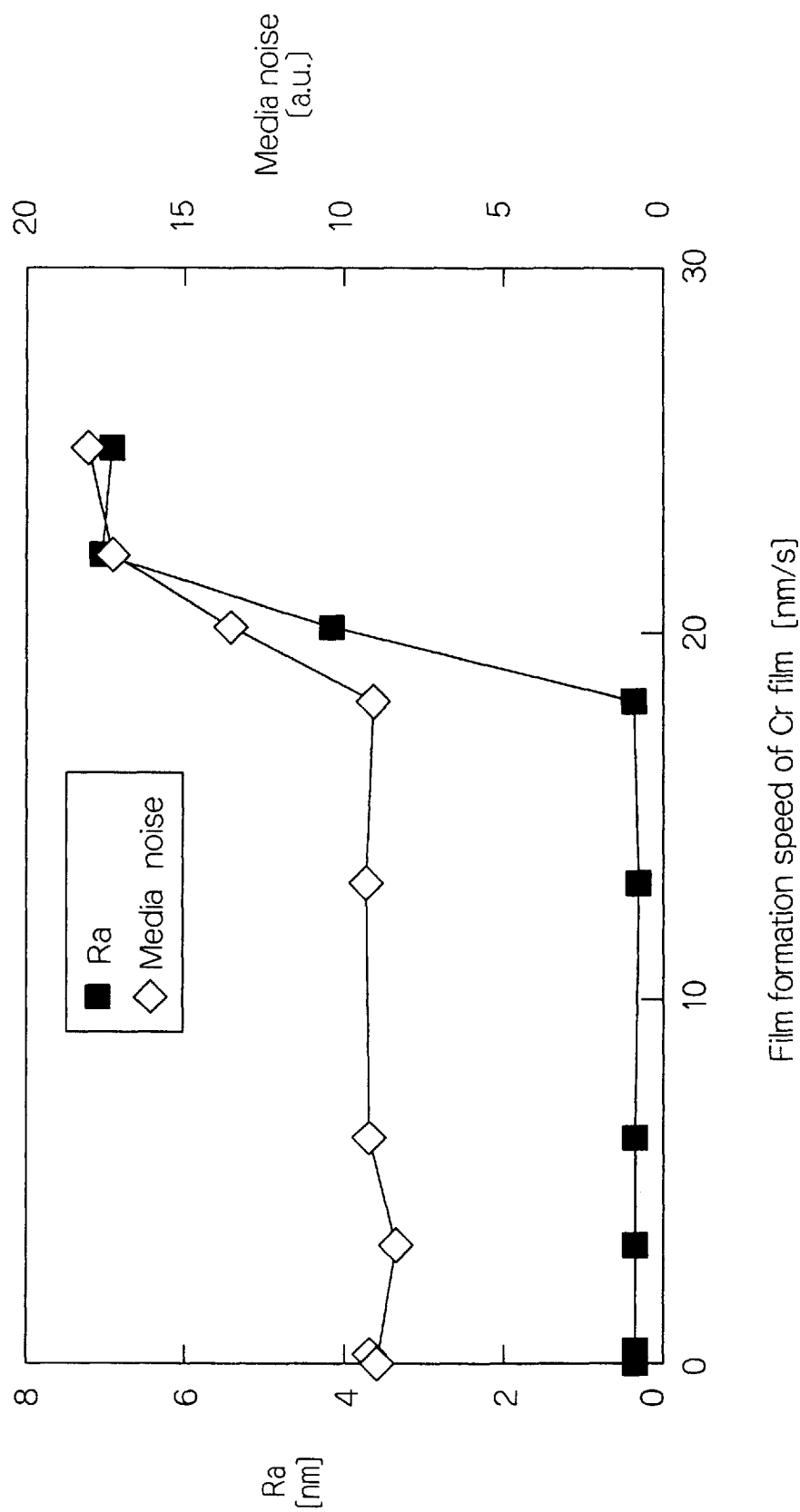
F I G. 76

FIG.77

| | Surface roughness of Cr film Ra [nm] | Surface roughness of FeTaN film Ra [nm] | Surface roughness of CoCrTa film Ra [nm] | $\Delta\theta_{50}$ of CoCrTa film (degree) |
|---|---|---|---|---|
| Inventive medium DD1 (Cr film thickness 10 nm) | 0.478 | 0.904 | 1.32 | 3.6 |
| Comparative medium DD2 (Cr film thickness 20 nm) | 0.852 | 1.18 | 1.55 | 6.8 |

FIG. 81

| Cr film thickness [nm] | 1 | 2 | 5 | 9 | 10 | 13 | 15 | 17 | 20 |
|---|---|---|---|---|---|---|---|---|---|
| Ra of Cr film [nm] | 1.84 | 0.425 | 0.425 | 0.486 | 0.478 | 0.441 | 0.448 | 0.897 | 0.852 |
| Media noise [μVrms] | 20.2 | 10.2 | 9.9 | 9.9 | 9.3 | 9.5 | 10.1 | 16.2 | 18.7 |

FIG. 83

| | Surface roughness of Cr film Ra [nm] | Surface roughness of FeTaN film Ra [nm] | Surface roughness of CoCrTa film Ra [nm] | $\Delta\theta_{50}$ of CoCrTa film (degree) |
|---|---|---|---|---|
| Inventive medium EE1 (Film formation 4 mTorr) | 0.478 | 0.904 | 1.32 | 3.6 |
| Comparative medium EE2 (Film formation 20 mTorr) | 6.847 | 7.215 | 8.102 | 12.6 |

FIG. 87

| Argon gas pressure in forming Cr film [nm] | 0.5 | 2 | 4 | 12 | 18 | 20 | 30 | 35 | 40 |
|---|---|---|---|---|---|---|---|---|---|
| Ra of Cr film [nm] | 0.411 | 0.424 | 0.478 | 0.452 | 0.426 | 4.113 | 6.952 | 6.874 | 7.263 |
| Media noise [μVrms] | 9.8 | 9.5 | 9.3 | 9.7 | 10.6 | 14.7 | 17.6 | 17.8 | 19.8 |

FIG.89

| | Surface roughness of Cr film Ra [nm] | Surface roughness of FeTaN film Ra [nm] | Surface roughness of CoCrTa film Ra [nm] | $\Delta\theta_{50}$ of CoCrTa film (degree) |
|---|---|---|---|---|
| Inventive medium FF1 (Film formation speed 13nm/s) | 0.478 | 0.904 | 1.32 | 3.6 |
| Comparative medium FF2 (Film formation speed 25nm/s) | 6.847 | 7.362 | 6.958 | 10.9 |

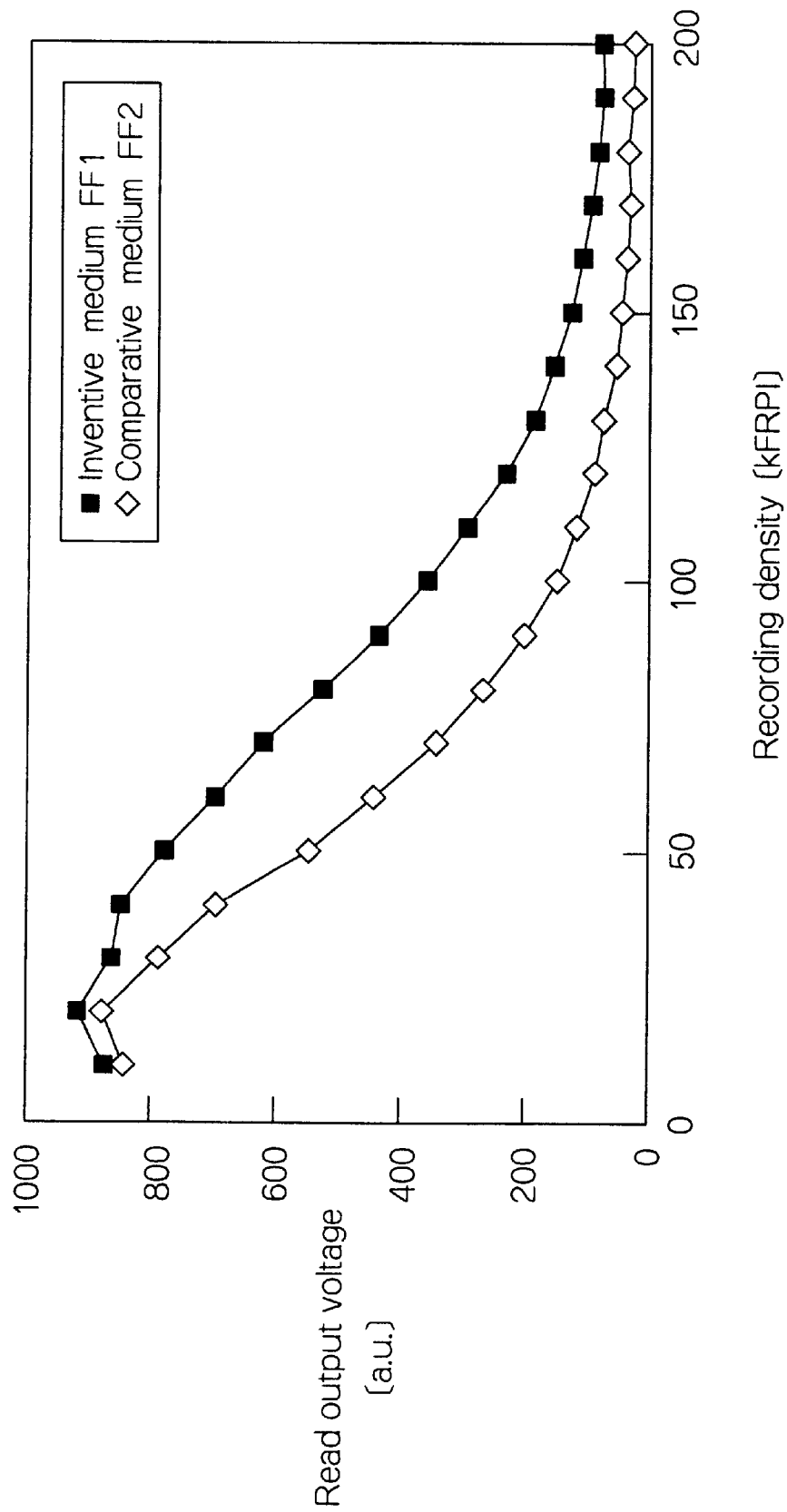
F I G. 91

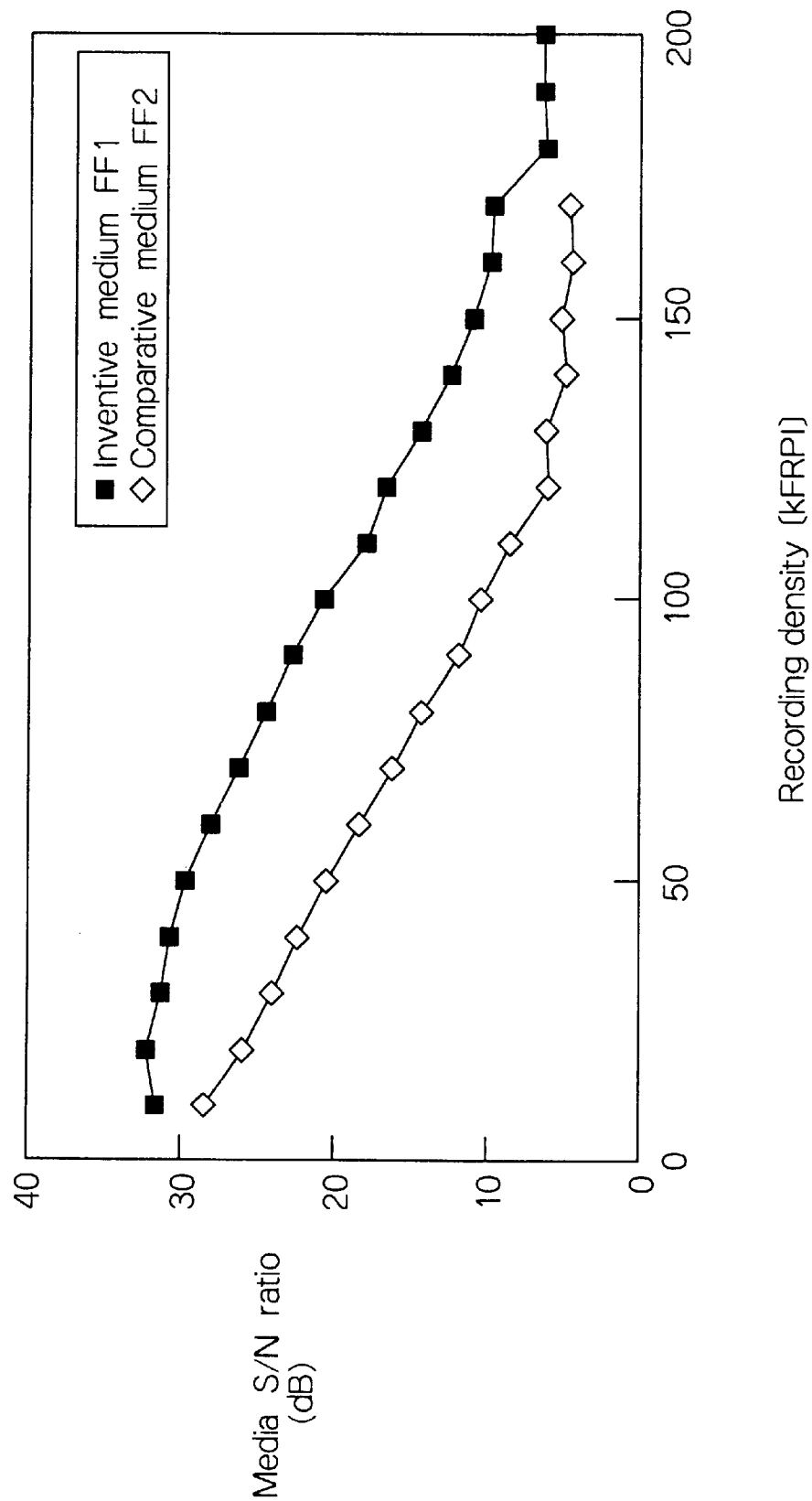
F I G. 92

FIG. 93

| Cr film thickness [nm/s] | 0.1 | 1 | 3 | 6 | 13 | 18 | 20 | 22 | 25 |
|---|---|---|---|---|---|---|---|---|---|
| Ra of Cr film [nm] | 0.417 | 0.421 | 0.428 | 0.458 | 0.478 | 0.459 | 4.552 | 7.217 | 6.847 |
| Media noise [μ Vrms] | 9.4 | 9.4 | 9.1 | 9.2 | 9.3 | 9.4 | 15.7 | 19.5 | 19.7 |

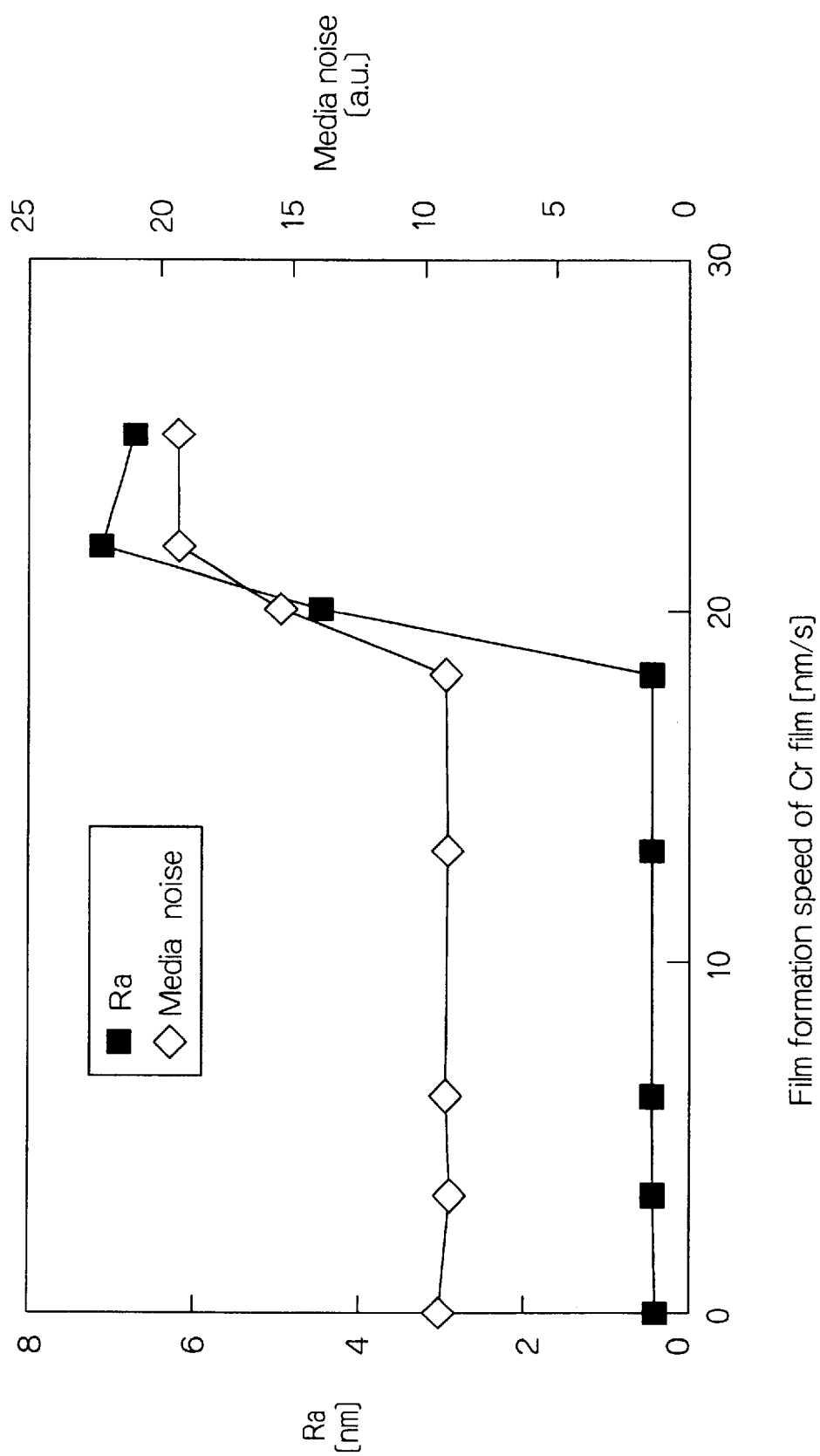
F I G. 94

PERPENDICULAR MAGNETIC RECORDING MEDIUM AND MANUFACTURING PROCESS THEREFOR

BACKGROUND OF THE INVENTION

1. Field of the Invention

The present invention relates to a perpendicular magnetic recording medium used as magnetic tape or a magnetic disk, and a process for manufacturing it.

2. Description of the Prior Art

A magnetic disk is demanded for higher and higher surface recording density because a hard disk has higher and higher capacity and a smaller and smaller size accompanying with recent advancement of a personal computer or workstation. However, the longitudinal recording method which is widely used at present suffers from problems of thermal fluctuation from recording magnetization due to miniaturization of recording bit, and increase of coercive force which may exceed the recording capability of the recording head when it is intended to attain high-recording density. Thus, the perpendicular magnetic recording method is being studied as an approach which can significantly increase the surface recording density. It is a so-called double-layer perpendicular medium consisting of a soft magnetic underlayer film with high permeability and a perpendicular magnetizing film with high perpendicular anisotropy that is considered promising as a perpendicular magnetic recording medium to attain the above.

FIG. 1 is a schematic sectional view showing such a conventional perpendicular magnetic recording medium.

This perpendicular magnetic recording medium 50 is formed by laminating a soft magnetic underlayer film 56 and a perpendicular magnetizing film 58 on a substrate 52 in this order. For example, an NiFe film is used as the soft magnetic underlayer film 56, and a CoCr type alloy film is used as the perpendicular magnetizing film 58. However, crystalline orientation of the perpendicular magnetizing film 58 is degraded when the soft magnetic underlayer film 56 of NiFe and the perpendicular magnetizing film 58 of CoCr are formed. Then, to prevent this, it is reported to use a Sendust film (FeSiAl alloy) as the soft magnetic underlayer film 56 (Japanese Patent Application Laid-Open No. 57-36435)

BRIEF SUMMARY OF THE INVENTION

OBJECT OF THE INVENTION

However, such conventional perpendicular magnetic recording medium has limitation in lowering media noise and improving recording density dependence on read output voltage.

Then, the object of the present invention is to provide a perpendicular magnetic recording medium which can further lower the media noise, and further improve the recording density dependence of read output voltage and manufacturing process therefor.

SUMMARY OF THE INVENTION

The inventors have reached the following view on the reasons preventing lowering of media noise and improvement of recording density dependence of read output voltage through repeated experiments and observations. That is, poor surface smoothness of the soft magnetic underlayer film degrades the perpendicular orientation of the perpendicular magnetizing film formed thereon. Therefore, as thickness of an initial layer (region in which crystal is not perpendicularly oriented) increases, surface smoothness of the perpendicular magnetizing film is degraded, so that the media noise is not lowered. In addition, since the perpendicular orientation is degraded for the perpendicular magnetizing film, the recording density dependence of read output voltage cannot be improved. The present invention is made based on such view.

A first aspect of the present invention is a perpendicular magnetic recording media and its manufacturing process, wherein a perpendicular magnetic recording medium comprises a soft magnetic underlayer film and a perpendicular magnetizing film, these films being formed on a substrate in this order, a Cr film being inserted between the substrate and the soft magnetic underlayer film. The Cr film has very excellent surface smoothness. Therefore, the soft magnetic underlayer film laminated on the Cr film also has very excellent surface smoothness reflecting the surface smoothness of the Cr film. Therefore, perpendicular orientation and surface smoothness are improved for the perpendicular magnetizing film laminated on the smooth surface of the soft magnetic underlayer film. As the perpendicular orientation is improved for the perpendicular magnetizing film, the initial layer is reduced, thereby media noise being lowered and recording density dependence of read output voltage being improved. In addition, as the surface smoothness is improved for the perpendicular magnetizing film, sliding characteristics of a recording/reproducing head is also improved, thereby this also lowering the media noise.

In the perpendicular magnetic recording medium and its manufacturing process according to the first aspect of the present invention, the soft magnetic underlayer film is, for example, an FeSiAl film, and the perpendicular magnetizing film is a CoCrTa film. In addition, average surface roughness on the centerline on the soft magnetic underlayer film is preferably 2 nm or less, more preferably 0.9 nm or less, most preferably 0.5 nm or less. Such surface smoothness can be obtained by sputtering under gas pressure of less than preferably 20 mTorr, more preferably 4 mTorr or less. Gas used in this case is Argon, for example. In addition, film thickness of the perpendicular magnetizing film is preferably more than 20 nm but 150 nm or less, more preferably 50 nm or more but 150 nm or less. The media noise is further reduced in these ranges. Furthermore, a Ti film or nonmagnetic CoCr film may be inserted between the soft magnetic underlayer film and the perpendicular magnetizing film. In this case, the perpendicular orientation is further improved for the perpendicular magnetizing film.

A second aspect of the present invention is a perpendicular magnetic recording media and its manufacturing process, wherein a perpendicular magnetic recording medium comprises a soft magnetic underlayer film and a perpendicular magnetizing film, these films being formed on a substrate in this order, a smoothness control film being inserted between the substrate and the soft magnetic underlayer film. A material of the smoothness control film is one of nine types of (1) C, (2) Ti, (3) alloy containing Cr, (4) alloy containing Ti, (5) alloy containing C, (6) alloy containing Cr and Ti, (7) alloy containing Ti and C, (8) alloy containing C and Cr, and (9) alloy containing Cr, Ti and C. The smoothness control film of such material has very excellent surface smoothness. Therefore, the soft magnetic underlayer film laminated on the smoothness control film also has very excellent surface smoothness reflecting the surface smoothness of the smoothness control film. Therefore, perpendicular orientation and surface smoothness are improved for the perpendicular magnetizing film laminated on the smooth surface of the soft magnetic underlayer film. As the perpendicular orientation is improved for the perpendicular magnetizing film, the initial layer is reduced, thereby media noise being lowered and recording density dependence of read output voltage being improved. In addition, as the surface smoothness is improved for the perpendicular magnetizing film, sliding characteristics of a recording/reproducing head is also improved, thereby this also lowering the media noise.

In the perpendicular magnetic recording medium and its manufacturing process according to the second aspect of the present invention, the soft magnetic underlayer film is, for example, an FeSiAl film or an FeTaN film. The perpendicular magnetizing film is, for example, a CoCrTa film. In addition, average surface roughness on the centerline on the soft magnetic underlayer film is preferably 2 nm or less, more preferably 0.9 nm or less, most preferably 0.5 nm or less. Film thickness of the smoothness control film is preferably more than 1 nm but less than 17 nm, more preferably 2 nm or more but 15 nm or less. Gas pressure in sputtering film formation of the smoothness control film is preferably less than 20 mTorr, more preferably 18 mTorr or less. Film formation speed in sputtering film formation of the smoothness control film is preferably less than 20 nm/s, more preferably 18 nm/s or less. Gas used for the sputtering film formation is, for example, Argon, Krypton, Neon and the like.

A third aspect of the present invention is a perpendicular magnetic recording media and its manufacturing process, wherein a perpendicular magnetic recording medium comprises a soft magnetic underlayer film and a perpendicular magnetizing film, these films being formed on a substrate in this order, a Cr film with a specific film thickness being inserted between the substrate and the soft magnetic underlayer film. Film thickness of the Cr film is 1 nm or more but less than 17 nm, preferably 2 nm or more but 15 nm or less. The Cr film with such film thickness has very excellent surface smoothness. Therefore, the soft magnetic underlayer film laminated on the Cr film also has very excellent surface smoothness reflecting the surface smoothness of the smoothness control film. Therefore, perpendicular orientation and surface smoothness are improved for the perpendicular magnetizing film laminated on the smooth surface of the soft magnetic underlayer film. As the perpendicular orientation is improved for the perpendicular magnetizing film, the initial layer is reduced, thereby media noise being lowered and recording density dependence of read output voltage being improved. In addition, as the surface smoothness is improved for the perpendicular magnetizing film, sliding characteristics of a recording/reproducing head is also improved, thereby this also lowering the media noise.

In the perpendicular magnetic recording medium and its manufacturing process according to the third aspect of the present invention, the soft magnetic underlayer film is, for example, an FeSiAl film or an FeTaN film. The perpendicular magnetizing film is, for example, a CoCrTa film. In addition, average surface roughness on the centerline on the soft magnetic underlayer film is preferably 2 nm or less, more preferably 0.9 nm or less, most preferably 0.5 nm or less. Gas pressure in sputtering film formation of the Cr film is preferably less than 20 mTorr, more preferably 18 mTorr or less. Film formation speed in sputtering film formation of the Cr film is preferably less than 20 nm/s, more preferably 18 nm/s or less. Gas used for the sputtering film formation is, for example, Argon, Krypton, Neon and the like.

BRIEF DESCRIPTION OF THE DRAWINGS

FIG. 16 is a table showing surface roughness of C film, FeSiAl film and CoCrTa film, and perpendicular orientation of CoCrTa film in example 1 of the perpendicular magnetic recording medium of FIG. 15;

FIG. 20 is a table showing relationship of film thickness and Ra of C film, and media noise in example 1 of the perpendicular magnetic recording medium of FIG. 15;

FIG. 22 is a table showing surface roughness of Ti film, FeSiAl film and CoCrTa film, and perpendicular orientation of CoCrTa film in example 2 of the perpendicular magnetic recording medium of FIG. 15;

FIG. 26 is a table showing relationship of film thickness and Ra of Ti film, and media noise in example 2 of the perpendicular magnetic recording medium of FIG. 15;

FIG. 28 is a table showing surface roughness of $Cr_{50}Ti_{40}C_{10}$ film, FeSiAl film and CoCrTa film, and perpendicular orientation of CoCrTa film in example 3 of the perpendicular magnetic recording medium of FIG. 15;

FIG. 32 is a table showing relationship of film thickness and Ra of $Cr_{50}Ti_{40}C_{10}$ film, and media noise in example 3 of the perpendicular magnetic recording medium of FIG. 15;

FIG. 34 is a table showing surface roughness of $Cr_{80}Ti_{20}$ film, FeSiAl film and CoCrTa film, and perpendicular orientation of CoCrTa film in example 4 of the perpendicular magnetic recording medium of FIG. 15;

FIG. 38 is a table showing relationship of film formation speed and Ra of $Cr_{80}Ti_{20}$ film, and media noise in example 4 of the perpendicular magnetic recording medium of FIG. 15;

FIG. 40 is a table showing surface roughness of $Cr_{50}Ti_{50}$ film, FeSiAl film and CoCrTa film, and perpendicular orientation of CoCrTa film in example 5 of the perpendicular magnetic recording medium of FIG. 15;

FIG. 44 is a table showing relationship of argon gas pressure at film formation and Ra of $Cr_{50}Ti_{50}$ film, and media noise in example 5 of the perpendicular magnetic recording medium of FIG. 15;

FIG. 45 is a graph showing relationship of argon gas pressure at film formation and Ra of $Cr_{50}Ti_{50}$ film, and media noise in example 5 of the perpendicular magnetic recording medium of FIG. 15;

FIG. 46 is a table showing surface roughness of $Cr_{90}C_{10}$ film, FeTaN film and CoCrTa film, and perpendicular orientation of CoCrTa film in example 6 of the perpendicular magnetic recording medium of FIG. 15;

FIG. 50 is a table showing relationship of film formation speed and Ra of $Cr_{90}C_{10}$ film, and media noise in example 6 of the perpendicular magnetic recording medium of FIG. 15;

FIG. 52 is a table showing surface roughness of $Ti_{90}C_{10}$ film, FeTaN film and CoCrTa film, and perpendicular orientation of CoCrTa film in example 7 of the perpendicular magnetic recording medium of FIG. 15;

FIG. 55 is a graph showing recording density dependence of media S/N ratio in example 7 of the perpendicular magnetic recording medium of FIG. 15;

FIG. 56 is a table showing relationship of argon gas pressure at film formation and Ra of $Ti_{90}C_{10}$ film, and media noise in example 7 of the perpendicular magnetic recording medium of FIG. 15;

FIG. 59 is a table showing surface roughness of Cr film, FeSiAl film and CoCrTa film, and perpendicular orientation of CoCrTa film in example 1 of the perpendicular magnetic recording medium of FIG. 58;

FIG. 60 is a graph showing recording density dependence of media noise in example 8 of the perpendicular magnetic recording medium of FIG. 58;

FIG. 63 is a table showing relationship of film thickness and Ra of Cr film, and media noise in example 8 of the perpendicular magnetic recording medium of FIG. 58;

FIG. 64 is a graph showing relationship of film thickness and Ra of Cr film, and media noise in example 8 of the perpendicular magnetic recording medium of FIG. 58;

FIG. 65 is a table showing surface roughness of Cr film, FeSiAl film and CoCrTa film, and perpendicular orientation of CoCrTa film in example 9 of the perpendicular magnetic recording medium of FIG. 58;

FIG. 69 is a table showing relationship of argon gas pressure in film formation and Ra of Cr film, and media noise example 9 of the perpendicular magnetic recording medium of FIG. 58;

FIG. 71 is a table showing surface roughness of Cr film, FeSiAl film and CoCrTa film, and perpendicular orientation of CoCrTa film in example 10 of the perpendicular magnetic recording medium of FIG. 58;

FIG. 75 is a table showing relationship of film formation speed and Ra of Cr film, and media noise in example 10 of the perpendicular magnetic recording medium of FIG. 58;

FIG. 76 is a graph showing relationship of film formation speed and Ra of Cr film, and media noise in example 10 of the perpendicular magnetic recording medium of FIG. 58;

FIG. 77 is a table showing surface roughness of Cr film, FeTaN film and CoCrTa film, and perpendicular orientation of CoCrTa film in example 11 of the perpendicular magnetic recording medium of FIG. 58;

FIG. 81 is a table showing relationship of film thickness and Ra of Cr film, and media noise in example 11 of the perpendicular magnetic recording medium of FIG. 58;

FIG. 83 is a table showing surface roughness of Cr film, FeTaN film and CoCrTa film, and perpendicular orientation of CoCrTa film in example 12 of the perpendicular magnetic recording medium of FIG. 58;

FIG. 87 is a table showing relationship of argon gas pressure in film formation and Ra of Cr film, and media noise in example 12 of the perpendicular magnetic recording medium of FIG. 58;

FIG. 89 is a table showing surface roughness of Cr film, FeTaN film and CoCrTa film, and perpendicular orientation of CoCrTa film in example 13 of the perpendicular magnetic recording medium of FIG. 58;

FIG. 91 is a graph showing recording density dependence of read output voltage in example 13 of the perpendicular magnetic recording medium of FIG. 58;

FIG. 92 is a graph showing recording density dependence of media S/N ratio in example 13 of the perpendicular magnetic recording medium of FIG. 58;

FIG. 93 is a table showing relationship of film formation speed and Ra of Cr film, and media noise in example 13 of the perpendicular magnetic recording medium of FIG. 58; and FIG. 94 is a graph showing relationship of film formation speed and Ra of Cr film, and media noise in example 13 of the perpendicular magnetic recording medium of FIG. 58.

DETAILED DESCRIPTION OF THE PREFERRED EMBODIMENTS

Now, there are described embodiments and examples of the first perpendicular magnetic recording medium and its manufacturing process of the present inventions.

Figure 2:
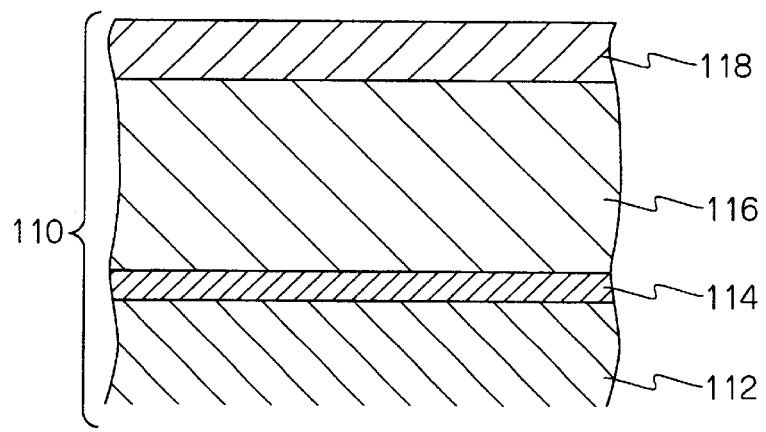
FIG. 2 is a schematic sectional view showing a first embodiment of a first perpendicular magnetic recording medium according to the present invention.

FIG. 2 is a schematic sectional view showing a first embodiment of a first perpendicular magnetic recording medium according to the present invention. Now, description is made referring to this figure.

The perpendicular magnetic recording medium 110 of the embodiment is formed by laminating a Cr film 114, a soft magnetic underlayer film 116, and a perpendicular magnetizing film 118 on a substrate 112 in this order. The soft magnetic underlayer film 116 is, for example, an FeSiAl film. The perpendicular magnetizing film 118 is, for example, a CoCrTa film. The Cr film 114 acts to improve surface smoothness of the soft magnetic underlayer film 116, and surface smoothness and perpendicular orientation of the perpendicular magnetizing film 118.

Figure 3:
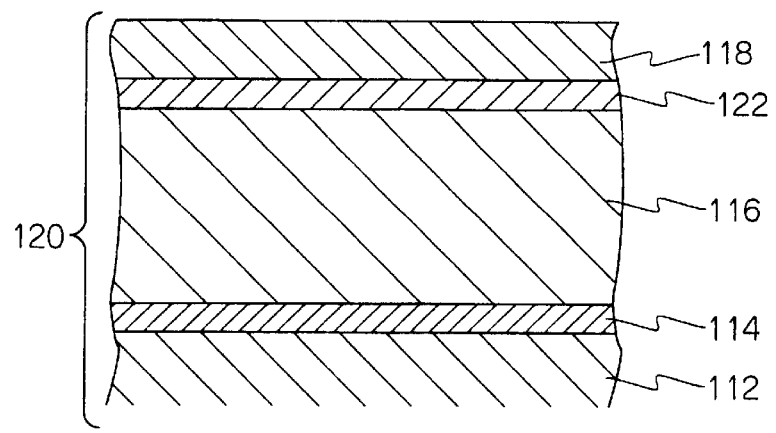
FIG. 3 is a schematic sectional view showing a second embodiment of a first perpendicular magnetic recording medium according to the present invention.

FIG. 3 is a schematic sectional view showing a second embodiment of a first perpendicular magnetic recording medium according to the present invention. Now, description is made referring to this figure. However, the same components as FIG. 2 are denoted by like references to omit duplicated description.

The perpendicular magnetic recording medium 120 of the embodiment has a Ti film or a non-magnetic CoCr film 122 between the soft magnetic underlayer film 116 and the perpendicular magnetizing film 118. The Ti film or non-magnetic CoCr film 122 acts to further improve perpendicular orientation of the perpendicular magnetizing film 118.

EXAMPLE

Now, there is described an example of the first embodiment of the present invention (FIG. 2).

A Cr film 114, a soft magnetic underlayer film 116 and a perpendicular magnetizing film 118 were formed by a direct current magnetron sputtering device using Ar. First, the Cr film 114 was formed in a thickness of 11 nm using a Cr (3N) target with 6 inch diameter on a glass substrate 112 with 2.5 inch diameter. In this case, Ar gas pressure was 4 mTorr. Subsequently, the soft magnetic underlayer film 116 was formed in a thickness of 520 nm by using an $Fe_{85}Si_{9.6}Al_{54.4}$ (wt %) target with 6 inch diameter on the Cr film 114. In this case, Ar gas pressure was three kinds of 1 mTorr, 4 mTorr, and 20 mTorr. Subsequently, the perpendicular magnetizing film 118 was formed in a thickness of 100 nm by using a $Co_{78}Cr_{19}Ta_3$ (at %) target on the soft magnetic underlayer film 116. In this case, Ar gas pressure was 4 mTorr, while the substrate temperature was about 400° C. Finally, a carbon protective film (not shown) was sputtered in a thickness of 10 nm on the perpendicular magnetizing film 118. In addition, in the sputtering film formation, supplied power was 0.5 kW, film formation speed was 3 nm/s for the Cr film 114 and the perpendicular magnetizing film 118, and 4 nm/s for the soft magnetic underlayer film 116.

Figure 1:
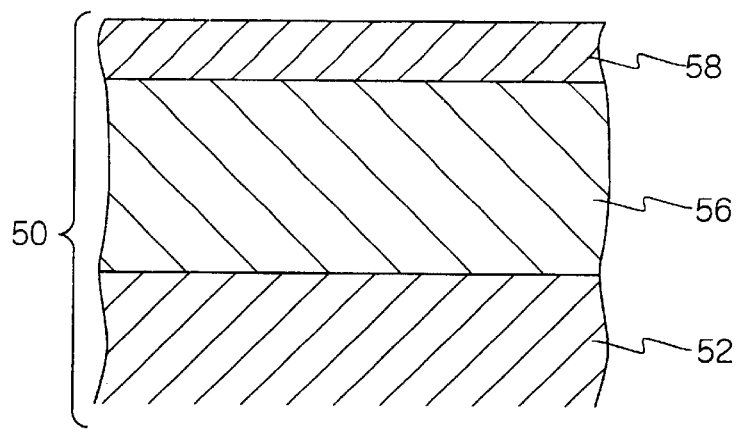
FIG. 1 is a schematic sectional view showing a conventional perpendicular magnetic recording medium.

Moreover, a conventional perpendicular magnetic recording medium without Cr film 50 (FIG. 1) was also prepared to investigate the effect of insertion of the Cr film 114. Furthermore, to investigate the perpendicular magnetizing film thickness dependence, there were also separately prepared perpendicular magnetic recording media 110 having perpendicular magnetizing films 118 of 20–150 nm and soft magnetic underlayer films 116 formed under Ar gas pressure of 4 mTorr.

The crystalline orientation of film was investigated by the X-ray diffraction analysis. Surface roughness of the Cr film 114, the soft magnetic underlayer film 116 and the perpendicular magnetizing film 118 was investigated by an atomic force microscope (hereinafter called "AFM"). Coercivity of the perpendicular magnetic recording medium 110 was measured by a Kerr hysteresis tracer. Read and write characteristics were investigated by a single-pole write head and a read magneto-resistive (MR) head having a gap length of 0.32 μm and a track width of 2.7 μm. Flying heights of write and read heads were 20 nm and 45 nm, respectively. Media noise was calculated by integrating noise power spectrum of 45 MHz or higher and subtracting the system noise. Media S/N ratio was calculated by using the output at the area where the isolated waveform was obtained and media noise to recording density of 200 kFRPI.

Figure 4:
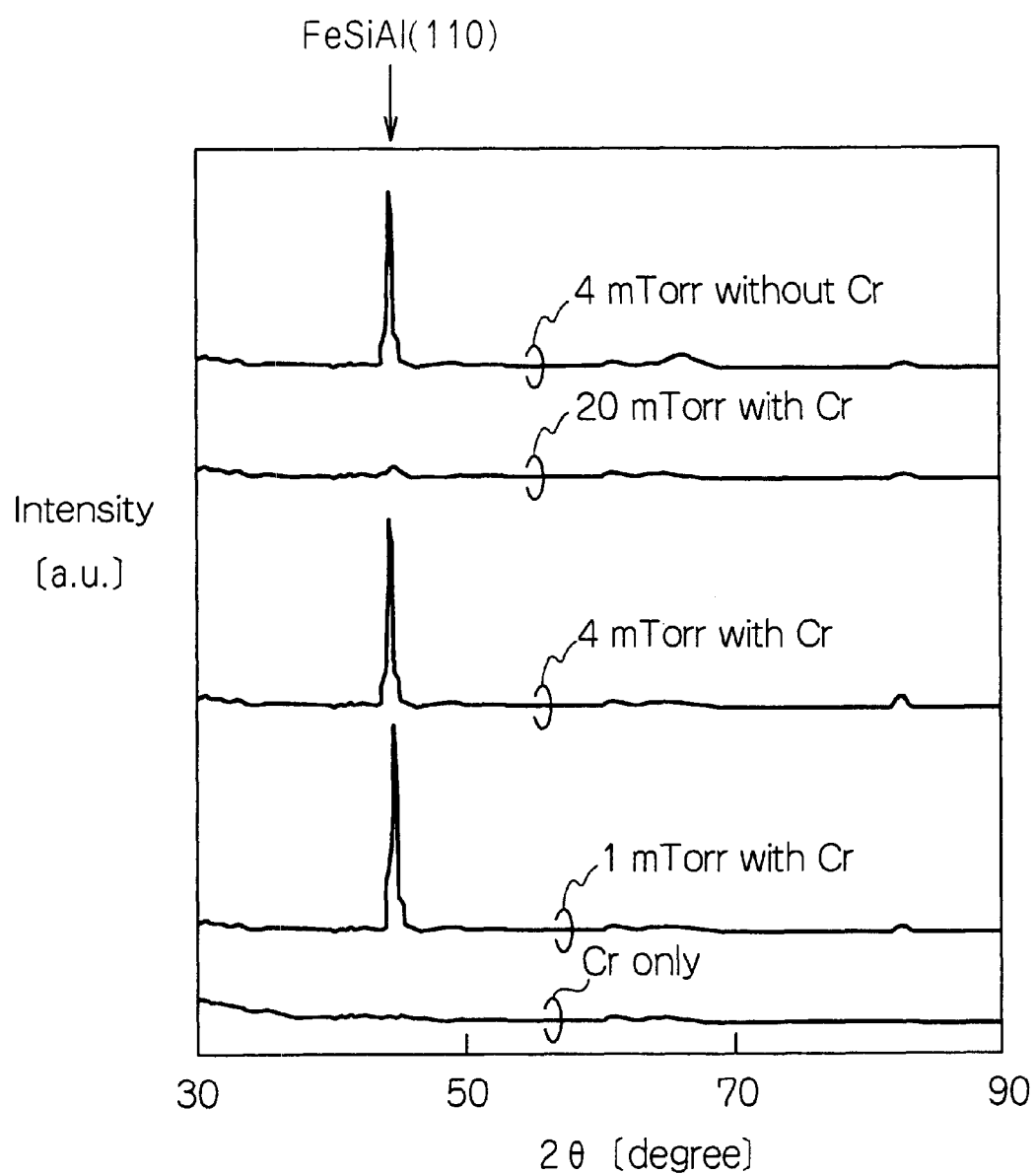
FIG. 4 is a graph showing an X-ray diffraction pattern on a Cr film and a soft magnetic underlayer film in the perpendicular magnetic recording medium of FIG. 2.

FIG. 4 is a graph showing an X-ray diffraction pattern on the Cr film 114 and the soft magnetic underlayer films 116, 56. Now, description is made referring to FIGS. 2, 4 and 1.

The soft magnetic underlayer films 116, 56 were further annealed in a chamber after film formation under the same conditions as in forming the perpendicular magnetizing film 118. FeSiAl crystal in the soft magnetic underlayer film 116 has the same crystal structure (bcc) as Cr crystal in the Cr film 114, and their lattice constant is substantially same. Steep peaks of (110) diffraction, which is a favored direction of bcc crystals, were observed in the soft magnetic underlayer films 116 formed at 1 and 4 mTorr. A (110) diffraction peak was rarely seen in a Cr film 114 only because it was very thin (11 nm). The (110) diffraction peak of the soft magnetic underlayer film 116 at 20 mTorr was far weaker than that at 1 or 4 mTorr. These facts indicate that sputtering under low Ar gas pressure is effective in improving crystalline orientation of the soft magnetic underlayer film 116. However, since there was little difference between the (110) diffraction of the soft magnetic underlayer films 116, 56 formed at 4 mTorr, it can be said that insertion of the Cr film 114 little affects the crystalline orientation of the soft magnetic underlayer film 116.

Figure 5:
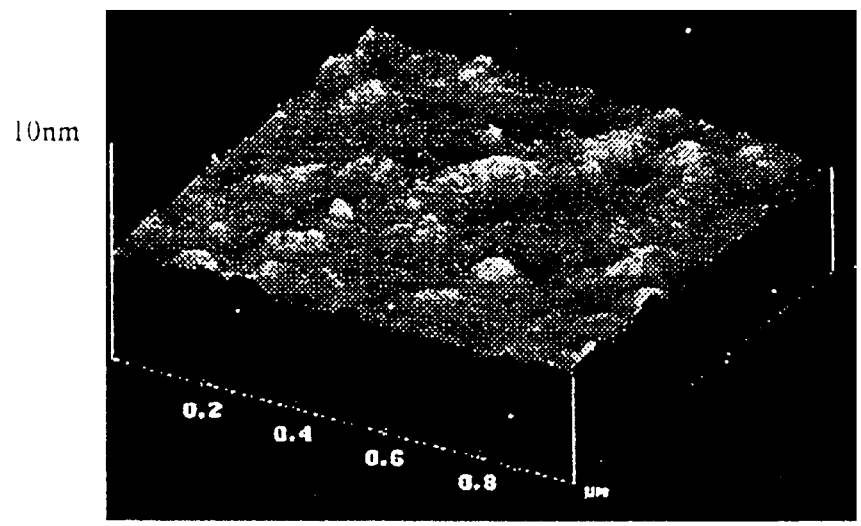
FIG. 5 is a three-dimensional graph showing the surface of the soft magnetic underlayer film in the perpendicular magnetic recording medium of FIG. 2.
Figure 6:
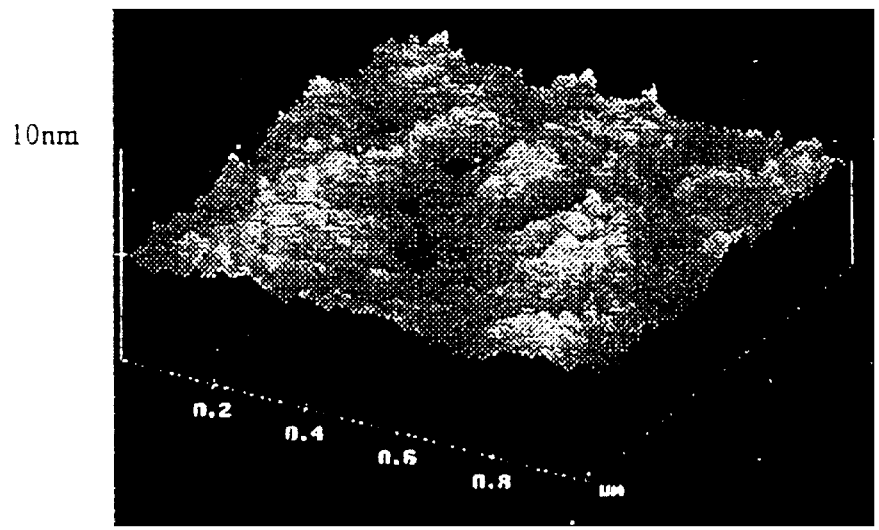
FIG. 6 is a three-dimensional graph showing the surface of the soft magnetic underlayer film in the perpendicular magnetic recording medium of FIG. 1.
Figures 7, 8:
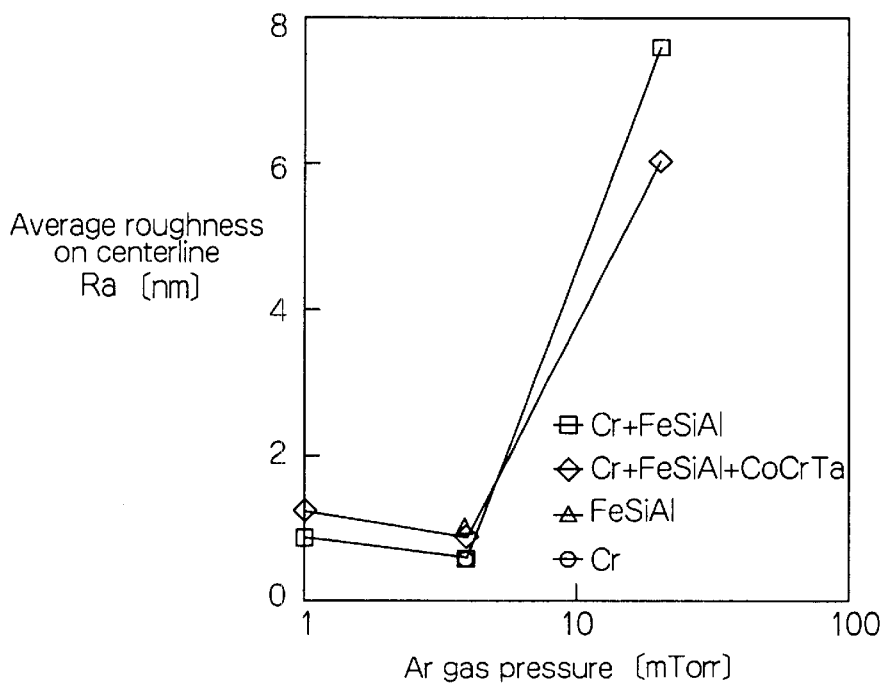
FIG. 7 is a table showing surface roughness of a Cr film, a soft magnetic underlayer films with a Cr film, and a soft magnetic underlayer film without a Cr film in the perpendicular magnetic recording media of FIGS. 2 and 1.
FIG. 8 is a graph showing Ar gas pressure dependence of surface roughness of the soft magnetic underlayer film and the perpendicular magnetizing film in the perpendicular magnetic recording medium of FIG. 2.

FIGS. 5 through 8 show results of measurement on each film surface with the AFM. FIGS. 5 and 6 are three-dimensional graphs showing the surfaces of the soft magnetic underlayer film 116 with a Cr film and the soft magnetic underlayer film 56 without a Cr film formed at 4 mTorr, respectively. FIG. 7 is a table showing the surfaces roughness of the Cr film 114, the soft magnetic underlayer film 116 with a Cr film and the soft magnetic underlayer film 56 without a Cr film formed at 4 mTorr. FIG. 8 is a graph showing Ar gas pressure dependence of surface roughness of the soft magnetic underlayer film 116 and the perpendicular magnetizing film 118. Now, description is made referring to FIGS. 2, 5 through 8, and 1.

Referring to FIGS. 5 through 7, it is seen that the soft magnetic underlayer film 116 with a Cr film has smoother surface than the film without a Cr film. That is, when the Cr film 114 is inserted, it acts to make smooth the surface of the soft magnetic underlayer film 116. This is considered to be due to the fact that the soft magnetic underlayer film 116 grows epitaxial on the Cr film 114. In addition, referring to FIG. 8, it is shown that there is a strong correlation between the surface roughness of the perpendicular magnetizing film 118 and that of the soft magnetic underlayer film 116. In other words, when the Cr film 114 with smooth surface is inserted, it acts to make smooth not only the soft magnetic underlayer film 116, but also the perpendicular magnetizing film 118.

Figure 9:
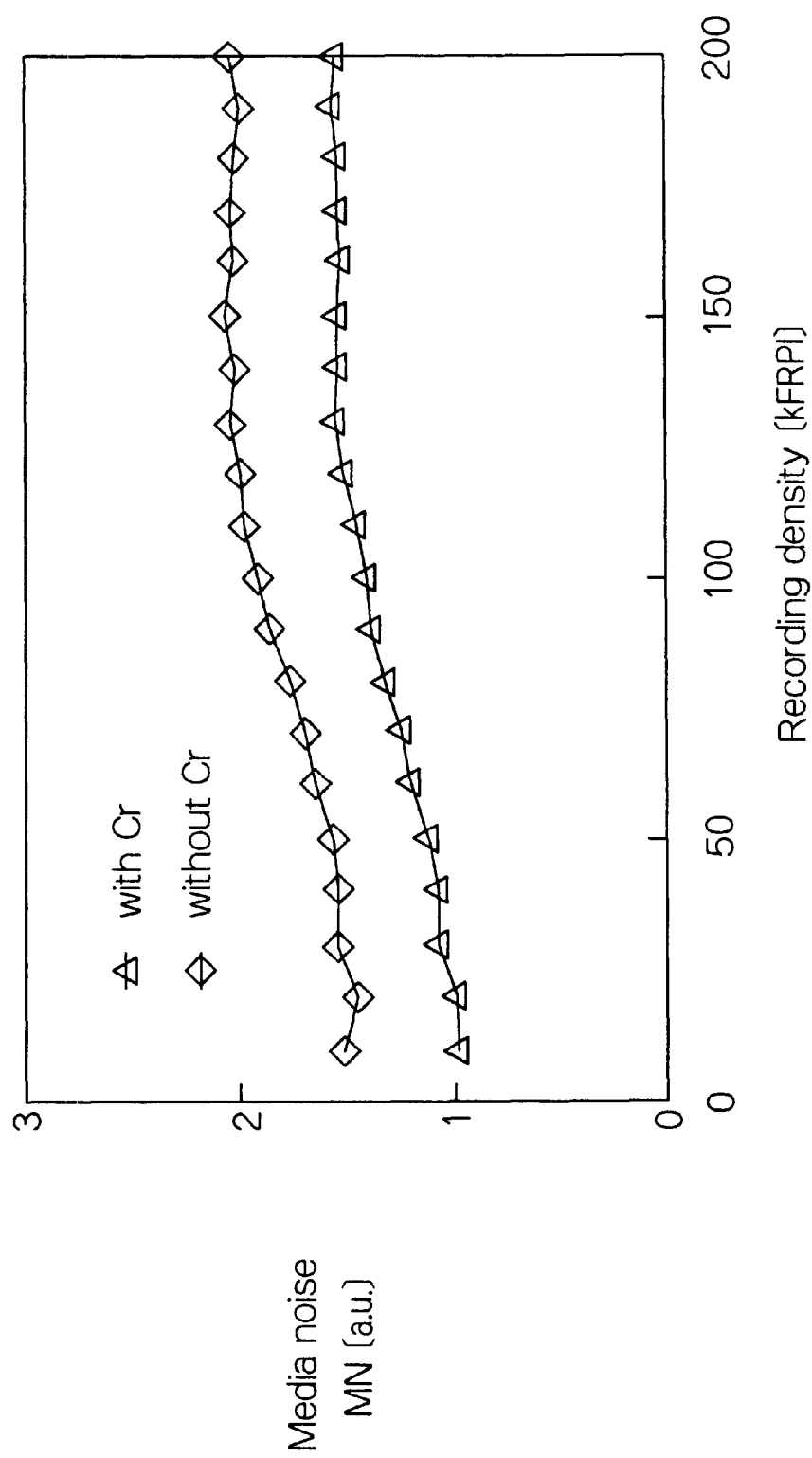
FIG. 9 is a graph showing recording density dependence of media noise in the perpendicular magnetic recording media of FIGS. 2 and 1.

FIG. 9 is a graph showing recording density dependence of media noise in the perpendicular magnetic recording medium with Cr film 110 and the perpendicular magnetic recording medium without Cr film 50. Now, description is made referring to FIGS. 2, 9, and 15.

In the following, the media noise is called MN, the normalized media noise NMN. The NMN is defined MN at each recording density divided by the read output at the area where the isolated waveform is obtained. Referring to FIG. 9, it is seen that,, when the Cr film 114 is inserted, MN is significantly reduced. The perpendicular magnetizing film 118 with a Cr film has substantially same coercivity as the perpendicular magnetizing film 58 without a Cr film (2800 Oe). The soft magnetic underlayer film 116 with a Cr film has the same coercivity as the soft magnetic underlayer film 56 without a Cr film (1500 Oe). Although insertion of the Cr film 114 acts to make smooth the surface of the soft magnetic underlayer film 116 as described above, it has little effect on crystalline orientation of the soft magnetic underlayer film 116 (FIGS. 4 and 8). Therefore, reduction of MN can be said to be mainly brought by improvement of the surface smoothness of the soft magnetic underlayer film 116. In addition, increase of MN is also recognized due to increase of the recording density. This increase is believed to be provided by growth of grain size on the surface which causes transition noise.

Figure 10:
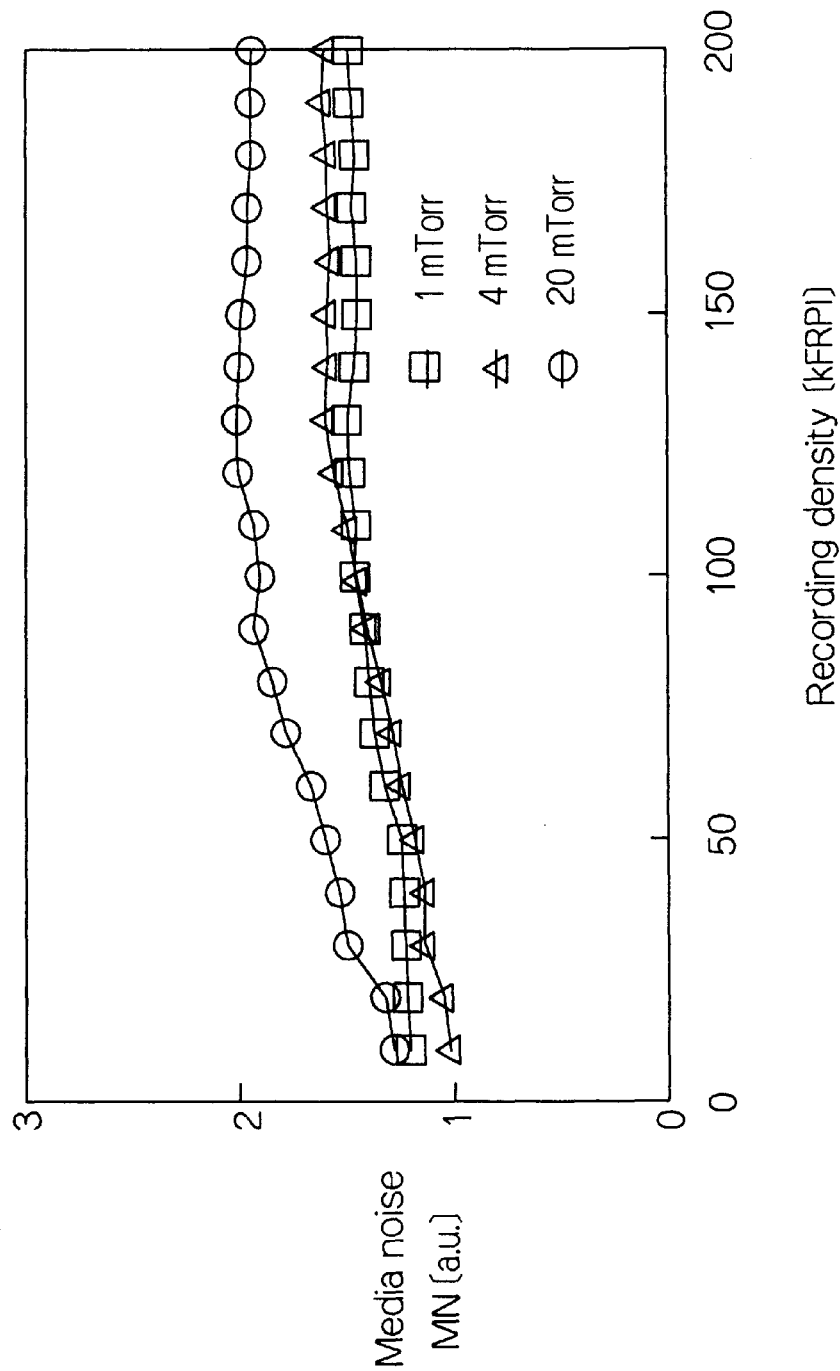
FIG. 10 is a graph showing recording density dependence of media noise on soft magnetic underlayer films formed at various Ar gas pressure in the perpendicular magnetic recording medium of FIG. 2.

FIG. 10 is a graph showing recording density dependence of media noise on the soft magnetic underlayer films 116 formed at various Ar gas pressure. Now, description is made referring to FIGS. 2, and 10.

The perpendicular magnetizing films 118 with the soft magnetic underlayer films 116 formed under 1 or 4 mTorr had coercivity of 2800 Oe. The perpendicular magnetizing film 118 accompanying the soft magnetic underlayer films 116 formed under 20 mTorr had coercivity of 2000 Oe. All soft magnetic underlayer films 116 formed at 1, 4 and 20 mTorr had coercivity of 15 Oe.

The perpendicular magnetic recording media 110 with the soft magnetic underlayer films 116 formed at lower Ar pressure exhibited very low MN than those with the soft magnetic underlayer films 116 formed at higher Ar pressure. Such reduction of MN is believed to be caused by improvement of the surface smoothness of the soft magnetic underlayer film 116.

Figure 11:
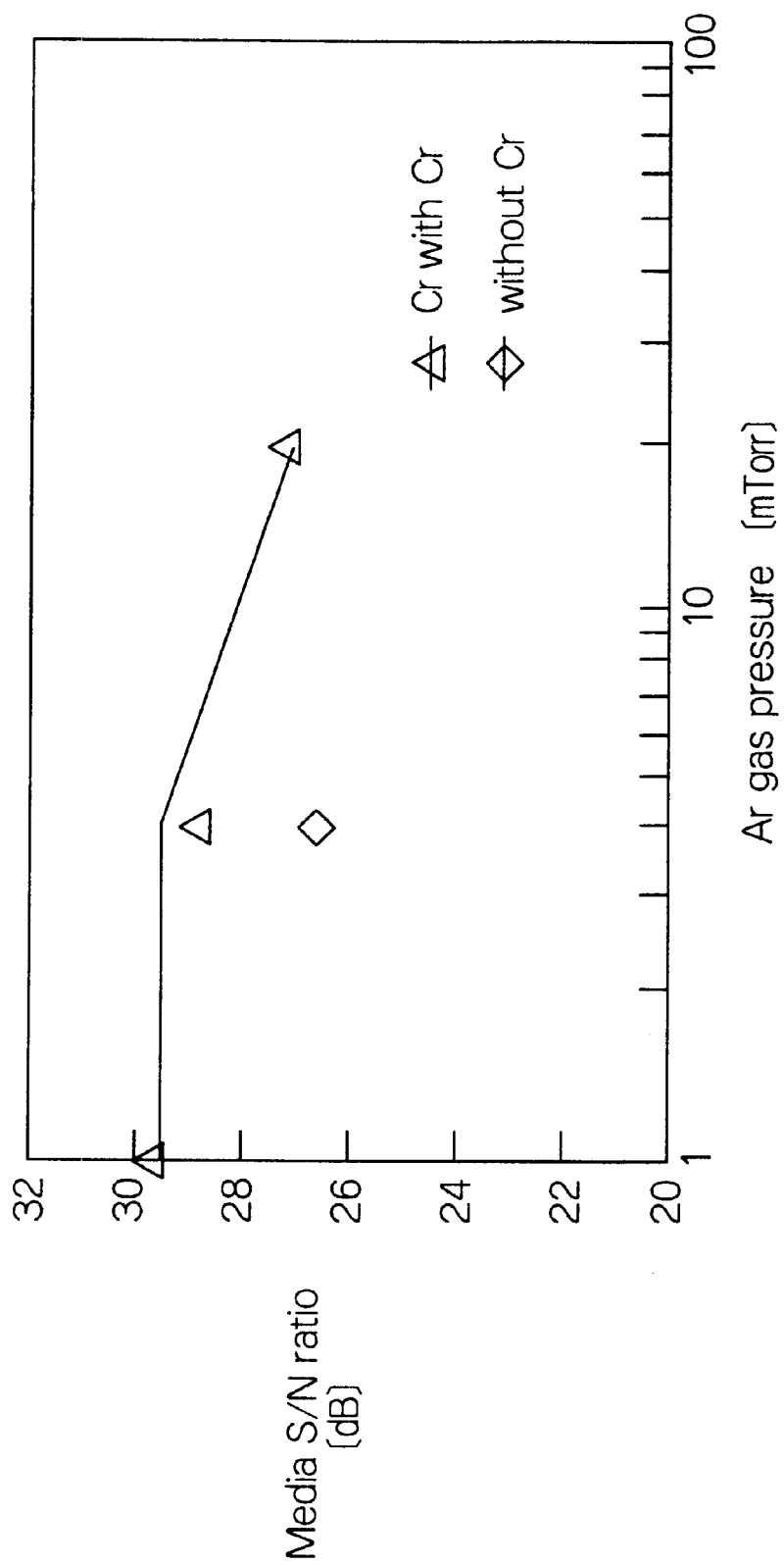
FIG. 11 is a graph showing Ar gas pressure dependence of media S/N ratio in the perpendicular magnetic recording of FIG. 2.

FIG. 11 is a graph showing Ar gas pressure dependence of media S/N ratio. Now, description is made referring to FIGS. 2, 11 and 15.

The perpendicular magnetic recording media 110 with the soft magnetic underlayer films 116 formed at lower Ar pressure had the media S/N ratio higher than those with the soft magnetic underlayer films formed at higher Ar pressure by about 3 dB. This is because, while the perpendicular magnetic recording medium 110 with the soft magnetic underlayer film 116 formed at 20 mTorr exhibited higher MN over a one with a soft magnetic underlayer film 116 sputtered under 1 of 4 mTorr, they had substantially same read output voltage. In addition, the perpendicular magnetic recording medium 110 with a Cr film had the media S/N ratio higher than the perpendicular magnetic recording medium 50 without a Cr film by about 3 dB.

Figure 12:
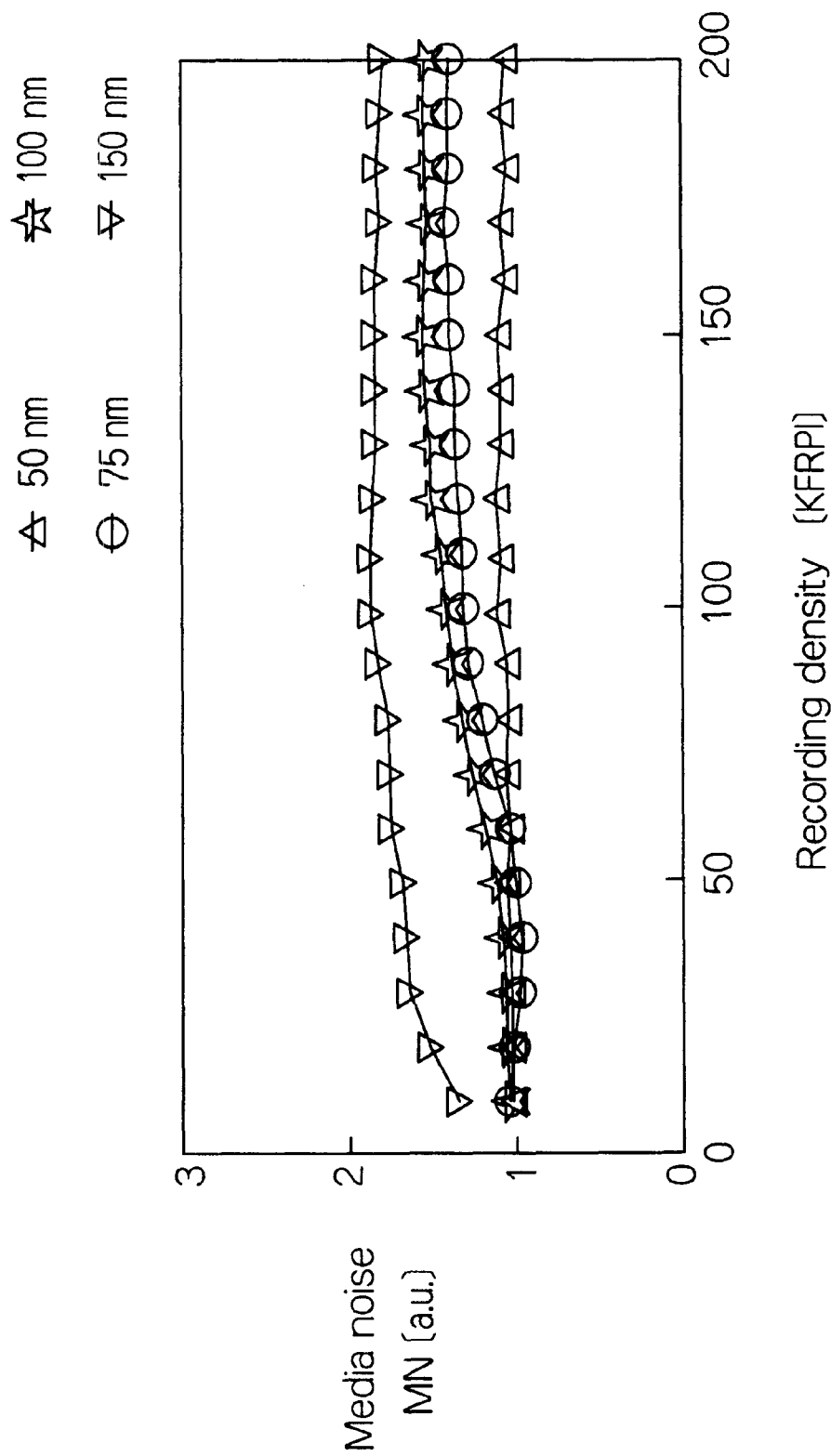
FIG. 12 is a graph showing recording density dependence of media noise on perpendicular magnetizing films with various film thickness in the perpendicular magnetic recording medium of FIG. 2.
Figures 13, 14:
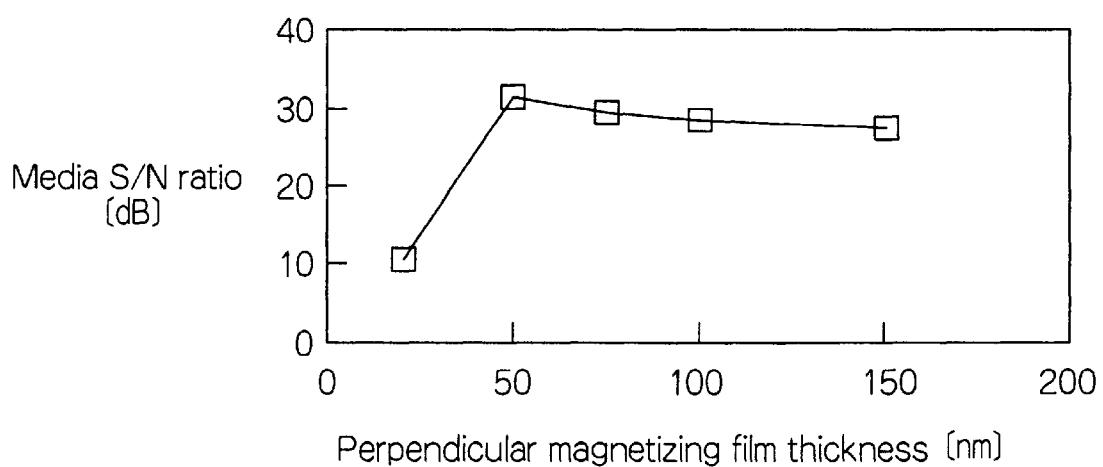
FIG. 13 is a table showing coercive force on perpendicular magnetizing films with various film thickness in the perpendicular magnetic recording medium of FIG. 2.
FIG. 14 is a graph showing perpendicular magnetic film thickness dependence of media S/N ratio in the perpendicular magnetic recording medium of FIG. 2.

FIG. 12 is a graph showing recording density dependence of media noise on perpendicular magnetizing films 118 with film thickness of 20 nm–150 nm. FIG. 13 is a table showing coercivity on perpendicular magnetizing films 118 with film thickness of 20 nm–150 nm. Now, description is made referring to FIGS. 2, 12, and 13.

Over all recording density, MN reduced as the film thickness of the perpendicular magnetizing film 118 reduced. Except for 50 nm, it was recognized that MN increased as the recording density increased. The 50 nm thickness is believed to be sufficiently thin to suppress growth of grain size on the surface which causes transition size. 20 nm thickness exhibited coercivity considerably lower than other four film thickness, and considerably higher NMN not depending on the recording density. In addition, a rocking curve of (001) diffraction was not able to be measured for the 20-nm thick perpendicular magnetizing film 118 because it was too weak. From these facts, it is believed that the perpendicular magnetizing film 118 with 20 nm thickness is made up mostly of an initial layer.

FIG. 14 is a graph showing perpendicular magnetic film thickness dependence of media S/N ratio. Now, description is made referring to FIGS. 2, and 14.

The media S/N ratio increases as the film thickness of perpendicular magnetizing film 118 reduces to 50 nm. The perpendicular magnetic recording medium 110 with the 50-nm thick perpendicular magnetizing film 118 exhibited higher media S/N ratio than that with the 150-nm thick perpendicular magnetizing film 118 by 4 dB. The perpendicular magnetic recording medium 110 with the 20-nm thick perpendicular magnetizing film 118 exhibited the media S/N ratio significantly lower than others.

Thus, the media S/N ratio increases, up to a predetermined film thickness, because MN decreases faster than the read output voltage as the perpendicular magnetizing film 118 decreases. However, the ratio of initial layer occupying the film thickness of the perpendicular magnetizing film 118 increases as the film thickness of the perpendicular magnetizing film 118 decreases. Thus, it is believed that, when the perpendicular magnetizing film 118 is thinner than the predetermined film thickness described above, the read output voltage is significantly reduced. That is, the initial layer thickness of the perpendicular magnetizing film 118 is at least 20 nm.

In addition, the perpendicular orientation of the perpendicular magnetizing film 118 is further improved by inserting a Ti film or non-magnetic CoCr film just under the perpendicular magnetizing film 118.

According to the perpendicular magnetic recording medium of the present invention and its manufacturing process, since the surface smoothness of the soft magnetic underlayer film can be significantly improved by inserting a Cr film between the substrate and the soft magnetic underlayer film, it is possible to improve the perpendicular orientation and the surface smoothness of the perpendicular magnetizing film. Therefore, it is possible to reduce the media noise, and to improve the recording density dependence of read output voltage.

In addition, a Ti film or non-magnetic CoCr film may be inserted between the soft magnetic underlayer film and the perpendicular magnetizing film, thereby being able to further improve the perpendicular orientation of the perpendicular magnetizing film.

Now, there is described embodiments and examples of the second perpendicular magnetic recording medium and its manufacturing process of the present inventions.

Figure 15:
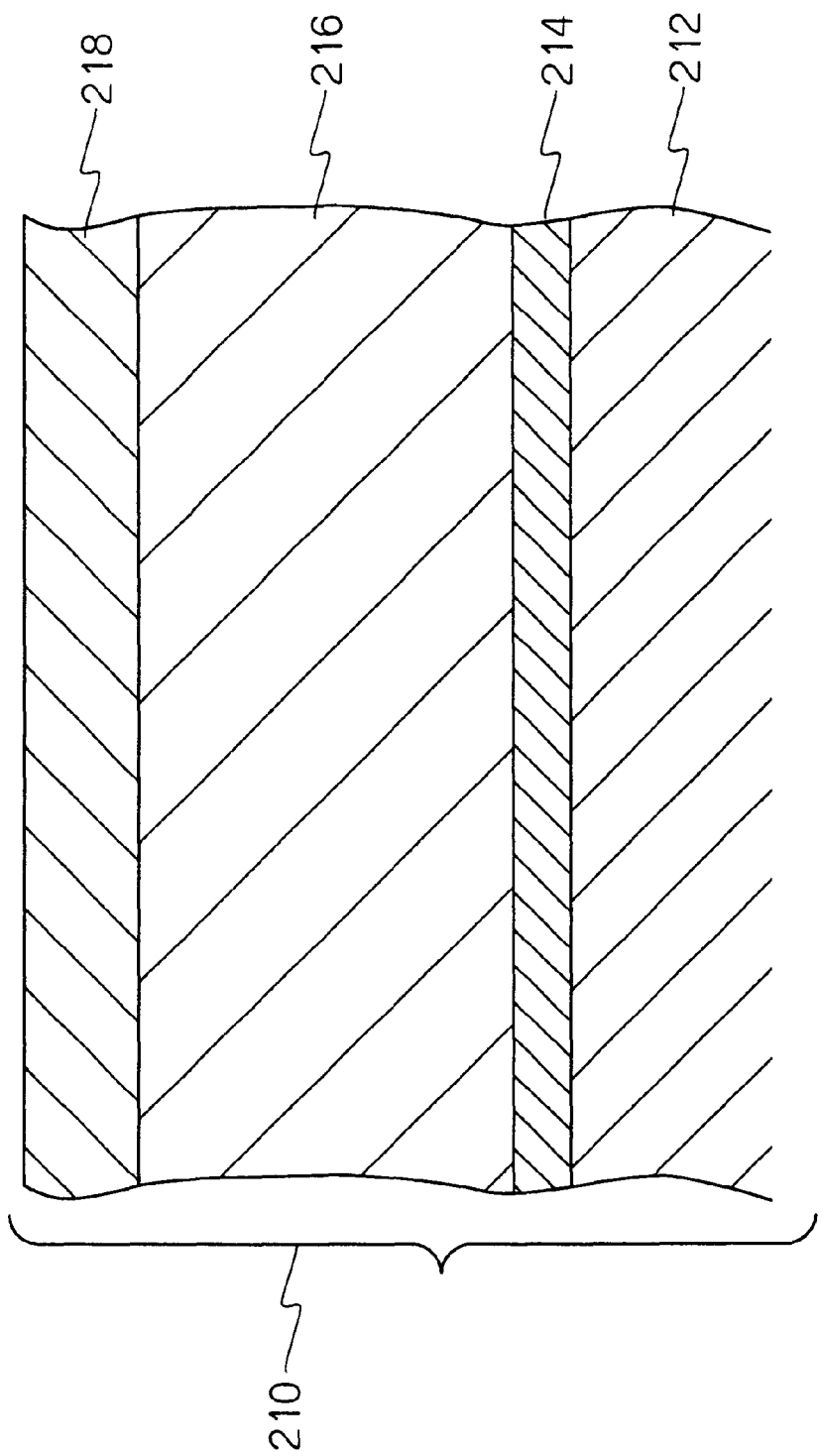
FIG. 15 is a schematic sectional view showing a first embodiment of a second perpendicular magnetic recording medium according to the present invention.

FIG. 15 is a schematic sectional view showing a first embodiment of a second perpendicular magnetic recording medium according to the present invention. Now, description is made referring to this figure.

The perpendicular magnetic recording medium 210 of the embodiment is formed by forming a smoothness control film 214, a soft magnetic underlayer film 216, and a perpendicular magnetizing film 218 on a substrate 212 in this order. The smoothness control film 214 is, for example a C film, a Ti film or an alloy film containing at least one of C, Ti and Cr. The soft magnetic underlayer film 216 is, for example, a FeSiAl film or an FeTaN film. The perpendicular magnetizing film 218 is, for example, a CoCrTa film. The smoothness control film 214 acts to improve the surface smoothness of the soft magnetic underlayer film 216, and the surface smoothness and perpendicular orientation of the perpendicular magnetizing film 218.

Examples of the present invention are described in the following. In the following, the perpendicular magnetic recording medium is called merely a "medium," the perpendicular magnetic recording medium according to the present invention an "inventive medium," the perpendicular magnetic recording medium for comparison a "comparative medium." In addition, "surface roughness Ra" means average roughness on centerline on the film surface.

Example 1

C films with thickness of 10 nm and 20 nm were formed on a 2.5-inch glass substrate using a C (3N) target with diameter of 6 inches by the sputtering process. Film formation conditions were supplied voltage 0.5 kW, argon gas pressure 4 mTorr and film formation speed 3 nm/sec under initial vacuum $5 \times 10^{-7}$ mTorr. Then, an FeSiAl film was formed in 520 nm on each medium under the same film formation conditions using a $Fe_{85}Si_{9.6}Al_{5.4}$ (wt %) target with diameter of 6 inches. Subsequently, a CoCrTa film was formed in 100 nm on each medium under the same film formation conditions using a $Co_{78}Cr_{19}Ta_3$ (at %) target. Here, media inserted with the 10-nm C film and the 20-nm C film are called the inventive medium A1 and the comparative medium A2, respectively.

A half-width value of rocking curve ($\Delta\theta_{50}$) of hcp (002) peak was determined by using the X-ray diffraction to investigate perpendicular orientation of the perpendicular magnetizing films of the inventive medium Al and the comparative medium A2. FIG. 16 shows surface roughness Ra of each medium together with their values. It can be seen that the surface smoothness of C film is significantly improved by reducing the thickness of C film, which in turn can improve the surface roughness of the FeSiAl film. Then, it can be seen that, as the surface smoothness of the FeSiAl film is improved, the half-width value of rocking curve of hcp (002) peak of the CoCrTa film is reduced from 7.1 to 4.2, leading to improvement of the perpendicular orientation and surface smoothness of the perpendicular magnetizing film.

The inventive medium A1 and the comparative medium A2 were experimented for read and write by an ID/MR composite head. Here, the recording track width was 4 µm, the read track width was 3 µm, the recording gap length was 0.4 µm, and the read gap length was 0.32 µm. In addition, evaluation was conducted under the conditions of recording current 10 mAop, sense current 12 mA, linear velocity 12.7 m/s, flying height 45 nm, and noise band 45 MHz.

Figure 17:
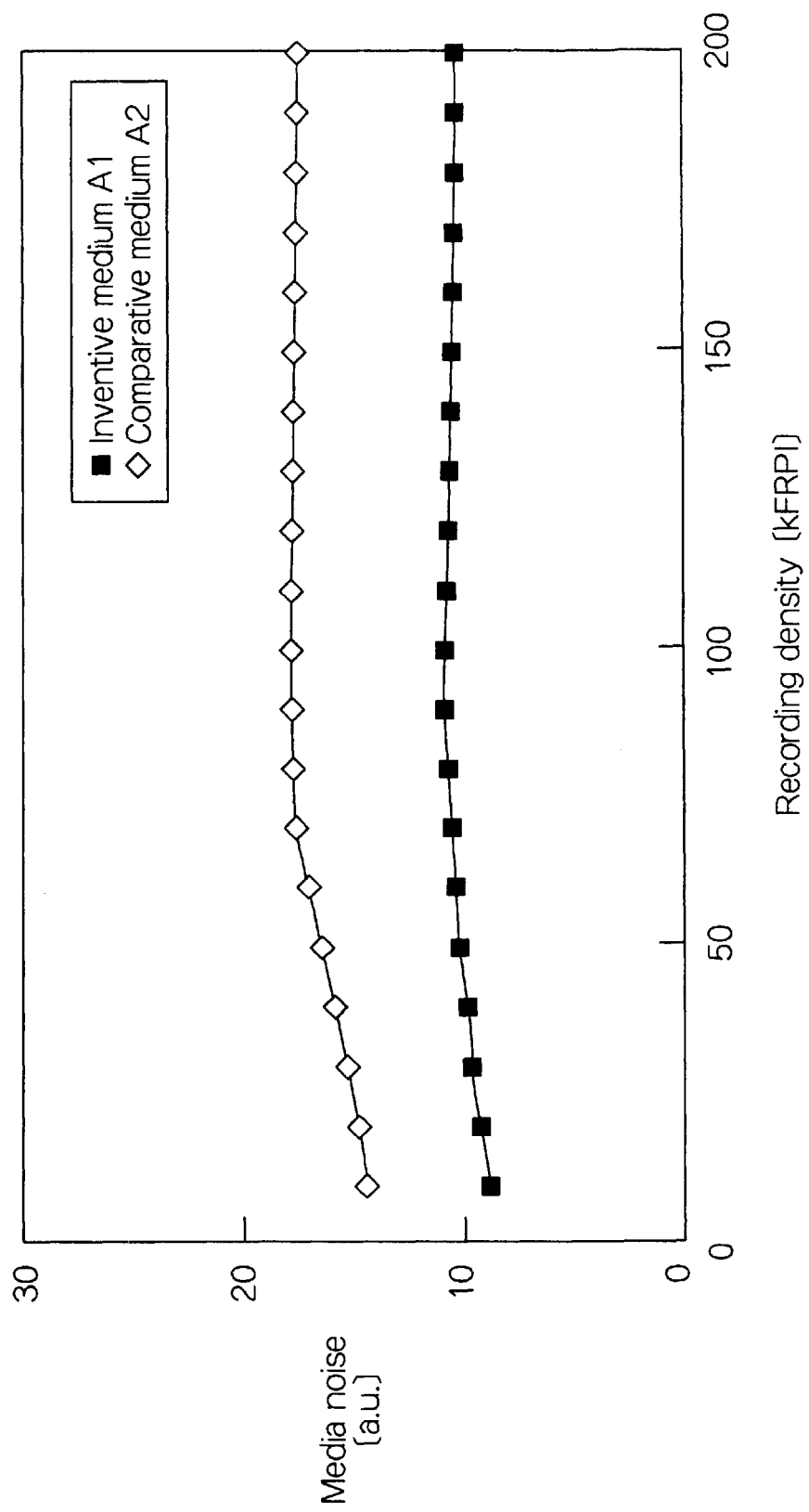
FIG. 17 is a graph showing recording density dependence of media noise in example 1 of the perpendicular magnetic recording medium of FIG. 15.

FIG. 17 shows recording density dependence of media noise. It can be seen that the inventive medium A1 has very excellent noise characteristics because it has lower media noise in all recording densities than the comparative medium A2. It is believed that, as the surface smoothness is improved for the FeSiAl film by reducing the film thickness of the C film, the thickness of the initial layer of the perpendicular magnetizing film can be reduced, so that low noise can be attained. The FeSiAl film has an advantage that noise due to movement of a domain wall hardly occurs because inherently the domain structure is hardly detected.

Figure 18:
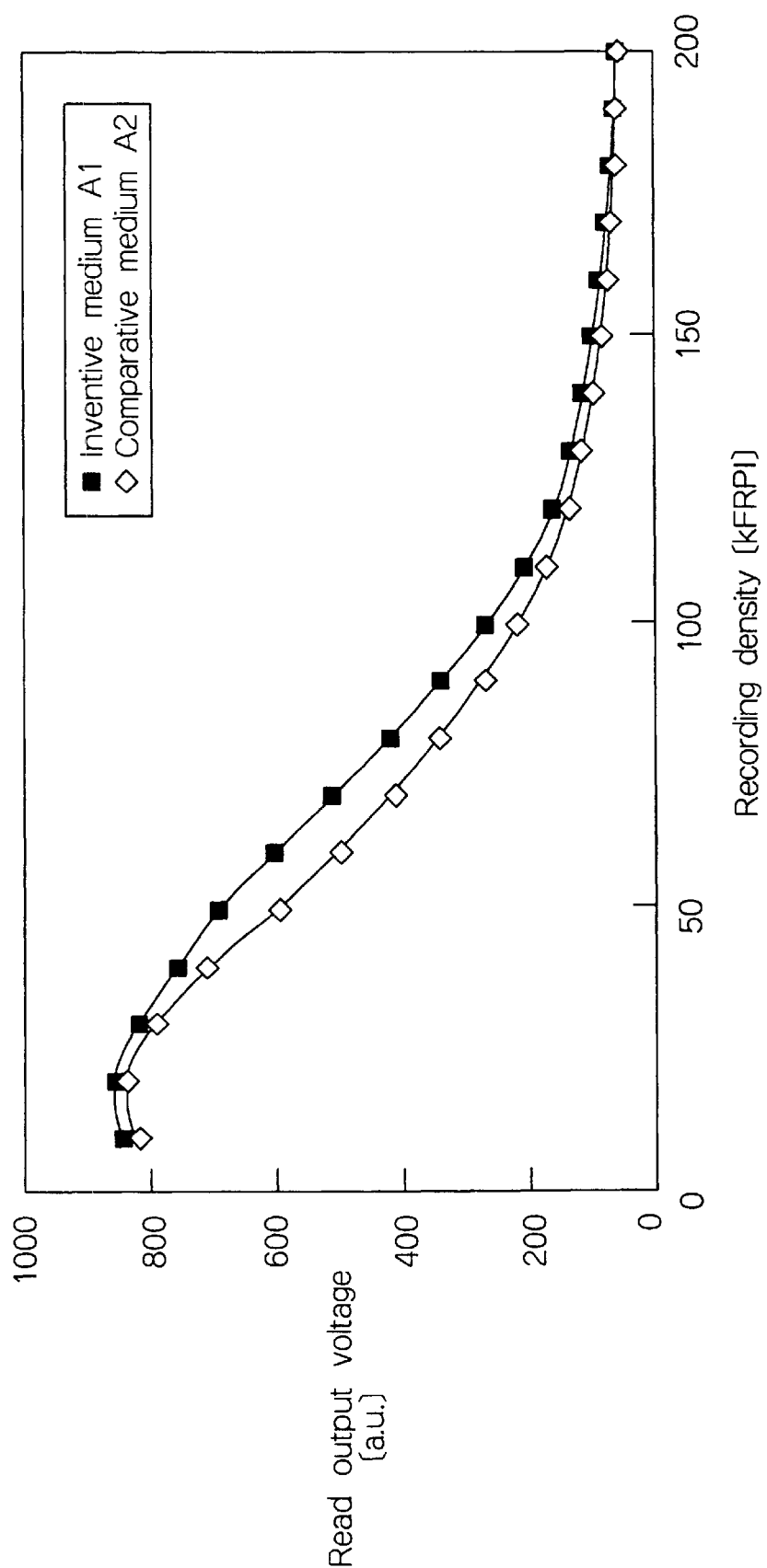
FIG. 18 is a graph showing recording density dependence of read output voltage in example 1 of the perpendicular magnetic recording medium of FIG. 15.

FIG. 18 shows recording density dependence of read output voltage. Since, in the inventive medium A1, attenuation of output as the recording density increases delays than the comparative medium A2, high output can be maintained to higher recording density, so that higher recording density can be easily attained. As shown in FIG. 16, it is believed that improvement of perpendicular orientation of the perpendicular magnetizing film leads to improvement of the recording density dependence of output.

Figure 19:
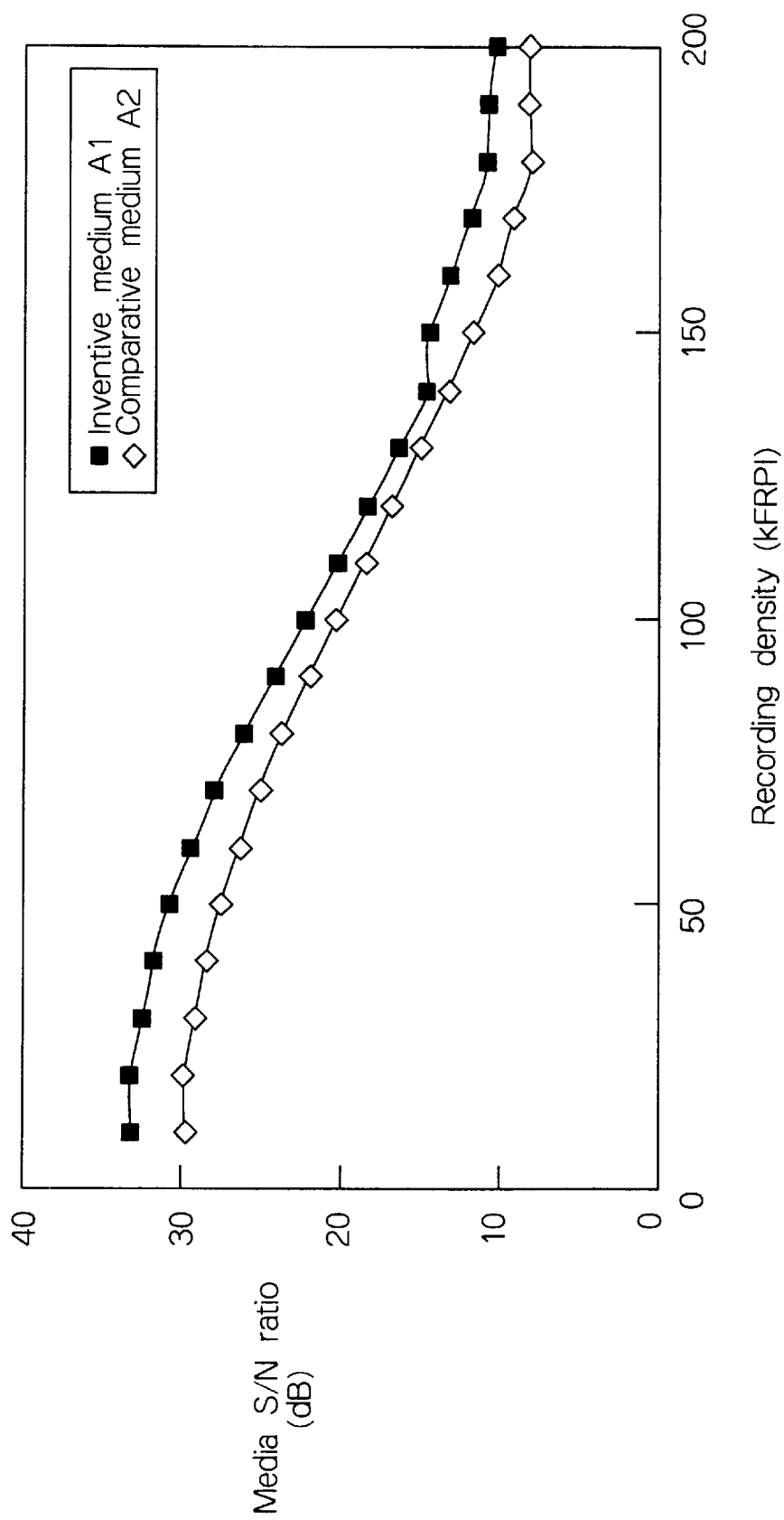
FIG. 19 is a graph showing recording density dependence of media S/N ratio in example 1 of the perpendicular magnetic recording medium of FIG. 15.

FIG. 19 shows recording density dependence of media S/N ratio. It can be seen that the inventive medium A1 has better media S/N ratio in all recording densities than the comparative medium A2 by 1–3 dB, so that it is an excellent medium as a magnetic disk medium accommodating the high recording density. That is, high recording density can be easily attained by using the inventive medium A1.

Figure 21:
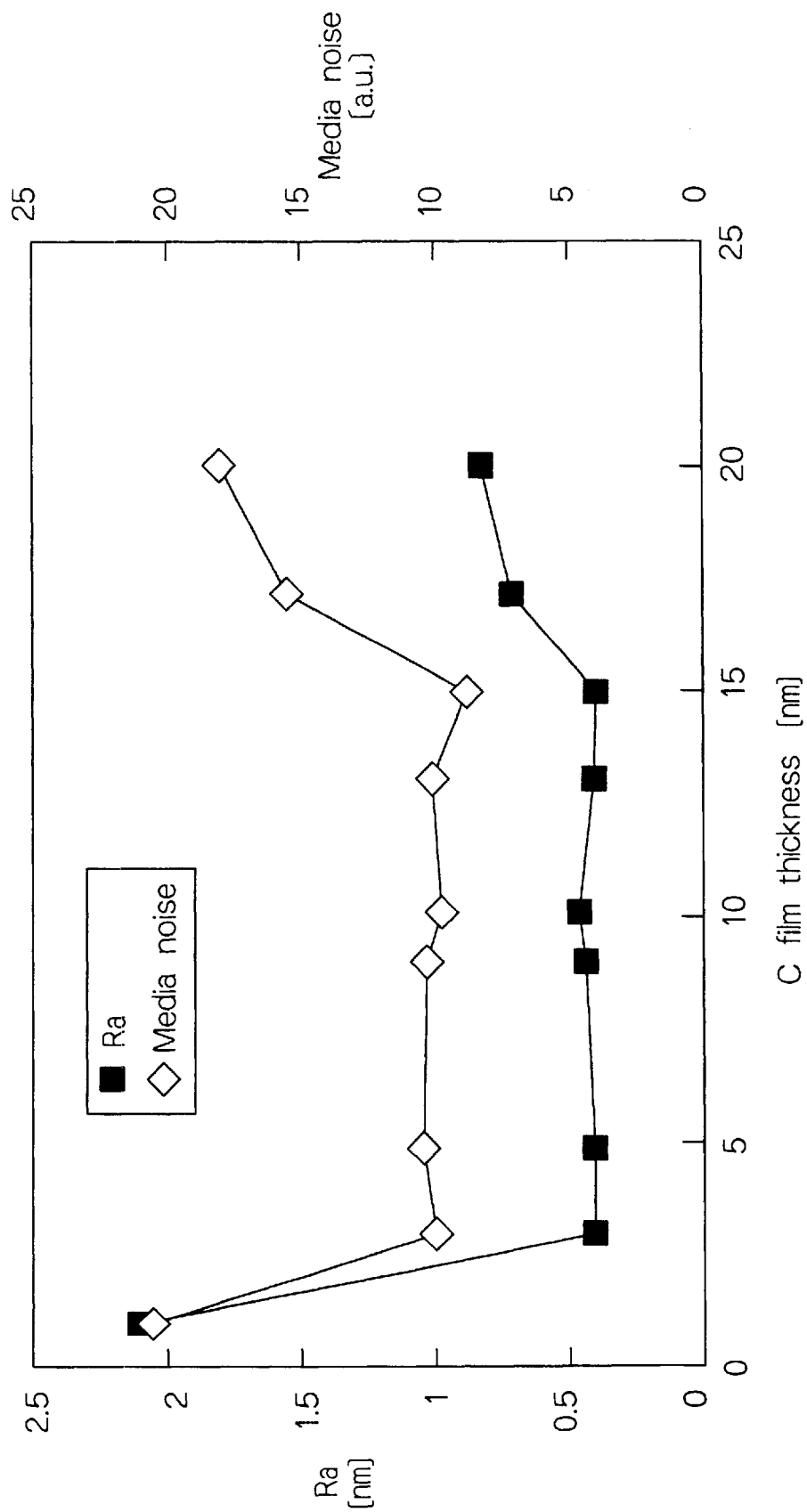
FIG. 21 is a graph showing relationship of film thickness and Ra of C film, and media noise in example 1 of the perpendicular magnetic recording medium of FIG. 15.

FIGS. 20 and 21 show a relationship between the film thickness and surface roughness Ra of the C film, and the media noise when the C film thickness varies between 1–20 nm. It can be seen that Ra rapidly increases if the film thickness of C film exceeds 15–17 nm. It is believed because there arises disturbance in the surface smoothness as crystal grains grow on the film surface when the film thickness exceeds 15–17 nm. Then, rapid increase is observed in the media noise accordingly. In addition, Ra would increase if the film thickness of Cr film were made too thin to 1–2 nm. It is believed that a uniform film is not formed on the substrate at the film thickness of 1–2 nm, so that an island structure may be caused to degrade the surface smoothness. Increase of media noise is also observed according to it.

Example 2

Media using Ti in place of C in example 1 are called an inventive medium B1 and a comparative medium B2, respectively.

A half-width value of rocking curve ($\Delta\theta_{50}$) of hcp (002) peak was determined by using the X-ray diffraction similar to example 1 to investigate perpendicular orientation of the perpendicular magnetizing film of the inventive medium B1 and the comparative medium B2, FIG. 22 shows surface roughness Ra of each medium together with their values. As seen from FIG. 22, the surface smoothness of Ti film is significantly improved by reducing the thickness of Ti film, whereby the surface roughness of FeSiAl film can be improved. Then, it can be seen that, as the surface smoothness of the FeSiAl film is improved, the half-width value of rocking curve of hcp (002) peak of the CoCrTa film is reduced from 7.5 to 4.6, leading to improvement of the perpendicular orientation and surface smoothness of the perpendicular magnetizing film.

Figure 23:
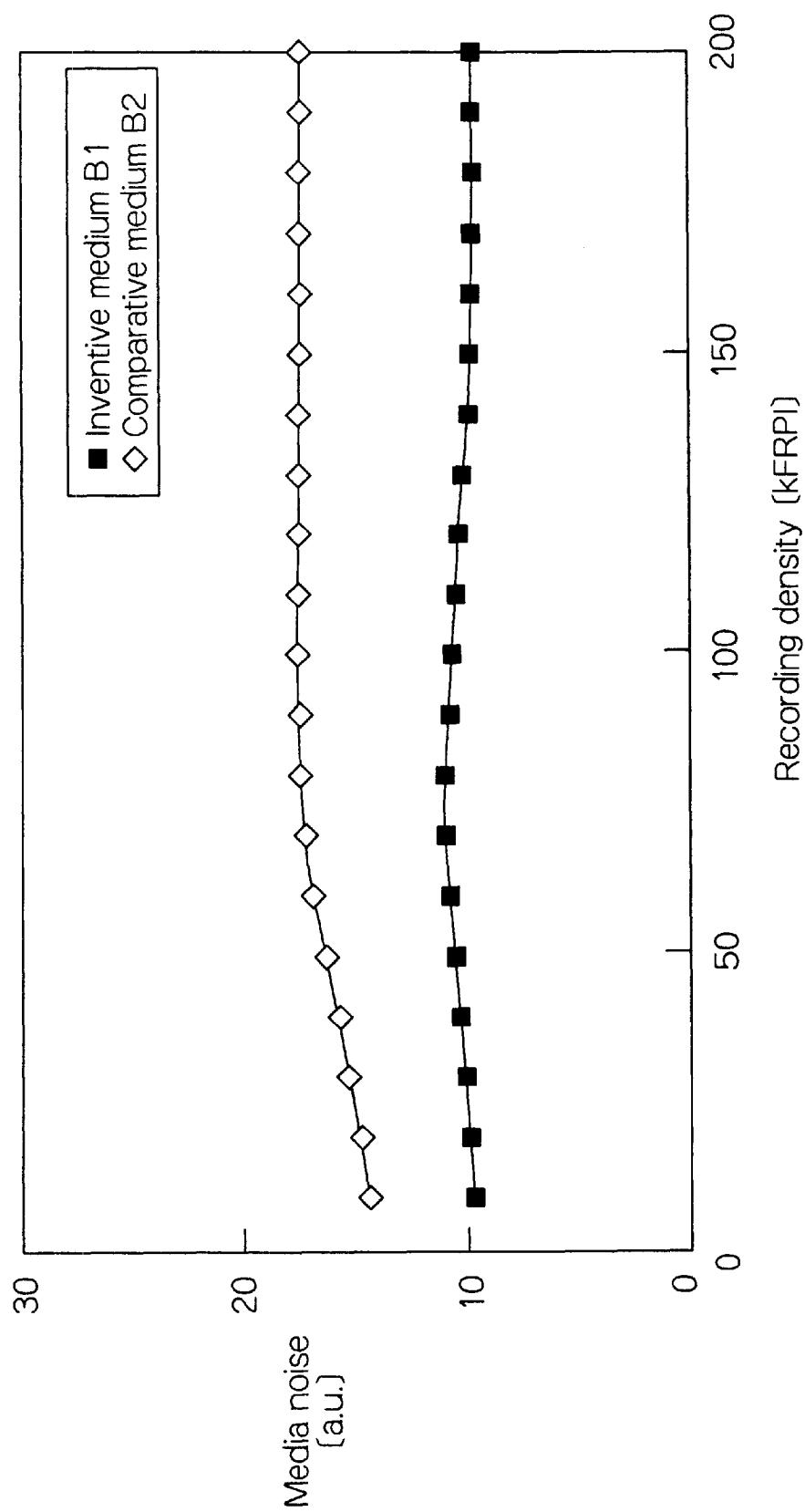
FIG. 23 is a graph showing recording density dependence of media noise in example 2 of the perpendicular magnetic recording medium,of FIG. 15.

The inventive medium B1 and the comparative medium B2 were experimented for read and write by an ID/MR composite head similar to example 1. FIG. 23 shows recording density dependence of media noise. It can be seen that, similar to example 1, the inventive medium B1 has very excellent noise characteristics because it has lower media noise in all recording densities than the comparative medium B2. That is, it is believed that, as the surface smoothness is improved for the FeSiAl film by reducing the film thickness of the Ti film, the thickness of the initial layer of the perpendicular magnetizing film can be reduced, so that low noise can be attained.

Figure 24:
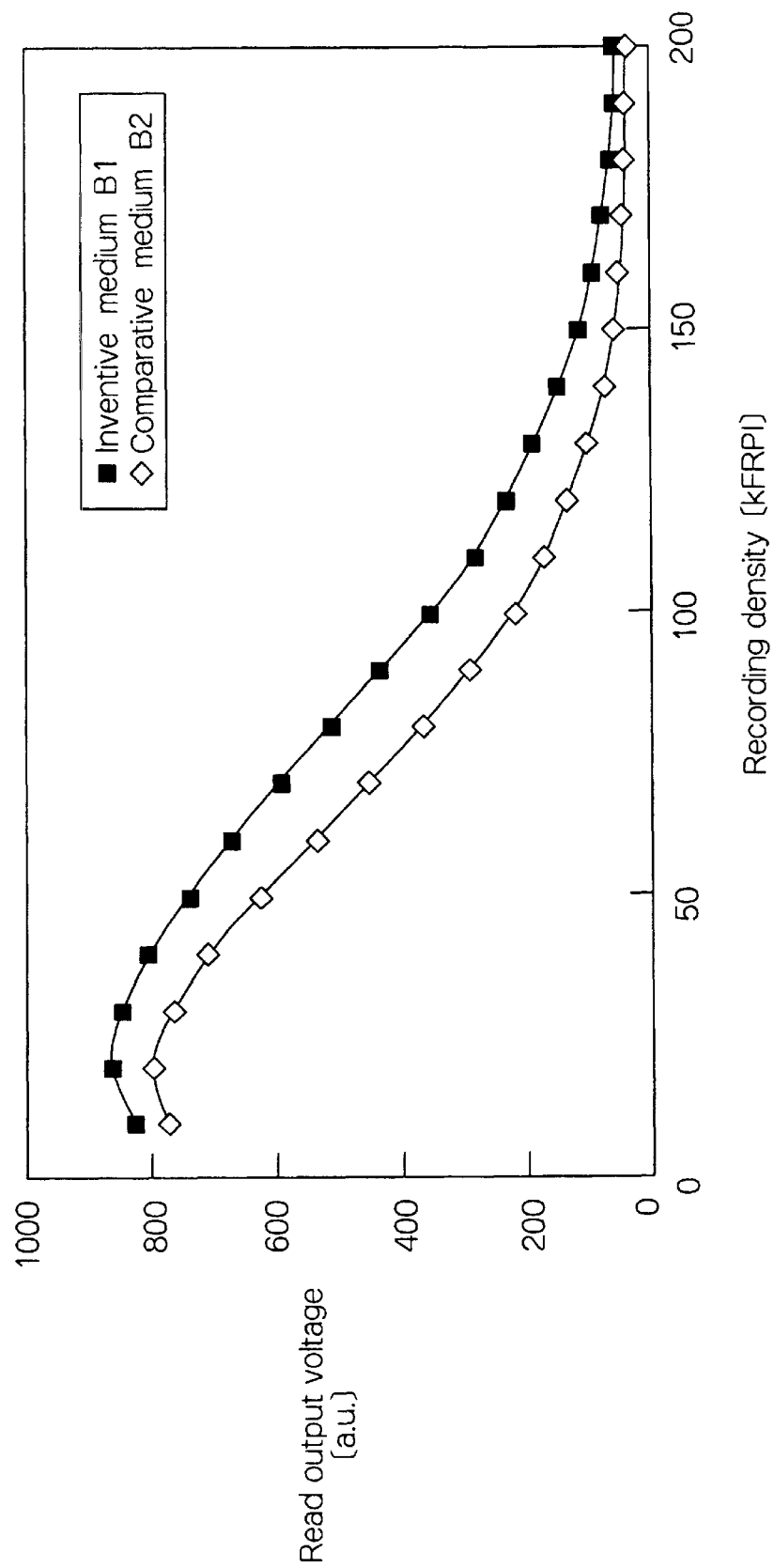
FIG. 24 is a graph showing recording density dependence of read output voltage in example 2 of the perpendicular magnetic recording medium of FIG. 15.

FIG. 24 shows recording density dependence of read output voltage. Similar to example 1, since, in the inventive medium B1, attenuation of output as the recording density increases delays than the comparative medium B2, high output can be maintained to higher recording density, so that higher recording density can be easily attained. As shown in FIG. 22, it is believed that improvement in perpendicular orientation of the perpendicular magnetizing film leads to improvement of recording density dependence of output.

Figure 25:
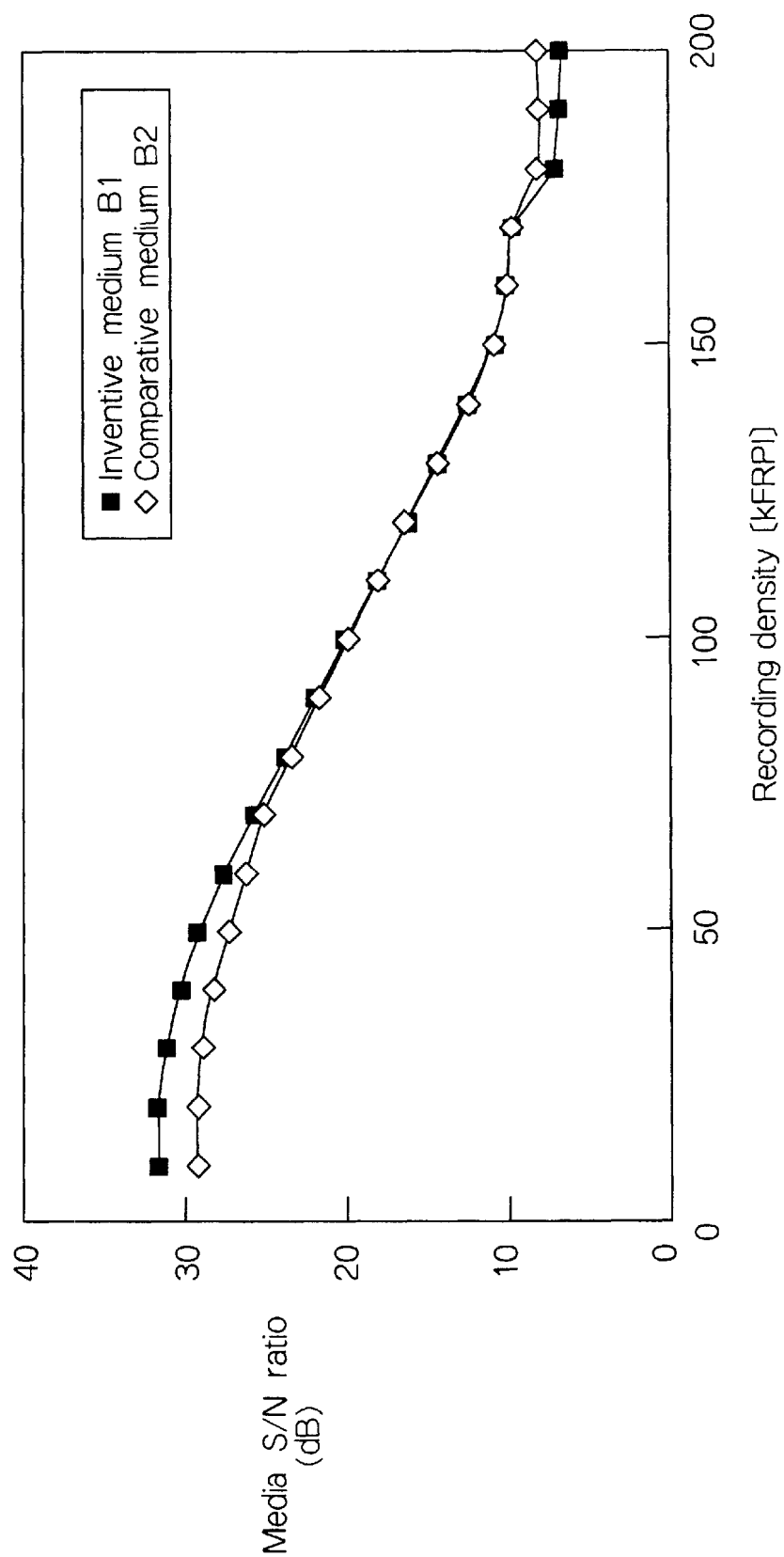
FIG. 25 is a graph showing recording density dependence of media S/N ratio in example 2 of the perpendicular magnetic recording medium of FIG. 15.

FIG. 25 shows recording density dependence of media S/N ratio. Similar to example 1, it can be seen that the inventive medium B1 has better media S/N ratio in all recording densities than the comparative medium A2 by 1–2 dB, so that it is an excellent medium as a magnetic disk medium accommodating the high recording density. That is, high recording density can be easily attained by using the inventive medium B1.

Figure 27:
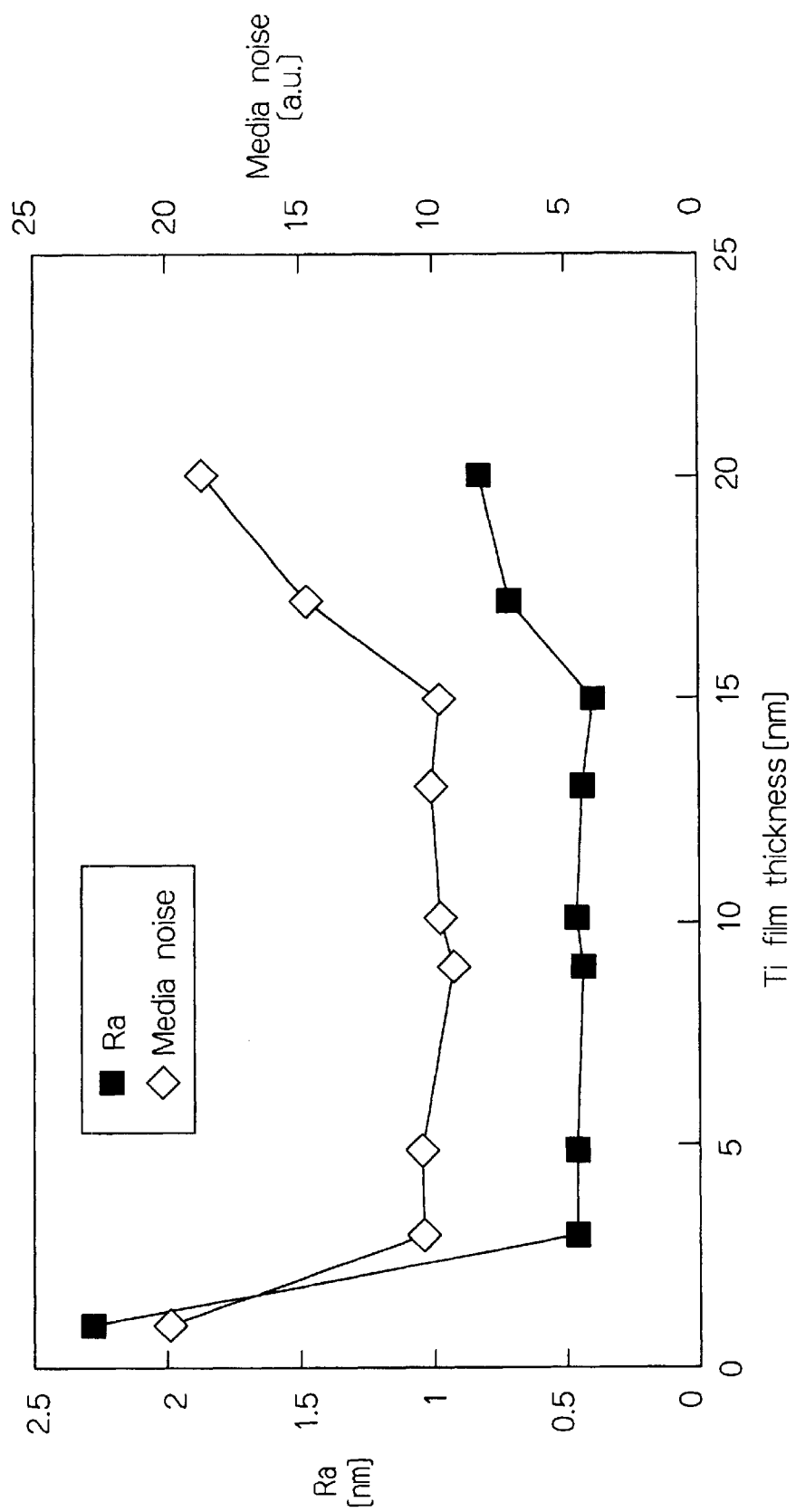
FIG. 27 is a graph showing relationship of film thickness and Ra of Ti film, and media noise in example 2 of the perpendicular magnetic recording medium of FIG. 15.

FIGS. 26 and 27 show a relationship between the film thickness and surface roughness Ra of the Ti film, and the media noise when the Ti film thickness varies between 1–20 nm. It can be seen that Ra rapidly increases if the film thickness of Ti film exceeds 15–17 nm. It is believed because there arises disturbance in the surface smoothness as crystal grains grow on the film surface when the film thickness exceeds 15–17 nm. Then, rapid increase is observed in the media noise accordingly. In addition, Ra would increase if the film thickness of Ti film is made too thin to 1–2 nm. It is believed that a uniform film is not formed on the substrate at the film thickness of 1–2 nm, so that an island structure may be caused to degrade the surface smoothness. Increase of media noise is also observed according to it.

Example 3

Media using $Cr_{80}Ti_{10}C_{10}$ (at %) in place of C in example 1 are called an inventive medium C1 and a comparative medium C2, respectively.

A half-width value of rocking curve ($\Delta\theta_{50}$) of hcp (002) peak was determined by using the X-ray diffraction similar to example 1 to investigate perpendicular orientation of the perpendicular magnetizing film of the inventive medium C1 and the comparative medium C2, FIG. 28 shows surface roughness Ra of each medium together with their values. As seen from FIG. 28, the surface smoothness of Ti film is significantly improved by reducing the thickness of Ti film, whereby the surface roughness of FeSiAl film can be improved. Then, it can be seen that, as the surface smoothness of the FeSiAl film is improved, the half-width value of rocking curve of hcp (002) peak of the CoCrTa film is reduced from 7.0 to 4.2, leading to improvement of the perpendicular orientation and surface smoothness of the perpendicular magnetizing film.

Figure 29:
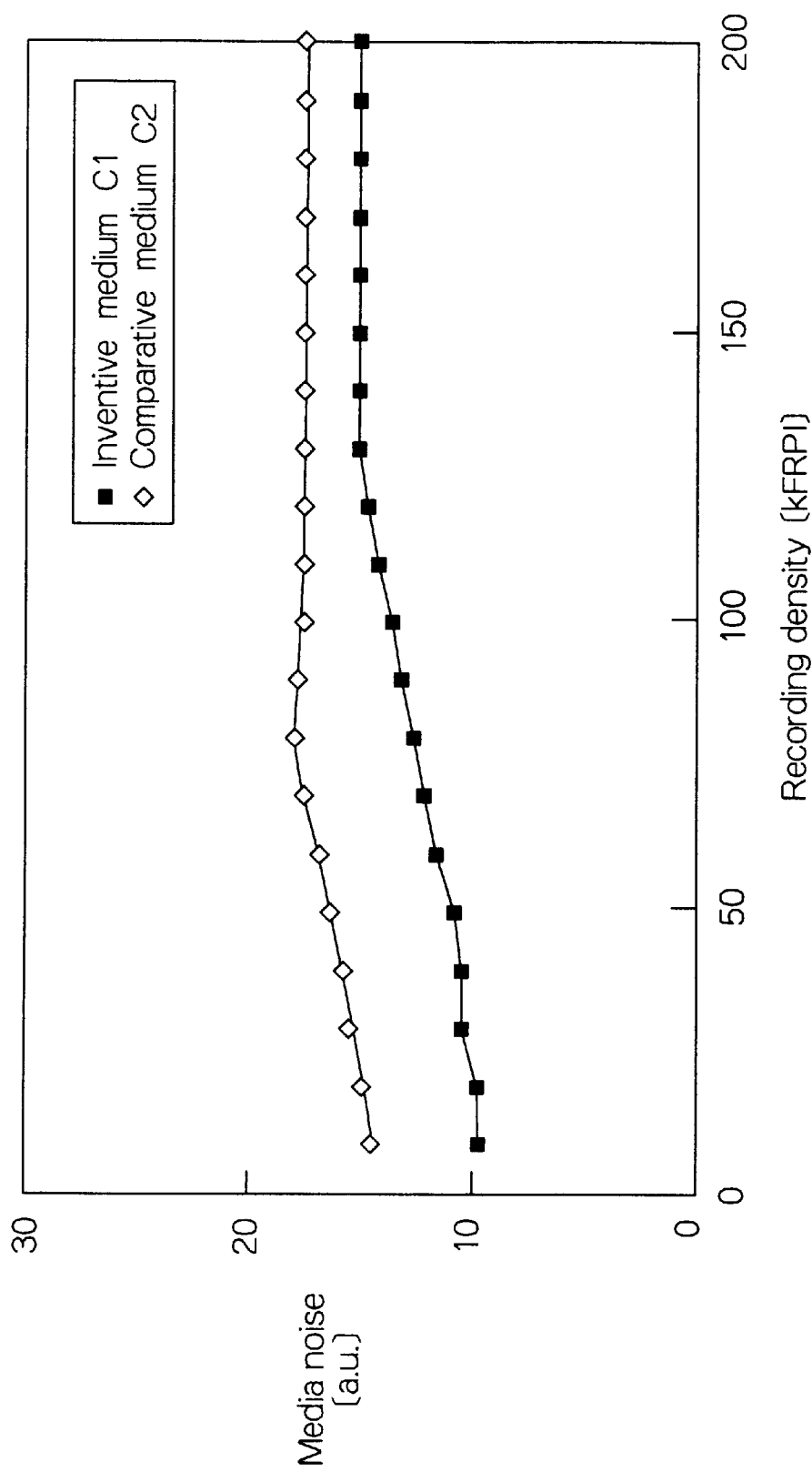
FIG. 29 is a graph showing recording density dependence of media noise in example 3 of the perpendicular magnetic recording medium of FIG. 15.

The inventive medium C1 and the comparative medium C2 were experimented for read and write by an ID/MR composite head. FIG. 29 shows recording density dependence of media noise. It can be seen that, similar to example 1, the inventive medium C1 has very excellent noise characteristics because it has lower media noise in all recording densities than the comparative medium C2. That is, it is believed that, as the surface smoothness is improved for the FeSiAl film by reducing the film thickness of the CrTiC film, the thickness of the initial layer of the perpendicular magnetizing film can be reduced, so that low noise can be attained.

Figure 30:
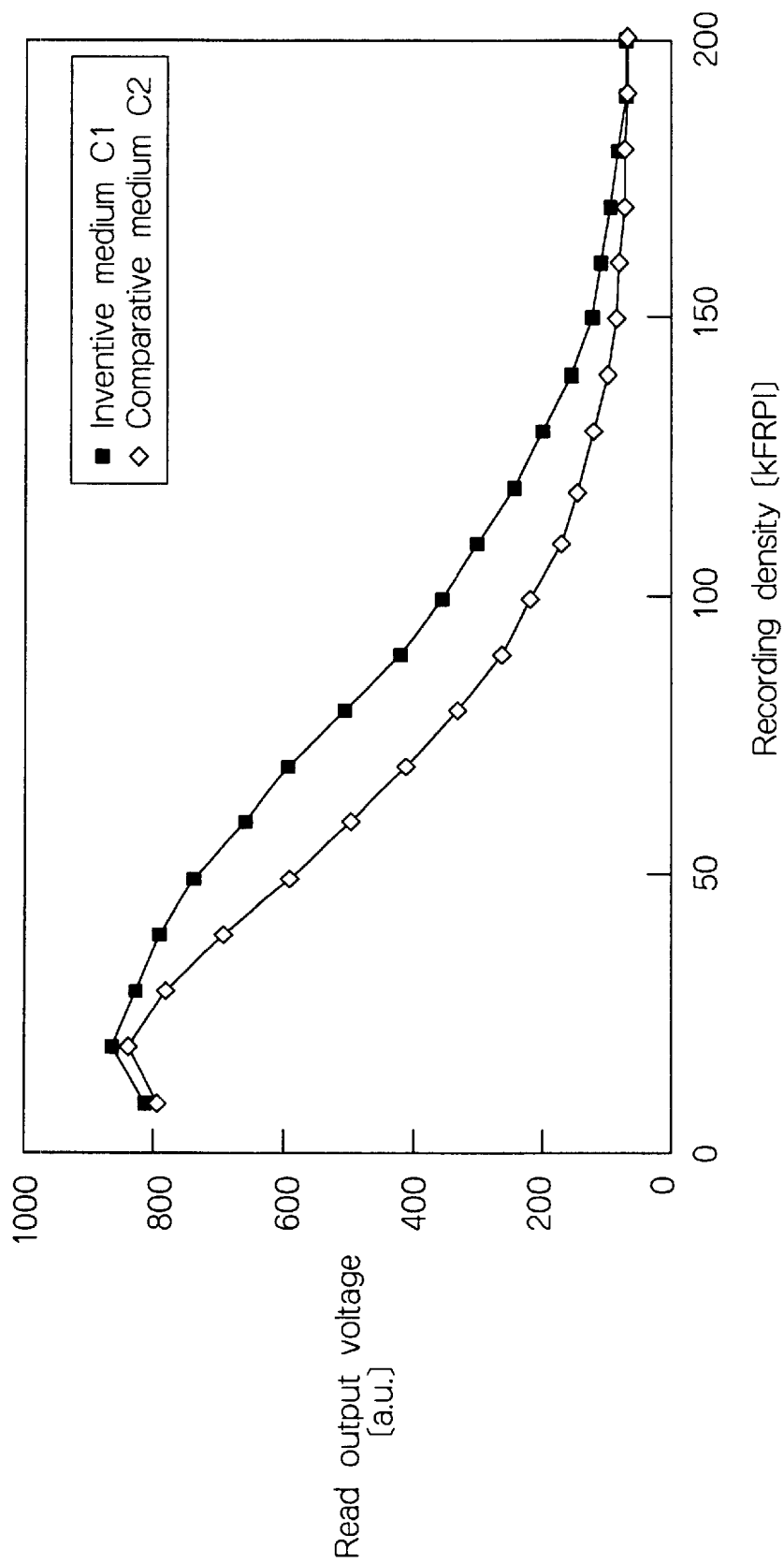
FIG. 30 is a graph showing recording density dependence of read output voltage in example 3 of the perpendicular magnetic recording medium of FIG. 15.

FIG. 30 shows recording density dependence of read output voltage. Similar to example 1, since, in the inventive medium C1, attenuation of output as the recording density increases delays than the comparative medium C2, high output can be maintained to higher recording density, so that higher recording density can be easily attained. As shown in FIG. 28, it is believed that improvement in perpendicular orientation of the perpendicular magnetizing film leads to improvement of recording density dependence of output.

Figure 31:
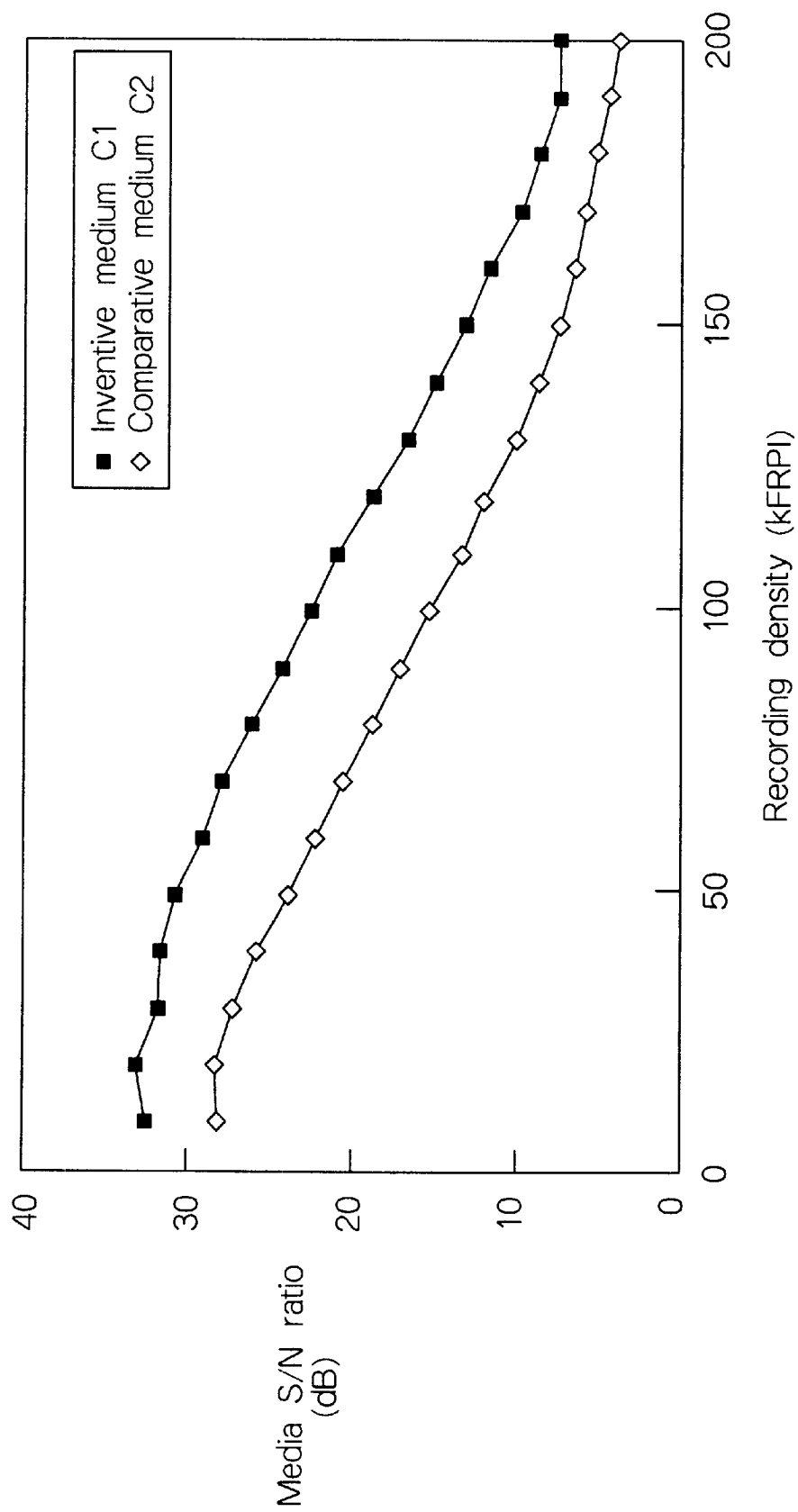
FIG. 31 is a graph showing recording density dependence of media S/N ratio in example 3 of the perpendicular magnetic recording medium of FIG. 15.

FIG. 31 shows recording density dependence of media S/N ratio. Similar to example 1, it can be seen that the inventive medium C1 has better media S/N ratio in all recording densities than the comparative medium C2 by 3–8 dB, so that it is an excellent medium as a magnetic disk medium accommodating the high recording density. That is, high recording density can be easily attained by using the inventive medium C1.

Figure 33:
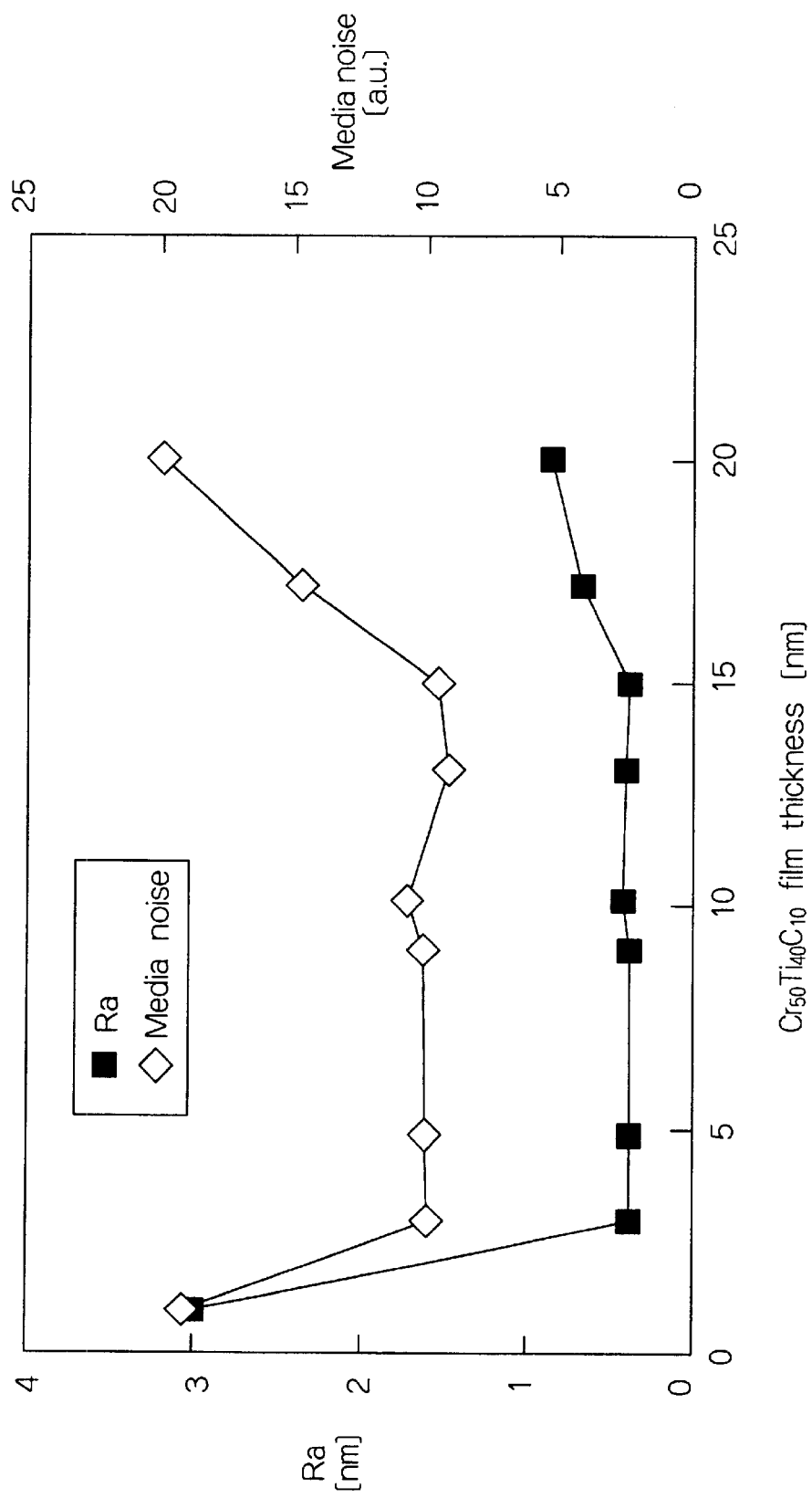
FIG. 33 is a graph showing relationship of film thickness and Ra of $Cr_{50}Ti_{40}C_{10}$ film, and media noise in example 3 of the perpendicular magnetic recording medium of FIG. 15.

FIGS. 32 and 33 show a relationship between the film thickness and surface roughness Ra of the CrTiC film, and the media noise when the CrTiC film thickness varies between 1–20 nm. It can be seen that Ra rapidly increases if the film thickness of CrTiC film exceeds 15–17 nm. It is believed because there arises disturbance in the surface smoothness as crystal grains grow on the film surface when the film thickness exceeds 15–17 nm. Then, rapid increase is observed in the media noise accordingly. In addition, Ra would increase if the film thickness of CrTiC film is made too thin to 1–2 nm. It is believed that a uniform film is not formed on the substrate at the film thickness of 1–2 nm, so that an island structure may be caused to degrade the surface smoothness. Increase of media noise is also observed according to it.

Example 4

Media using a 10-nm $Cr_{80}Ti_{20}$ (at %) film in place of the 10-nm C film in example 1, with the $Cr_{80}Ti_{20}$ film and an FeSiAl film formed at supplied power at film formation 0.5 kW (film formation speed 13 nm/s) and 1 kW (film formation speed 25 nm/s) are called an inventive medium D1 and a comparative medium D2, respectively.

A half-width value of rocking curve ($\Delta\theta_{50}$) of hcp (002) peak was determined by using the X-ray similar to example 1 diffraction to investigate perpendicular orientation of the perpendicular magnetizing film of the inventive medium D1 and the comparative medium D2, FIG. 34 shows surface roughness Ra of each medium together with their values. As seen from FIG. 34, the surface smoothness of $Cr_{80}Ti_{20}$ and FeSiAl films is significantly improved by reducing the supplied power at film formation of $Cr_{80}Ti_{20}$ and FeSiAl films. Then, it can be seen that, as the surface smoothness of the FeSiAl film is improved, the half-width value of rocking curve of hcp (002) peak of the CoCrTa film is reduced from 10.2 to 4.1, leading to improvement of the perpendicular orientation and surface smoothness of the perpendicular magnetizing film.

Figure 35:
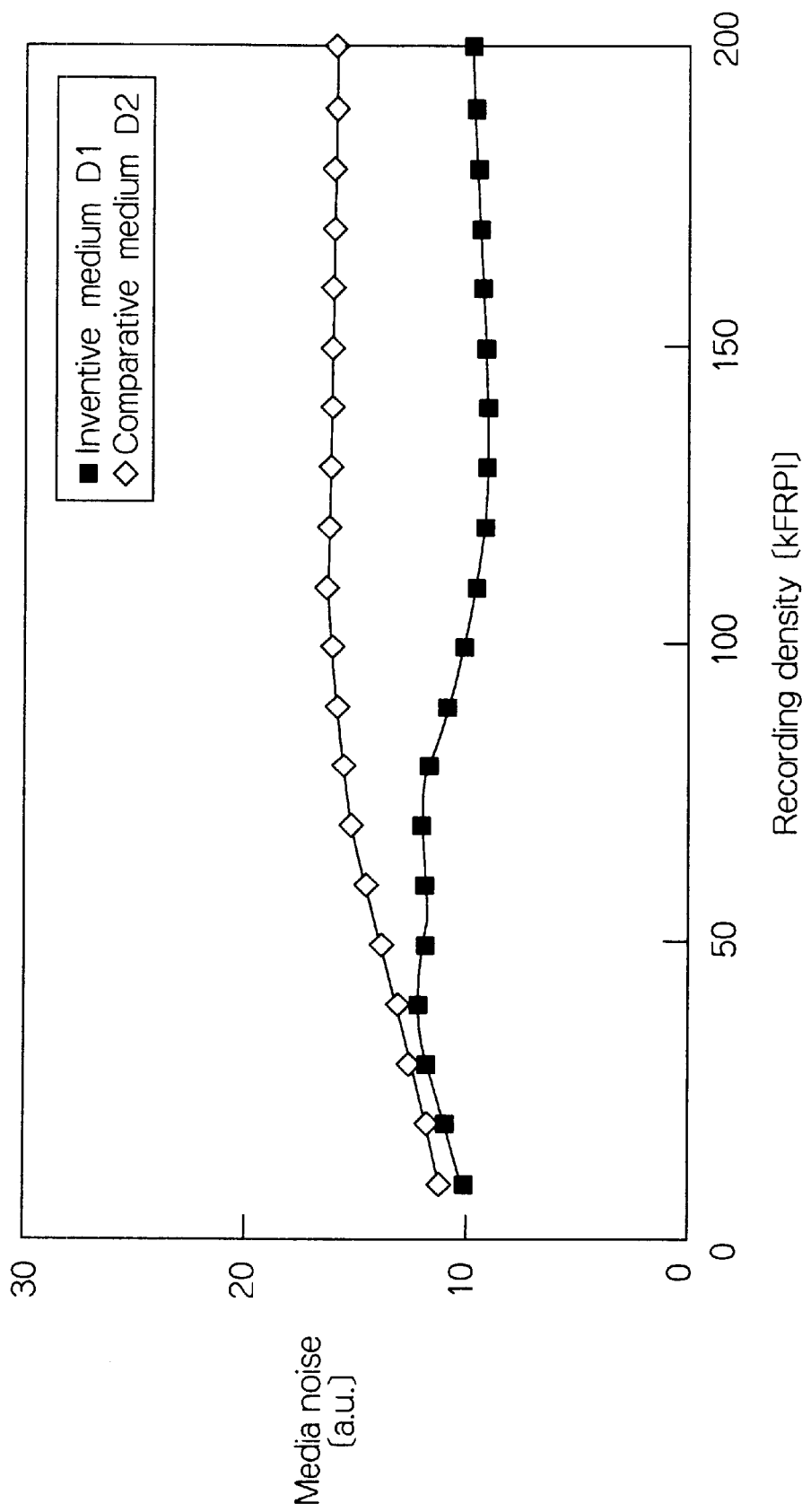
FIG. 35 is a graph showing recording density dependence of media noise in example 4 of the perpendicular magnetic recording medium of FIG. 15.

The inventive medium D1 and the comparative medium D2 were experimented for read and write similar to example 1 by an ID/MR composite head. FIG. 35 shows recording density dependence of media noise. From the above, it can be seen that the inventive medium D1 has low media noise in all recording densities, and is very excellent noise characteristics than the comparative D2. That is, it is believed that, as the surface smoothness is improved for the $Cr_{80}Ti_{20}$ and FeSiAl film by reducing the supplied power at film formation of the $Cr_{80}Ti_{20}$ and FeSiAl films, so that low noise can be attained similar to example 1.

Figure 36:
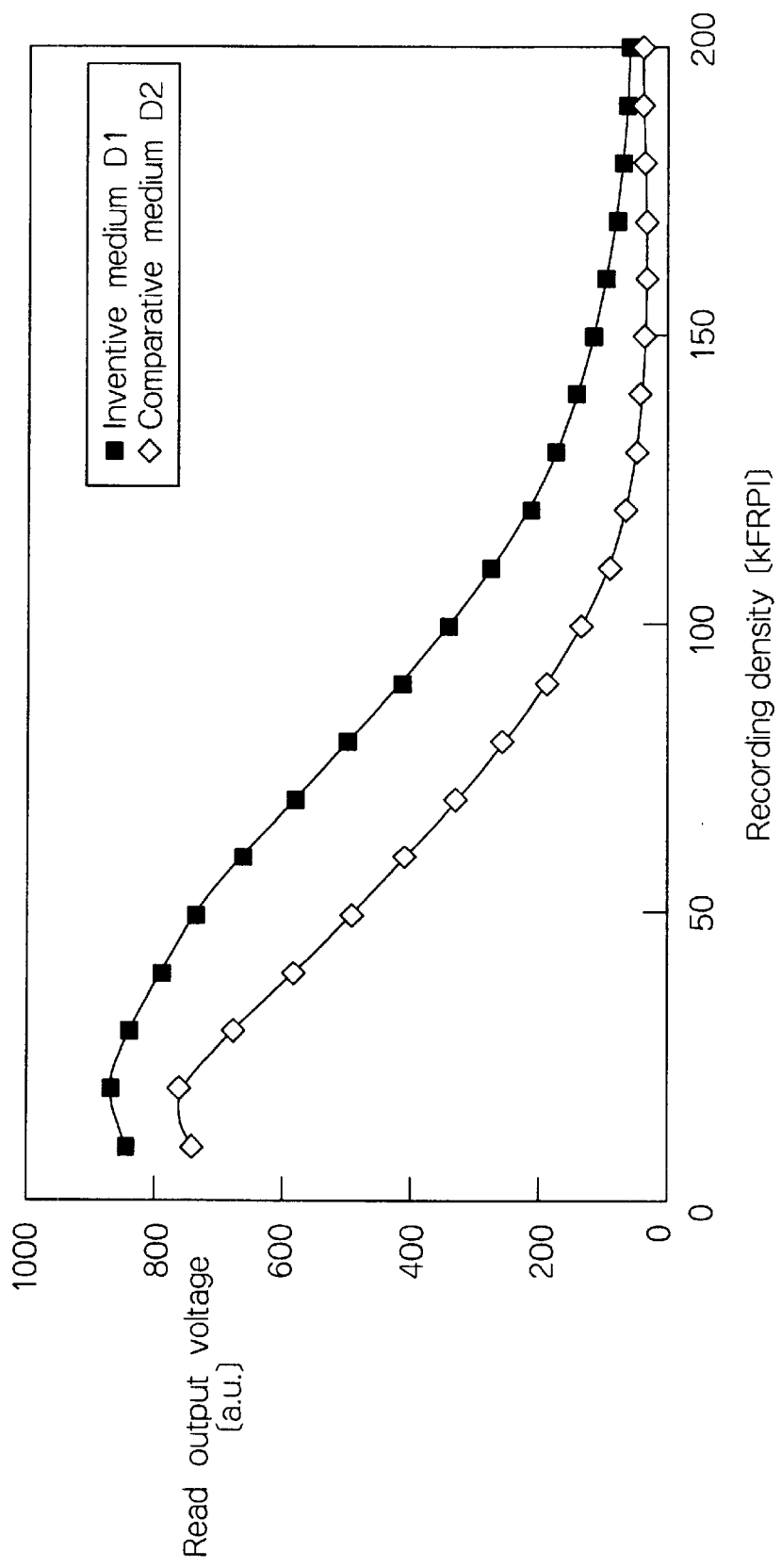
FIG. 36 is a graph showing recording density dependence of read output voltage in example 4 of the perpendicular magnetic recording medium of FIG. 15.

FIG. 36 shows recording density dependence of read output voltage. Since, in the inventive medium D1, attenuation of output as the recording density increases delays than the comparative medium D2, high output can be maintained to higher recording density, so that higher recording density can be easily attained. It is believed that, similar to example 1, improvement of perpendicular orientation of the perpendicular magnetizing film leads to improvement of the recording density dependence of output.

Figure 37:
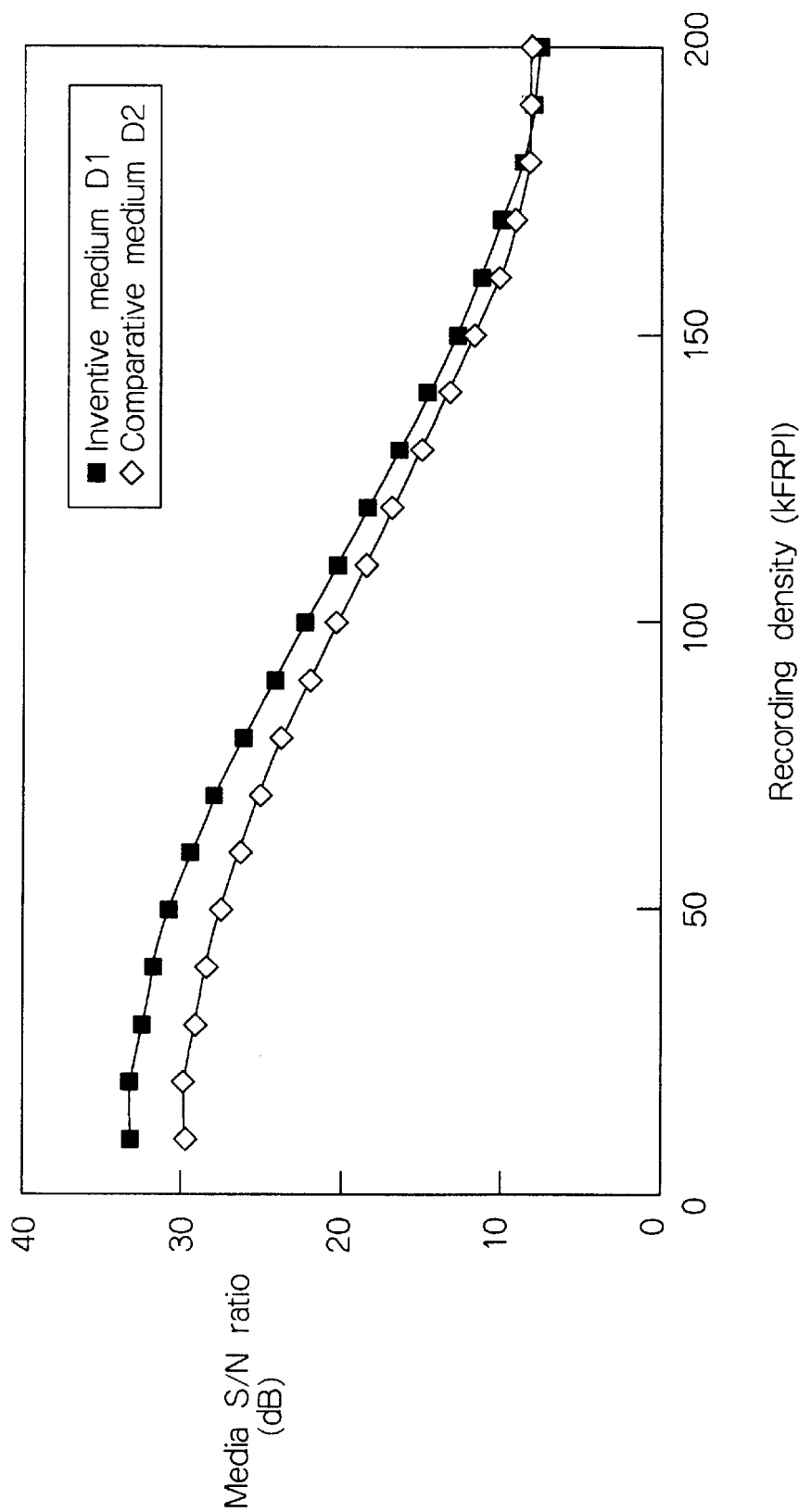
FIG. 37 is a graph showing recording density dependence of media S/N ratio in example 4 of the perpendicular magnetic recording medium of FIG. 15.

FIG. 37 shows recording density dependence of media S/N ratio. From the above, it can be seen that the inventive medium D1 has better media S/N ratio in all recording densities than the comparative medium D2 by 1–4 dB, so that it is an excellent medium as a magnetic disk medium accommodating the high recording density. That is, high recording density can be easily attained by using the inventive medium D1.

Figure 39:
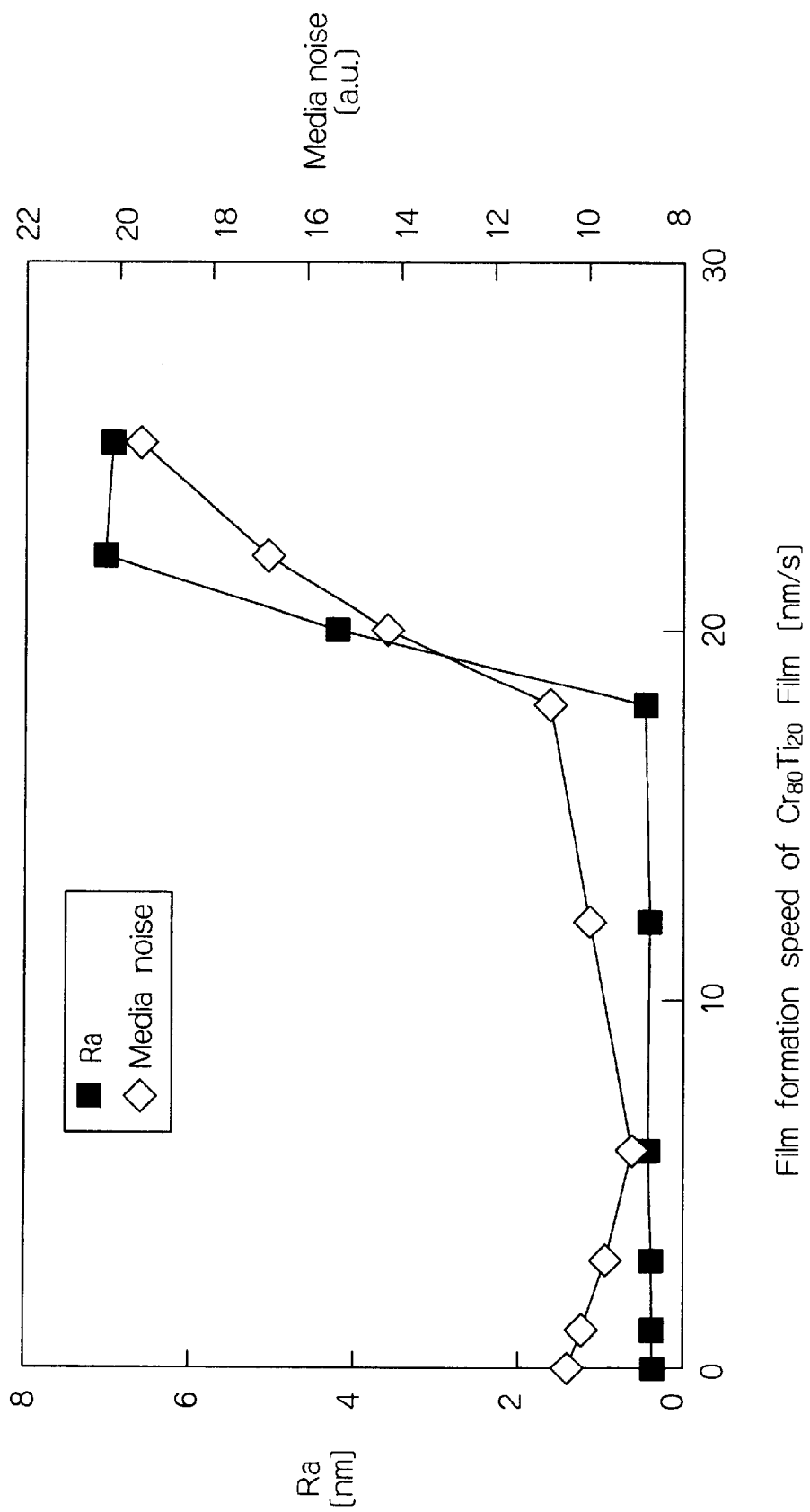
FIG. 39 is a graph showing relationship of film formation speed and Ra of $Cr_{80}Ti_{20}$ film, and media noise in example 4 of the perpendicular magnetic recording medium of FIG. 15.

FIGS. 38 and 39 show a relationship between the film formation speed and Ra of the $Cr_{80}Ti_{20}$ film when the film formation speed is changed between 0.1 nm/s–25 nm/s, and media noise. This makes clear that Ra rapidly increases when the film formation speed exceeds 18–20 nm/s. It is believed because there arises disturbance in the surface smoothness as crystal grains grow on the film surface due to increase of the film formation speed when the film formation speed exceeds 18–20 nm/s. Then, it is believed that rapid increase is observed in the media noise accordingly.

Example 5

Media using a 10-nm $Cr_{50}Ti_{50}$ (at %) film in place of the 10-nm C film in example 1, with the film formation conditions of $Cr_{50}Ti_{50}$ and FeSiAl films being argon gas pressure of 4 and 20 mTorr are called an inventive medium E1 and a comparative medium E2, respectively.

A half-width value of rocking curve ($\Delta\theta_{50}$) of hcp (002) peak was determined by using the X-ray diffraction similar to example 1 to investigate perpendicular orientation of the inventive medium E1 and the comparative medium E2. FIG. 40 shows surface roughness Ra of each medium together with their values. As seen from FIG. 40, the surface smoothness of $Cr_{50}Ti_{50}$ and FeSiAl films is significantly improved by reducing the argon gas pressure at film formation of $Cr_{50}Ti_{50}$ and FeSiAl films Then, it can be seen that, as the surface smoothness of the FeSiAl film is improved, the half-width value of rocking curve of hcp (002) peak of the CoCrTa film is reduced from 11.7 to 4.3, leading to improvement of the perpendicular orientation and surface smoothness of the perpendicular magnetizing film.

Figure 41:
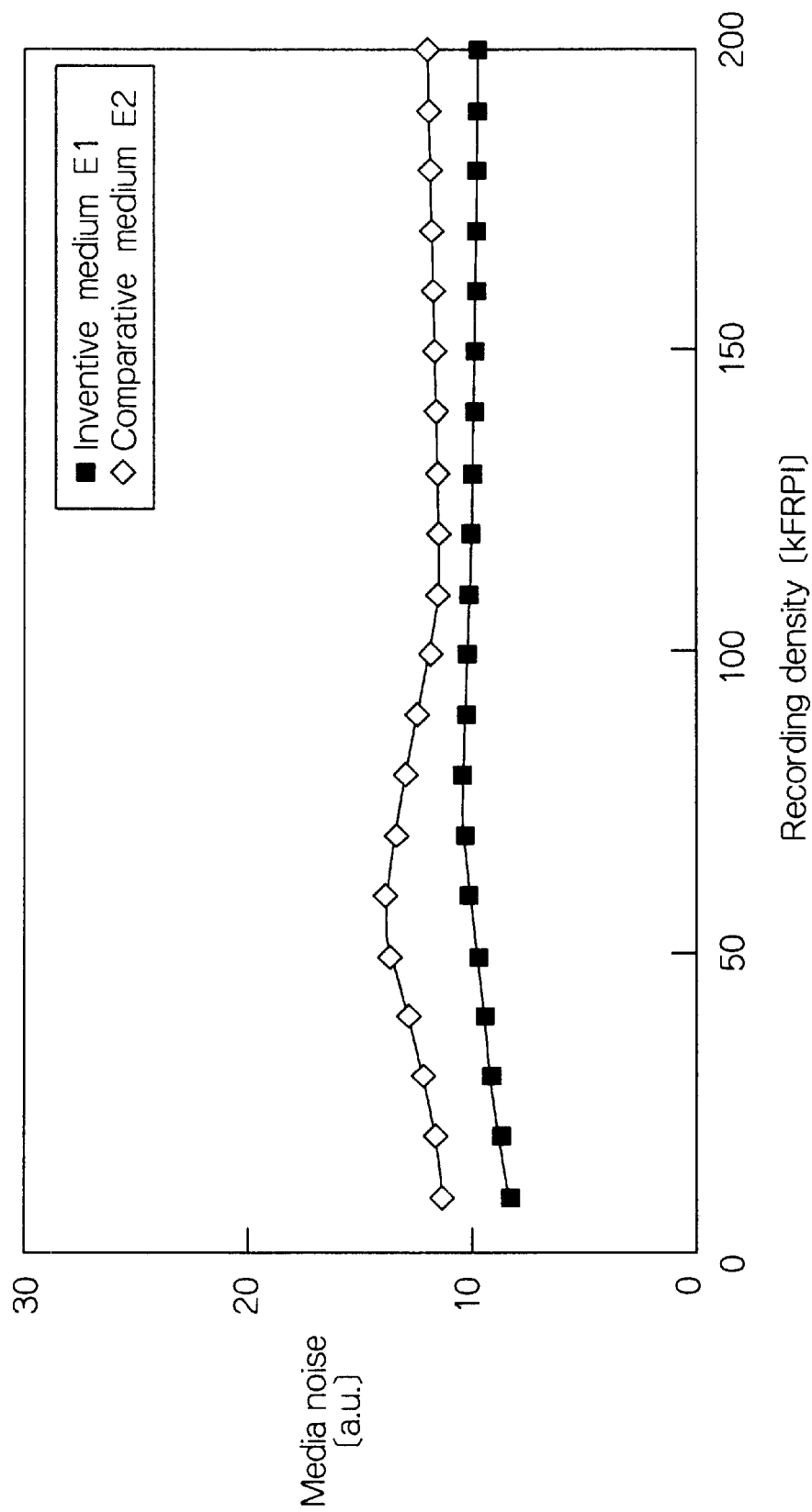
FIG. 41 is a graph showing recording density dependence of media noise in example 5 of the perpendicular magnetic recording medium of FIG. 15.

The inventive medium E1 and the comparative medium E2 were experimented for read and write by an ID/MR composite head. FIG. 41 shows recording density dependence of media noise. From the above, it can be seen that the inventive medium E1 has low media noise in all recording densities, and is very excellent noise characteristics than the comparative E2. That is, it is believed that, as the surface smoothness is improved for the $Cr_{50}Ti_{50}$ and FeSiAl film by reducing the argon gas pressure at film formation of the $Cr_{50}Ti_{50}$ and FeSiAl films, so that low noise can be attained similar to example 1.

Figure 42:
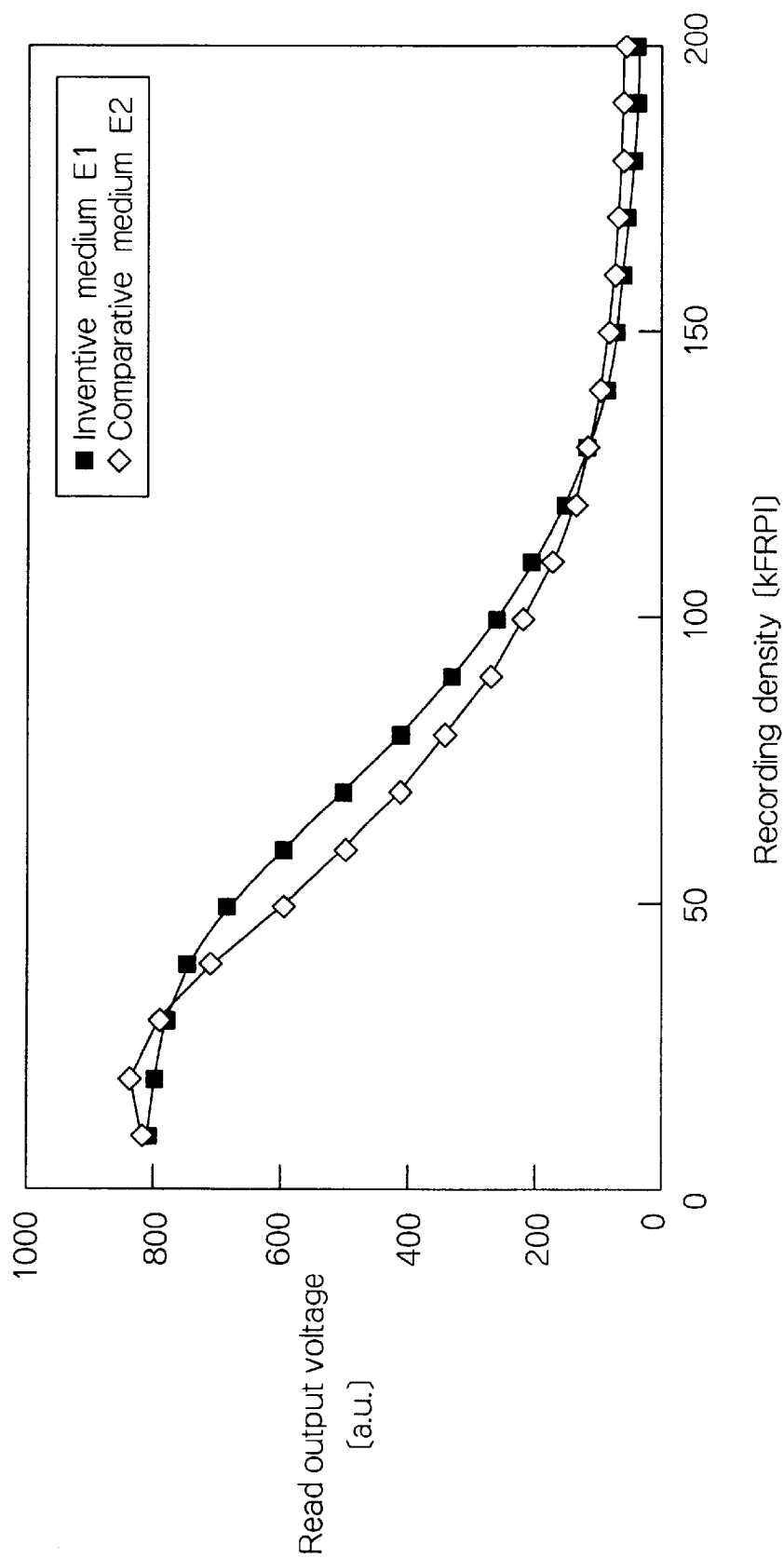
FIG. 42 is a graph showing recording density dependence of read output voltage in example 5 of the perpendicular magnetic recording medium of FIG. 15.

FIG. 42 shows recording density dependence of read output voltage. Since, in the inventive medium E1, attenuation of output as the recording density increases delays than the comparative medium E2, high output can be maintained to higher recording density, so that higher recording density can be easily attained. It is believed that, similar to example 1, improvement of perpendicular orientation of the perpendicular magnetizing film leads to improvement of the recording density dependence of output.

Figure 43:
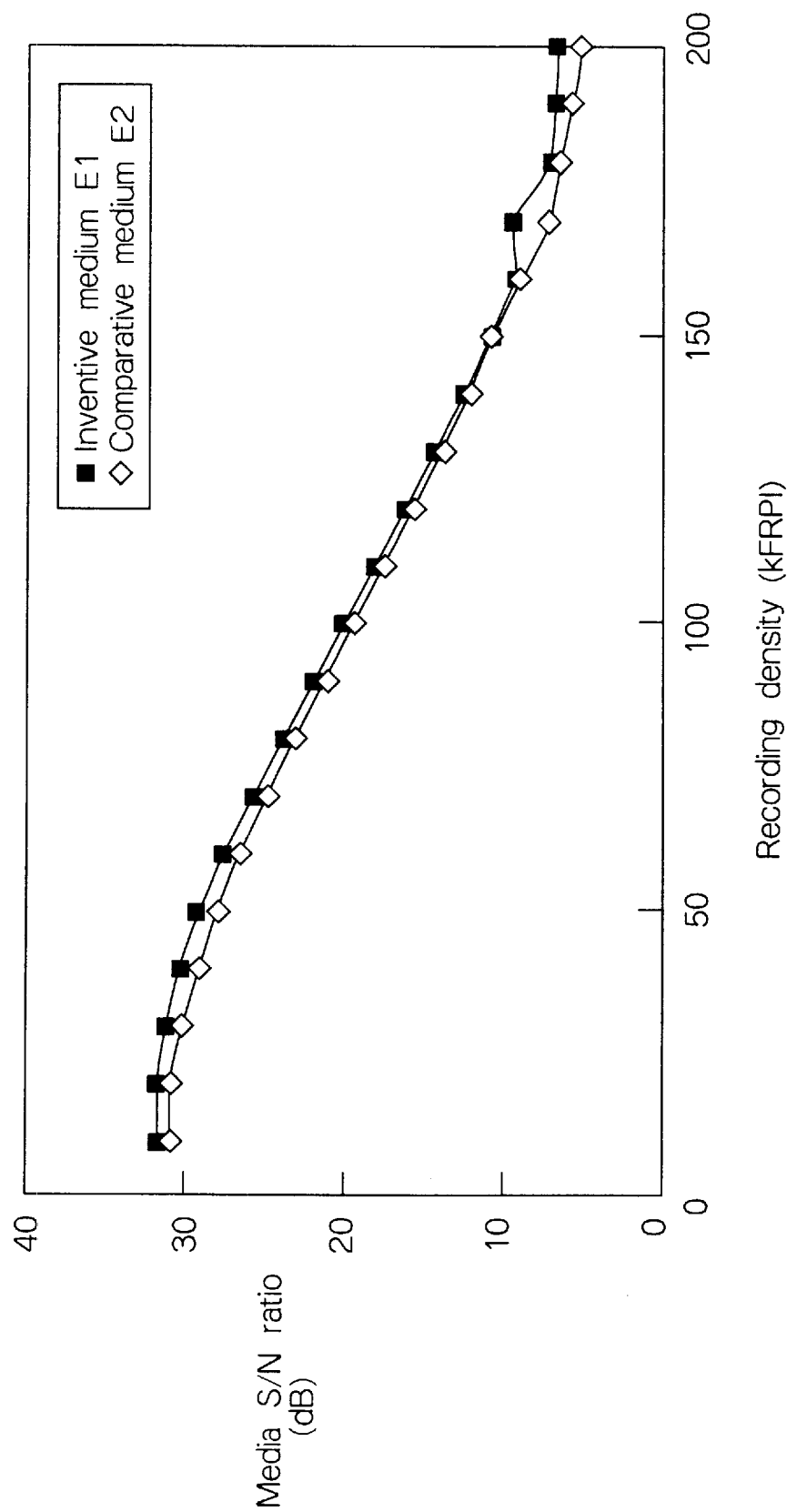
FIG. 43 is a graph showing recording density dependence of media S/N ratio in example 5 of the perpendicular magnetic recording medium of FIG. 15.

FIG. 43 shows recording density dependence of media S/N ratio. From the above, it can be seen that the inventive medium E1 has better media S/N ratio in all recording densities than the comparative medium E2 by 1–2 dB, so that it is an excellent medium as a magnetic disk medium accommodating the high recording density. That is, high recording density can be easily attained by using the inventive medium E12.

FIGS. 44 and 45 show a relationship between the argon gas pressure at film formation and Ra of the $Cr_{50}Ti_{50}$ film when the argon gas pressure is varied between 5–40 mTorr, and the media noise. This makes clear that Ra rapidly increases when the argon gas pressure at film formation of the $Cr_{50}Ti_{50}$ film exceeds 20–30 mTorr. It is believed because there arises disturbance in the surface smoothness as tapered pillar structures grow on the film surface when the argon gas pressure exceeds 20–30 mTorr. Then, it is believed that rapid increase is observed in the media noise accordingly.

Example 6

Media using a 10-nm $Cr_{90}Ti_{10}$ (at %), and FeTaN films in place of the 10-nm C and FeSiAl films in example 1, with the $Cr_{90}Ti_{10}$ and FeTaN films being formed at supplied power 0.5 kW (film formation speed 13 nm/s) and 1 kW (film formation speed 25 nm/s) at film formation are called an inventive medium F1 and a comparative medium F2, respectively.

A half-width value of rocking curve ($\Delta\theta_{50}$) of hcp (002) peak was determined by using the X-ray diffraction similar to example 1 to investigate perpendicular orientation of the inventive medium F1 and the comparative medium F2, FIG. 46 shows surface roughness Ra of each medium together with their values. As seen from FIG. 46, the surface smoothness of $Cr_{90}C_{10}$ and FeTaN films is significantly improved by reducing the supplied power at film formation of $Cr_{90}C_{10}$ and FeTaN films. Then, it can be seen that, as the surface smoothness of the FeTaN film is improved, the half-width value of rocking curve of hcp (002) peak of the CoCrTa film is reduced from 9.9 to 4.2, leading to improvement of the perpendicular orientation and surface smoothness of the perpendicular magnetizing film.

Figure 47:
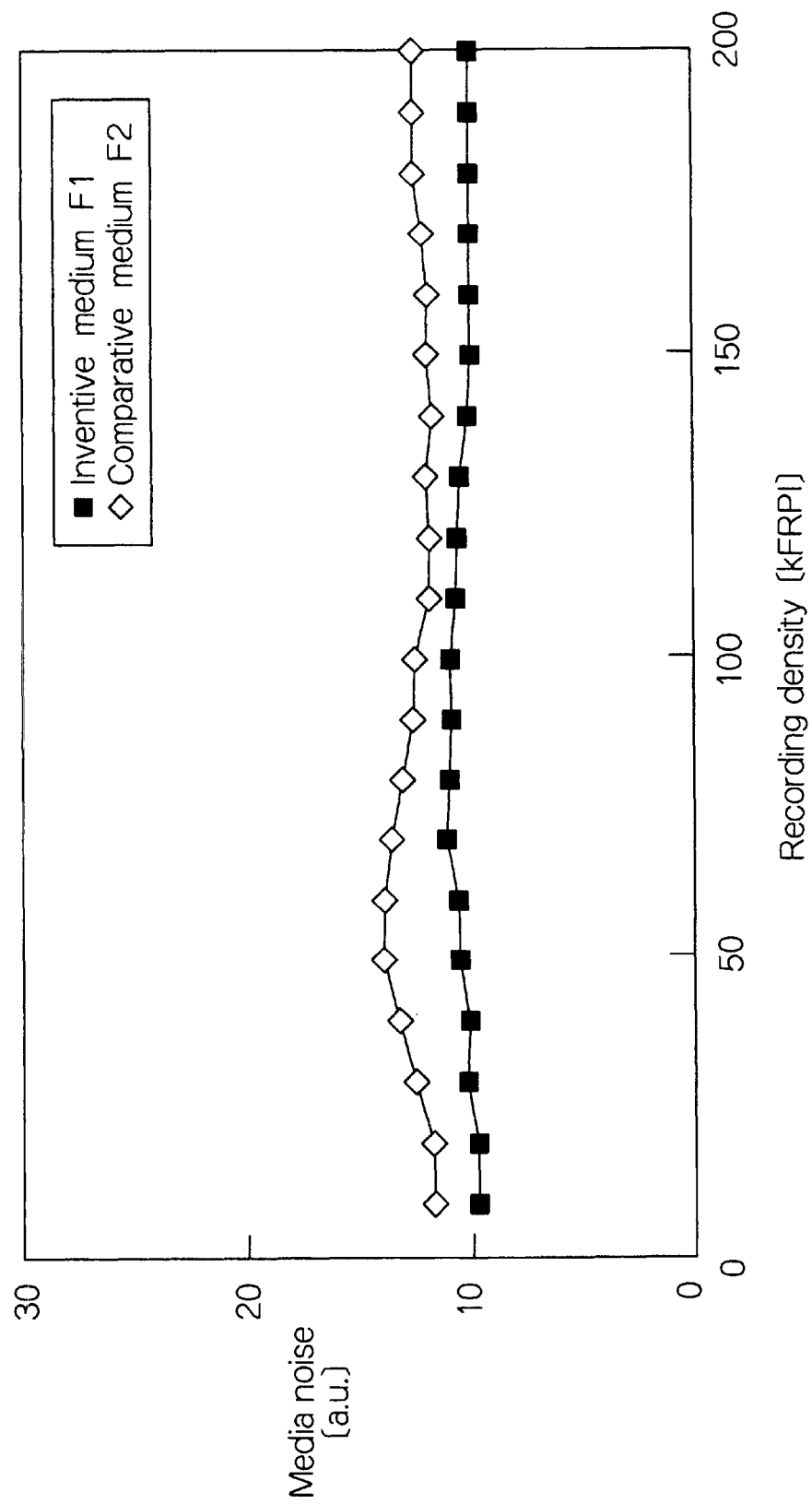
FIG. 47 is a graph showing recording density dependence of media noise in example 6 of the perpendicular magnetic recording medium of FIG. 15.

The inventive medium F1 and the comparative medium F2 were experimented for read and write by an ID/MR composite head. FIG. 47 shows recording density dependence of media noise. From the above, it can be seen that the inventive medium F1 has low media noise in all recording densities, and is very excellent noise characteristics than the comparative medium F2. That is, it is believed that, as the surface smoothness is improved for the $Cr_{90}C_{10}$ and FeTaN film by reducing the supplied power at film formation of the $Cr_{90}C_{10}$ and FeTaN films, so that low noise can be attained similar to example 1.

Figure 48:
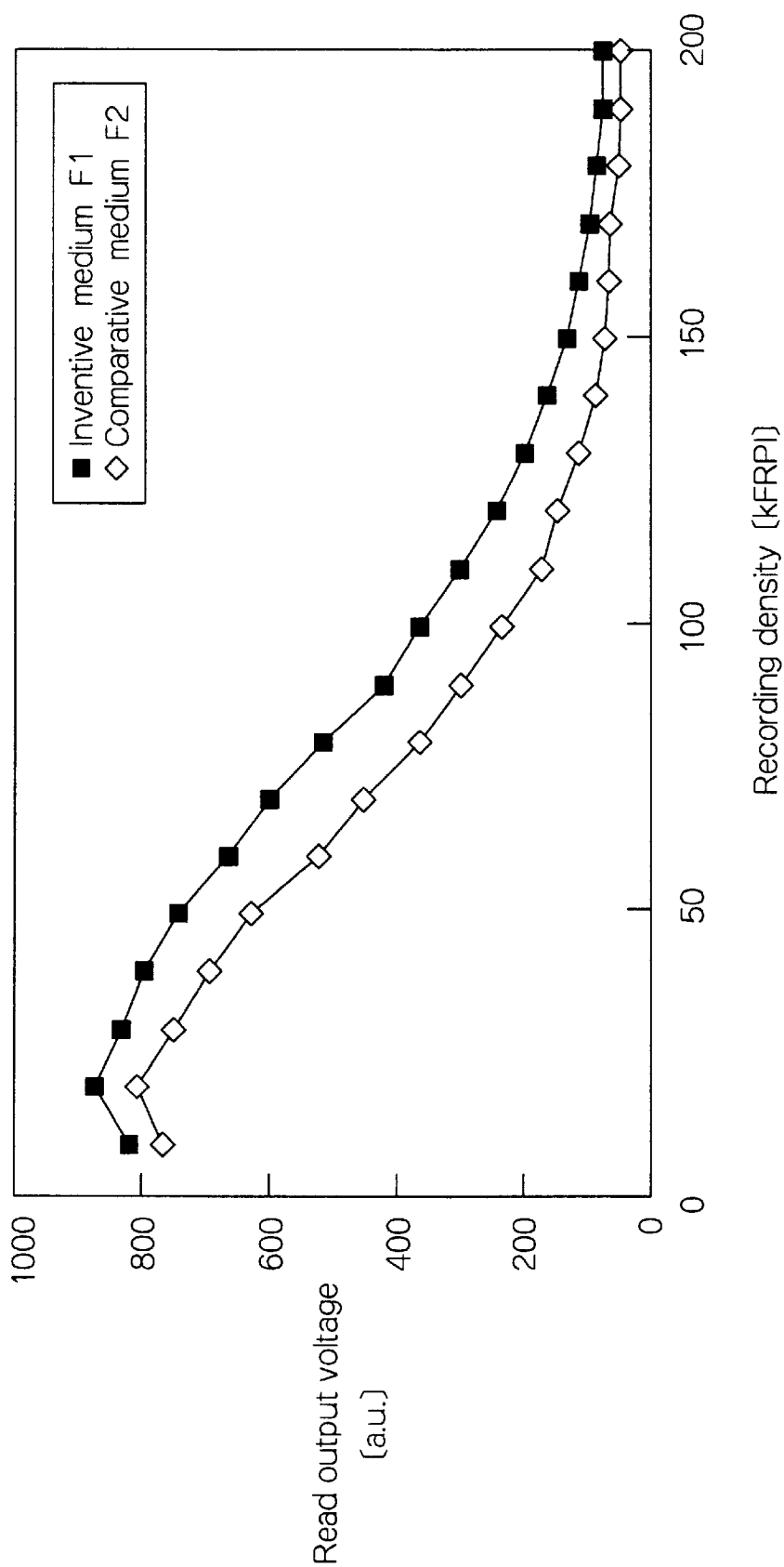
FIG. 48 is a graph showing recording density dependence of read output voltage in example 6 of the perpendicular magnetic recording medium of FIG. 15.

FIG. 48 shows recording density dependence of read output voltage. Since, in the inventive medium F1, attenuation of output as the recording density increases delays than the comparative medium F2, high output can be maintained to higher recording density, so that higher recording density can be easily attained. It is believed that, similar to example 1, improvement of perpendicular orientation of the perpendicular magnetizing film leads to improvement of the recording density dependence of output.

Figure 49:
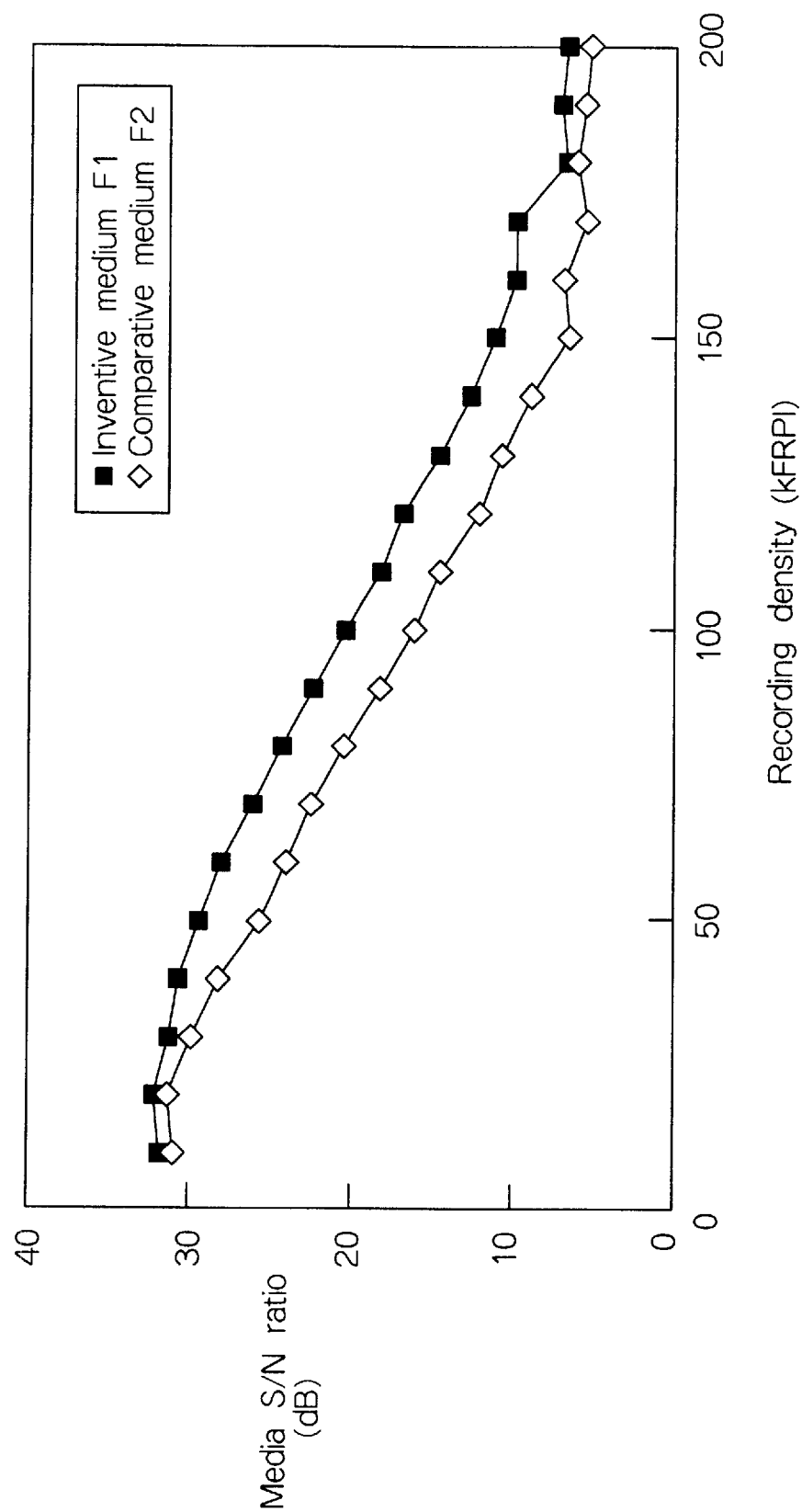
FIG. 49 is a graph showing recording density dependence of media S/N ratio in example 6 of the perpendicular magnetic recording medium of FIG. 15.

FIG. 49 shows recording density dependence of media S/N ratio. From the above, it can be seen that the inventive medium F1 has better media S/N ratio in all recording densities than the comparative medium F2 by $2 \geq 4$ dB, so that it is an excellent medium as a magnetic disk medium accommodating the high recording density. That is, high recording density can be easily attained by using the inventive medium F1.

Figure 51:
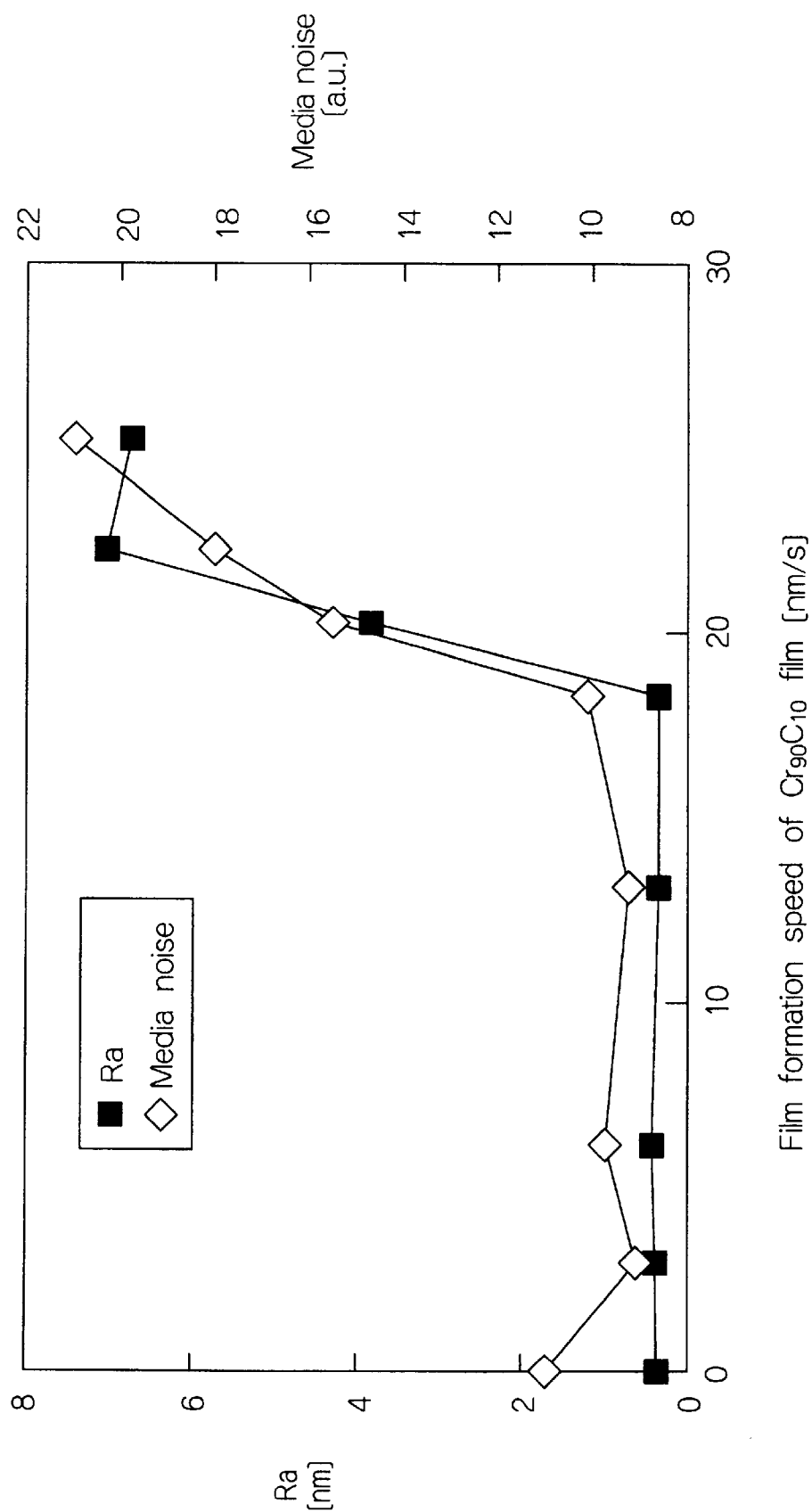
FIG. 51 is a graph showing relationship of film formation speed and Ra of $Cr_{90}C_{10}$ film, and media noise in example 6 of the perpendicular magnetic recording medium of FIG. 15.

FIGS. 50 and 51 show a relationship between the film formation speed and Ra of the $Cr_{90}Ti_{10}$ film when the film formation speed is varied between 0.1 nm/s–25 nm/s, and media noise. This makes clear that Ra rapidly increases when the film formation speed exceeds 18–20 nm/s. It is believed because there arises disturbance in the surface smoothness as crystal grains grow on the film surface when the film formation speed exceeds 18–20 nm/s. Then, it is believed that rapid increase is observed in the media noise accordingly.

Example 7

Media using a 10 nm $Ti_{90}C_{10}$ (at %) in place of the 10-nm C film in example 1, with the film formation conditions of $Ti_{90}C_{50}$ and FeTaN films being argon gas pressure of 4 and 20 mTorr are called an inventive medium G1 and a comparative medium G2, respectively.

Figure 57:
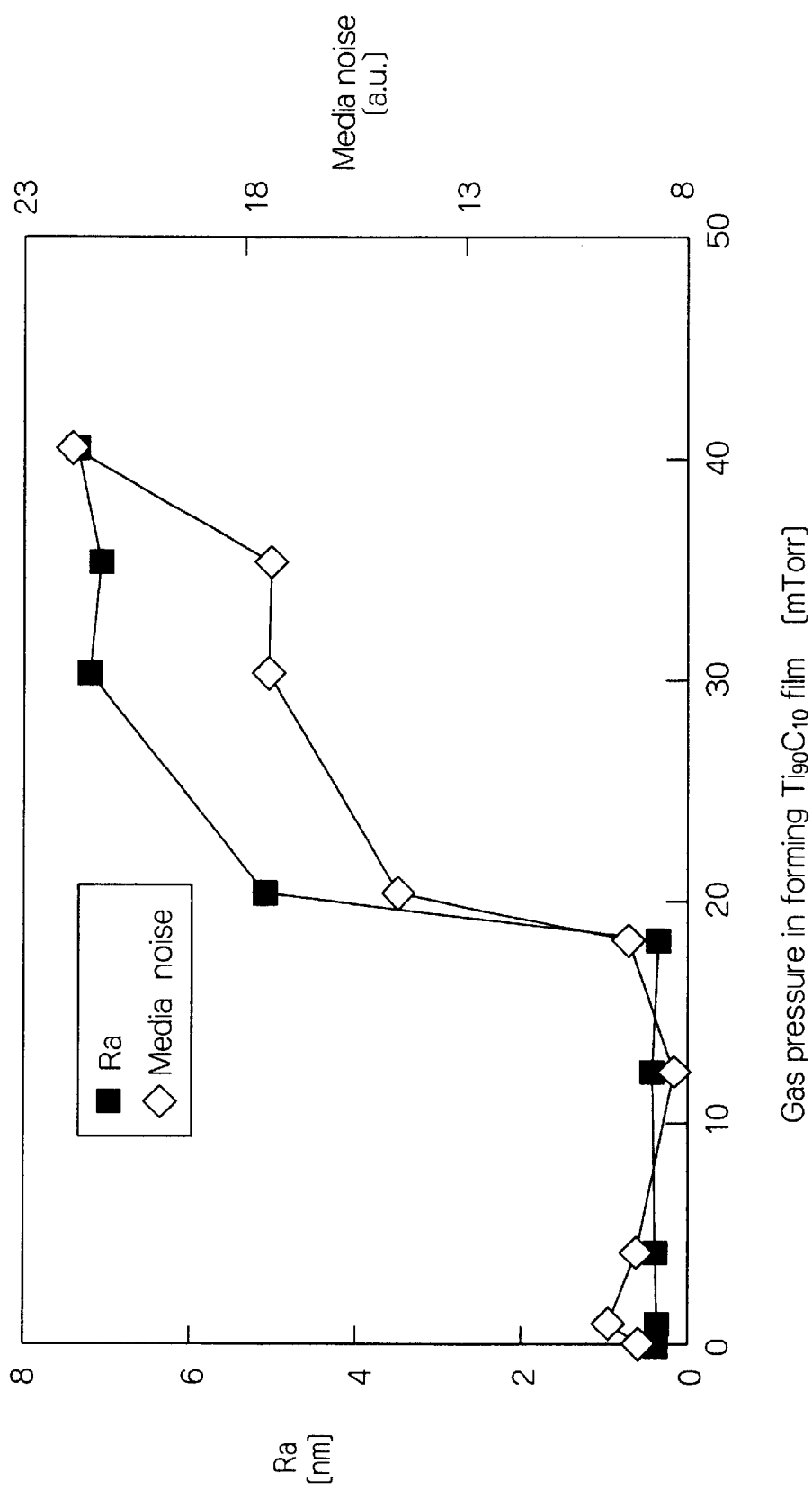
FIG. 57 is a graph showing relationship of argon gas pressure at film formation and Ra of $Ti_{90}C_{10}$ film, and media noise in example 7 of the perpendicular magnetic recording medium of FIG. 15.

A half-width value of rocking curve ($\Delta\theta_{50}$) of hcp (002) peak was determined by using the X-ray diffraction to investigate perpendicular orientation of the perpendicular magnetizing film of the inventive medium G1 and the comparative medium G2 similar to example 1. FIG. 57 shows surface roughness Ra of each medium together with their values. As seen from FIG. 57, the surface smoothness of $Ti_{90}C_{10}$ and FeTaN films can be significantly improved by reducing the argon gas pressure at film formation of $Ti_{90}C_{10}$ and FeTaN films. Then, it can be seen that, as the surface smoothness of the FeTaN film is improved, the half-width value of rocking curve of hcp (002) peak of the CoCrTa film is reduced from 15.6 to 3.9, leading to improvement of the perpendicular orientation and surface smoothness of the perpendicular magnetizing film.

Figure 53:
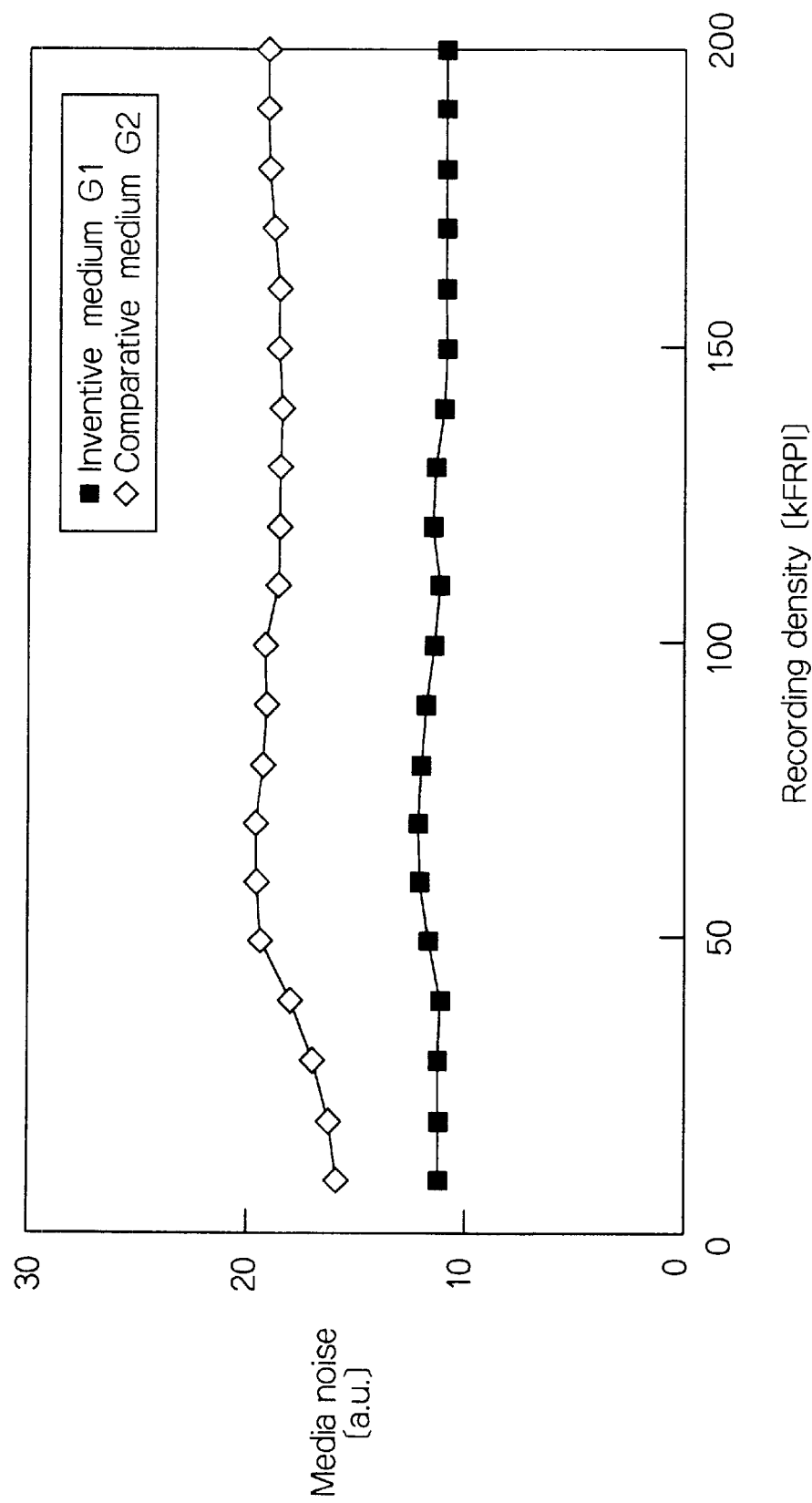
FIG. 53 is a graph showing recording density dependence of media noise in example 7 of the perpendicular magnetic recording medium of FIG. 15.

Similar to example 1, the inventive medium G1 and the comparative medium G2 were experimented for read and write by an ID/MR composite head. FIG. 53 shows recording density dependence of media noise. From the above, it can be seen that the inventive medium G1 has lower media noise in all recording densities, and is much more excellent noise characteristics than the comparative medium G2. That is, it is believed that, as the surface smoothness is improved for the $Ti_{90}C_{10}$ and FeTaN films by reducing the argon gas pressure at film formation of the $Ti_{90}C_{10}$ and FeTaN films, the surface smoothness is significantly improved for the $Ti_{90}C_{10}$ and FeTaN films, so that low noise can be attained as in example 1.

Figure 54:
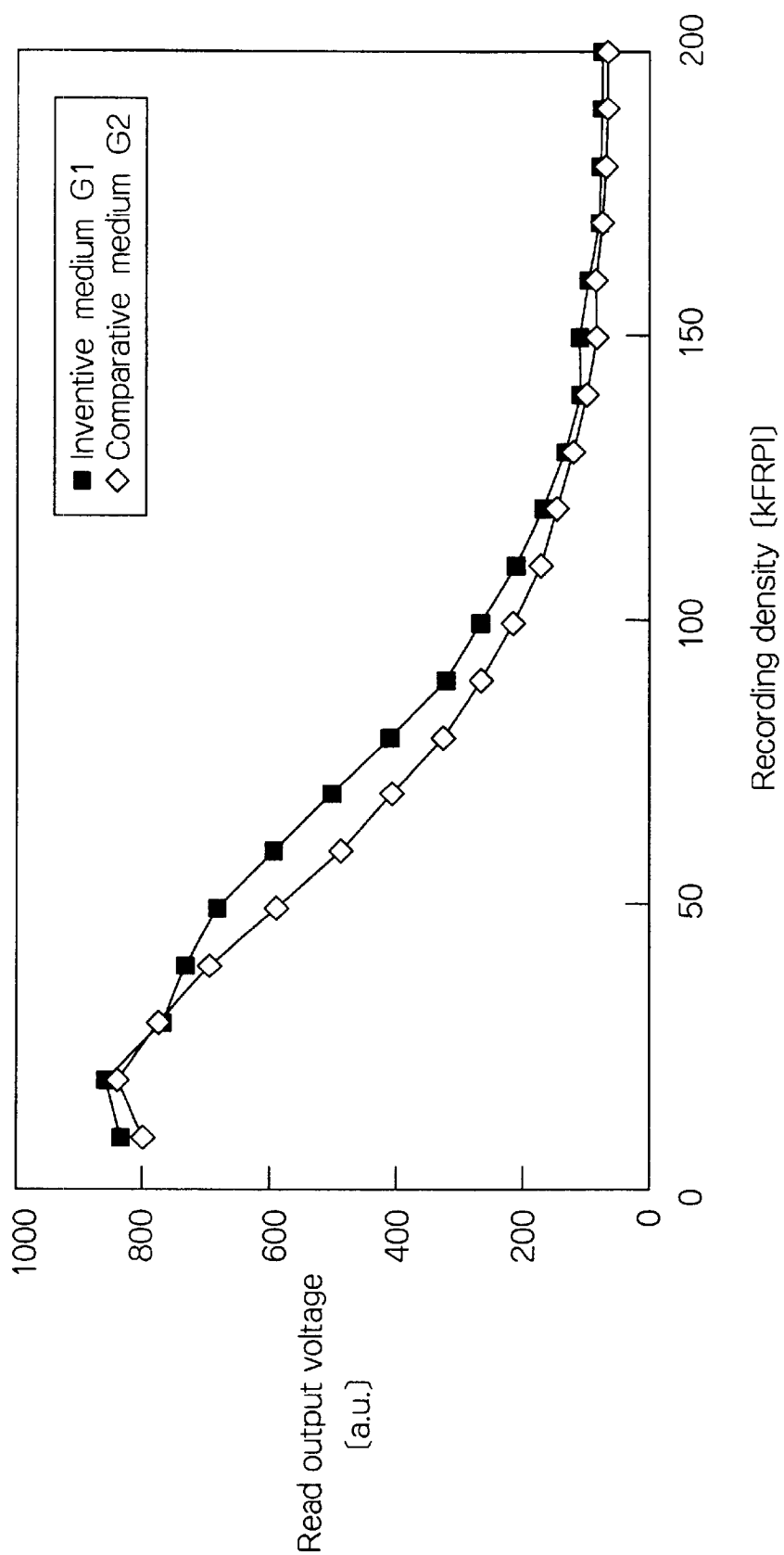
FIG. 54 is a graph showing recording density dependence of read output voltage in example 7 of the perpendicular magnetic recording medium of FIG. 15.

FIG. 54 shows recording density dependence of read output voltage. Since, in the inventive medium G1, attenuation of output as the recording density increases delays than the comparative medium G2, high output can be maintained to higher recording density, so that higher recording density can be easily attained. It is believed that, similar to example 1, improvement of perpendicular orientation of the perpendicular magnetizing film leads to improvement of the recording density dependence of output.

FIG. 55 shows recording density dependence of media S/N ratio. From the above, it can be seen that the inventive medium G1 has better media S/N ratio in all recording densities than the comparative medium G1 by 2–6 dB, so that it is an excellent medium as a magnetic disk medium accommodating the high recording density. That is, high recording density can be easily attained by using the inventive medium G1.

FIGS. 56 and 57 show a relationship between the argon gas pressure at film formation and Ra of the $Ti_{90}C_{10}$ film when the argon gas pressure is varied between 0.5–40 mTorr, and the media noise. This makes clear that Ra rapidly increases when the argon gas pressure at film formation of the $Ti_{90}C_{10}$ film exceeds 20–30 mTorr. It is believed because there arises disturbance in the surface smoothness as tapered pillar structures grow on the film surface when the argon gas pressure exceeds 20–30 mTorr. Then, it is believed that rapid increase is observed in the media noise accordingly.

According to the perpendicular magnetic recording medium and its manufacturing process, surface smoothness of the soft magnetic underlayer film can be significantly improved by inserting a smoothness control film between the substrate and the soft magnetic underlayer film, so that the perpendicular orientation and surface smoothness of the perpendicular magnetizing film can be improved. Therefore, the media noise can be reduced, so that the recording density dependence of read output signal can be improved.

Now, there is described embodiments and examples of the third perpendicular magnetic recording medium and its manufacturing process of the present inventions.

Figure 58:
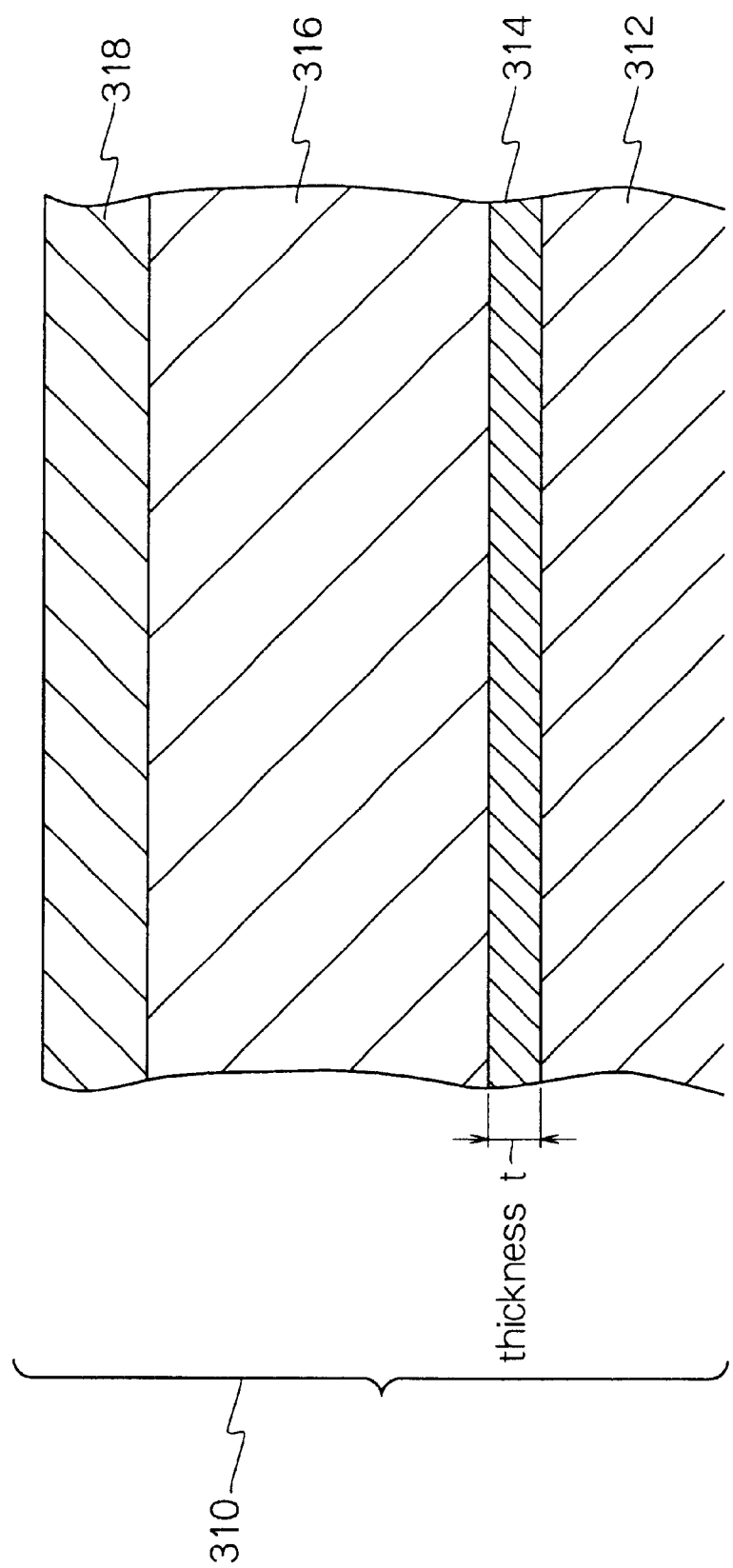
FIG. 58 is a schematic sectional view showing an embodiment of a third perpendicular magnetic recording medium according to the present invention.

FIG. 58 is a schematic sectional view showing a first embodiment of a third perpendicular magnetic recording medium according to the present invention. Now, description is made referring to this figure.

The perpendicular magnetic recording medium 310 of the embodiment is formed by forming a Cr film 314, a soft magnetic underlayer film 316, and a perpendicular magnetizing film 318 on a substrate 312 in this order. Film thickness t of the Cr film is more than 10 nm but less than 17 nm, preferably 2 nm or more but 15 nm or less. The soft magnetic underlayer film 316 is, for example, a FeSiAl film or an FeTaN film. The perpendicular magnetizing film 318 is, for example, a CoCrTa film. The Cr film 314 acts to improve surface smoothness of the soft magnetic underlayer film 316, and surface smoothness and perpendicular orientation of the perpendicular magnetizing film 318.

Examples of the present invention are described in the following. In the following, the perpendicular magnetic recording medium is called merely a "medium," the perpendicular magnetic recording medium according to the present invention an "inventive medium," and the perpendicular magnetic recording medium for comparison a "comparative medium." In addition, "surface roughness Ra" means average roughness on centerline on the film surface.

Example 8

Cr films with thickness of 10 nm and 20 nm were formed on a 2.5-inch glass substrate using a Cr (3N) target with diameter of 6 inches by the sputtering process. Film formation conditions were supplied power 0.5 kW, argon gas pressure 4 mTorr and film formation speed 3 nm/sec under initial vacuum $5 \times 10^{-7}$ mTorr. Then, an FeSiAl film was formed in 520 nm on each medium under the same film formation conditions using a $Fe_{85}Si_{9.6}Al_{5.4}$ (wt %) target with diameter of 6 inches. Subsequently, a CoCrTa film was formed in 100 nm on each medium under the same film formation conditions using a $Co_{78}Cr_{19}Ta_3$ (at %) target. Here, media inserted with the 10-nm Cr film and the 20-nm Cr film are called the inventive medium AA1 and the comparative medium AA2, respectively.

A half-width value of rocking curve ($\Delta\theta_{50}$) of hcp (002) peak was determined by using the X-ray diffraction to investigate perpendicular orientation of the perpendicular magnetizing film of the inventive medium AA1 and the comparative medium AA2. FIG. 59 shows surface roughness Ra of each medium together with their values. It can be seen that the surface smoothness of Cr film is significantly improved by reducing the film thickness of Cr film, which in turn can improve the surface roughness of the FeSiAl film. Then, it can be seen that, as the surface smoothness of the FeSiAl film is improved, the half-width value of rocking curve of hcp (002) peak of the CoCrTa film is reduced from 7.0 to 3.9, leading to improvement of the perpendicular orientation and surface smoothness of the perpendicular magnetizing film.

The inventive medium AA1 and the comparative medium AA2 were experimented for read and write by an ID/MR composite head. Here, the recording track width was 4 $\mu$m, the read track width was 3 $\mu$m, the recording gap length was 0.4 $\mu$m, and the read gap length was 0.32 $\mu$m. In addition, evaluation was conducted under the conditions of recording current 10 mAop, sense current 12 mA, circumferential speed 12.7 m/s, flying height 45 nm, and noise band 45 MHz.

FIG. 60 shows recording density dependence of media noise. It can be seen that the inventive medium AA1 has very excellent noise characteristics because it has lower media noise in all recording densities than the comparative medium AA2. That is, it is believed that film thickness of the initial layer of the perpendicular magnetizing film can be reduced as the surface smoothness of FeSiAl film can be improved due to reduction of the Cr film thickness, so that low noise can be attained. The FeSiAl film has an advantage that noise due to movement of a domain wall hardly occurs because inherently the domain structure is hardly detected.

Figure 61:
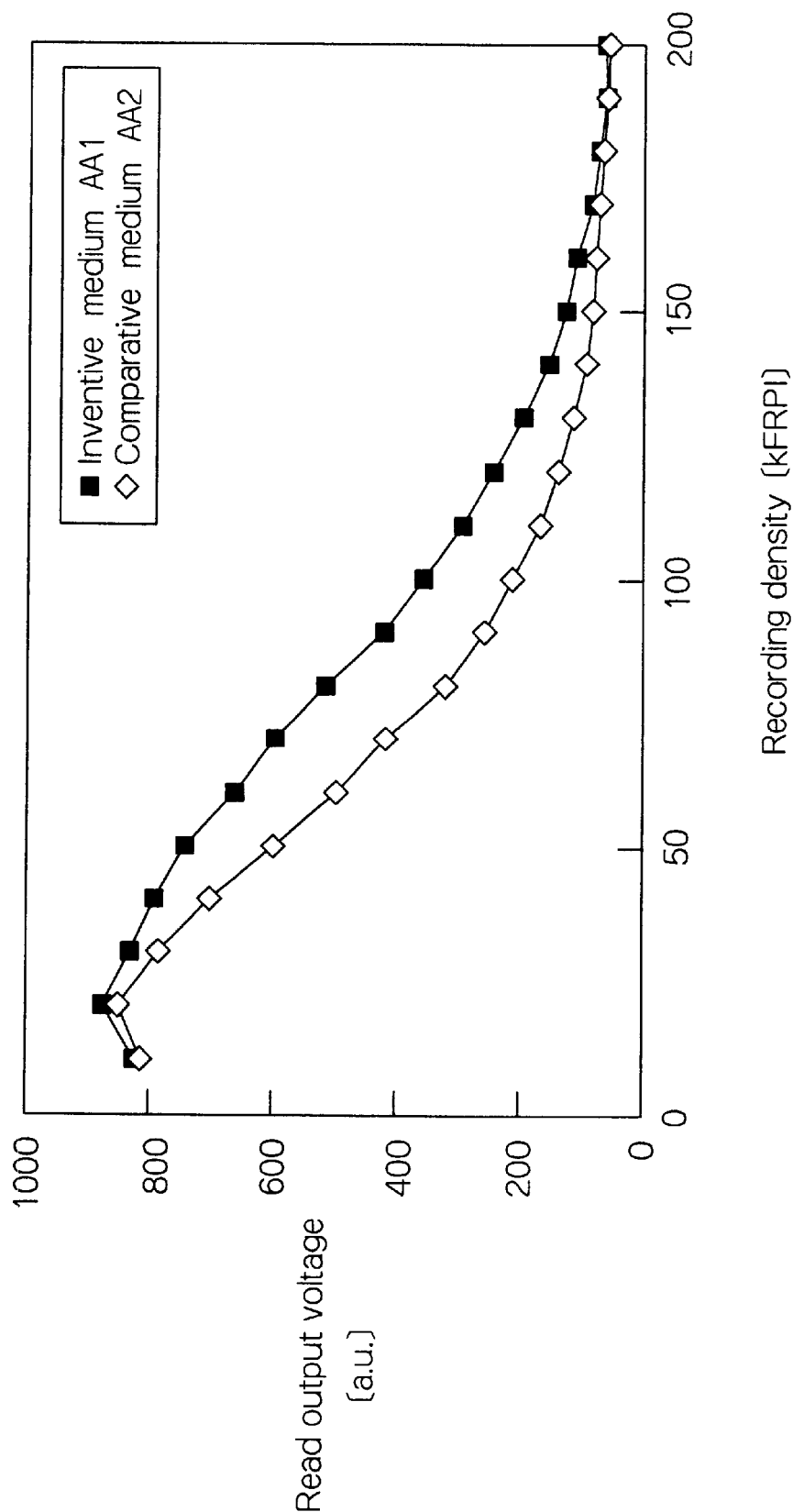
FIG. 61 is a graph showing recording density dependence of read output voltage in example 8 of the perpendicular magnetic recording medium of FIG. 58.

FIG. 61 shows recording density dependence of read output voltage. Since, in the inventive medium AA1, attenuation of output as the recording density increases delays than the comparative medium AA2, high output can be maintained to higher recording density, so that higher recording density can be easily attained. As shown in FIG. 59, it is believed that improvement of perpendicular orientation of the perpendicular magnetizing film leads to improvement of the recording density dependence of output.

Figure 62:
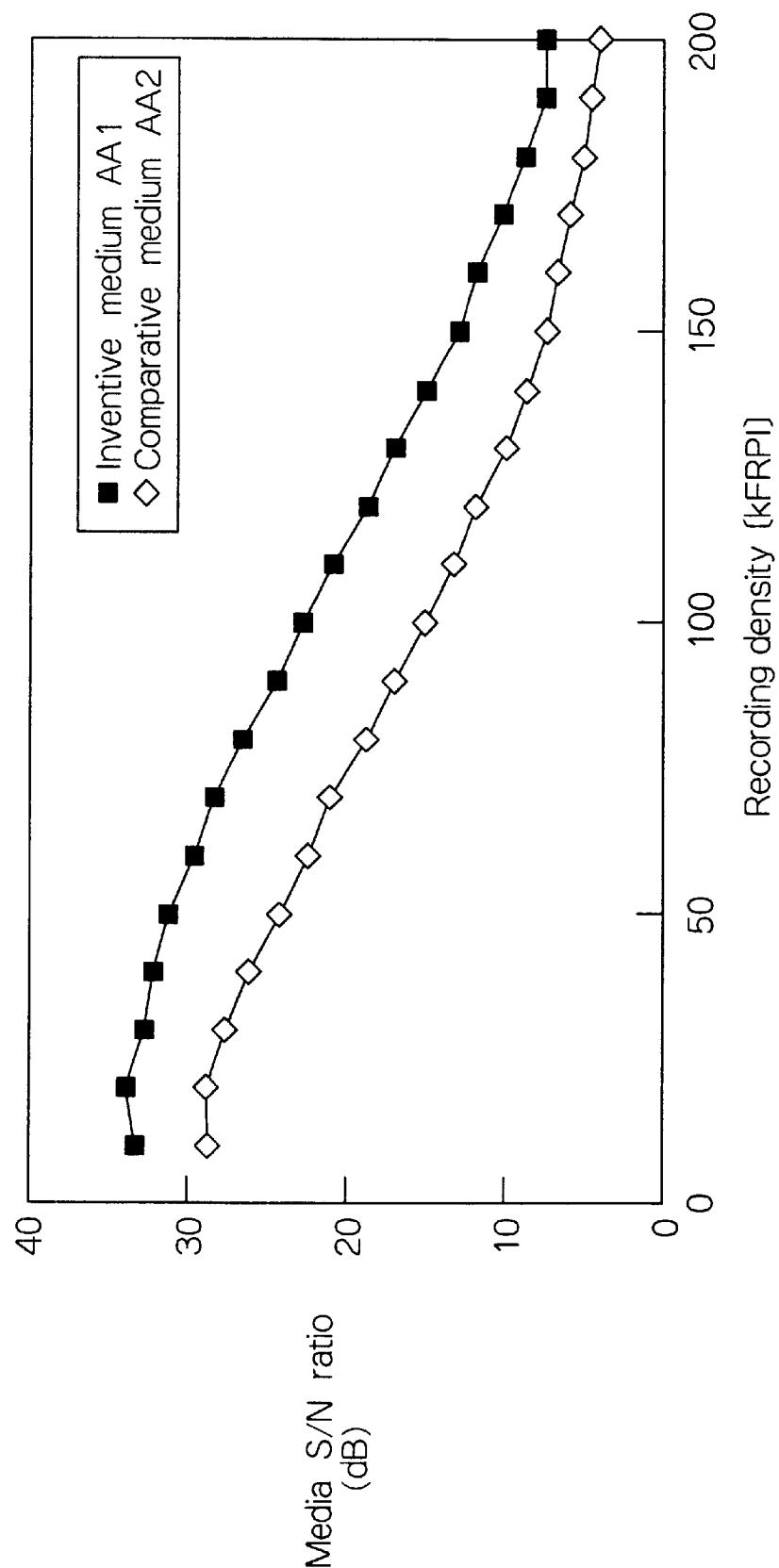
FIG. 62 is a graph showing recording density dependence of media S/N ratio in example 8 of the perpendicular magnetic recording medium of FIG. 58.

FIG. 62 shows recording density dependence of media S/N ratio. From the above, it. can be seen that the inventive medium AA1 has better media S/N ratio in all recording densities than the comparative medium AA2 by 2–8 dB, so that it is an excellent medium as a magnetic disk medium accommodating the high recording density. That is, high recording density can be easily attained by using the inventive medium AA1.

FIGS. 63 and 64 show a relationship between the film thickness and surface roughness Ra of the Cr film when the Cr film thickness is varied between 1–20 nm, and the media noise. It can be seen that Ra rapidly increases if the film thickness of Cr film exceeds 15–17 nm. It is believed because there arises disturbance in the surface smoothness as crystal grains grow on the film surface when the film thickness exceeds 15–17 nm. Then, rapid increase is observed in the media noise accordingly. In addition, Ra would increase if the film thickness of Cr film is made too thin to 1–2 nm. It is believed that a uniform film is not formed on the substrate at the film thickness of 1–2 nm, so that an island structure is caused to degrade the surface smoothness. Increase of media noise is also observed according to it.

Example 9

Media formed under the film formation conditions of Cr and FeSiAl films where the argon gas pressure is 4 and 20 mTorr in place of that in example 8 are called an inventive example BB1 and a comparative example BB2.

A half-width value of rocking curve ($\Delta\theta_{50}$) of hcp (002) peak was determined by using the X-ray diffraction to investigate perpendicular orientation of the perpendicular magnetizing film of the inventive medium BB1 and the comparative medium BB2, similar to example 8. FIG. 65 shows surface roughness Ra of each medium together with their values. As seen from FIG. 65, the surface smoothness of Cr and FeSiAl films can be improved by reducing the argon gas pressure at film formation of Cr and FeSiAl films. Then, it can be seen that, as the surface smoothness of the FeSiAl film is improved, the half-width value of rocking curve of hcp (002) peak of the CoCrTa film is reduced from 15.6 to 3.9, leading to improvement of the perpendicular orientation and surface smoothness of the perpendicular magnetizing film.

Figure 66:
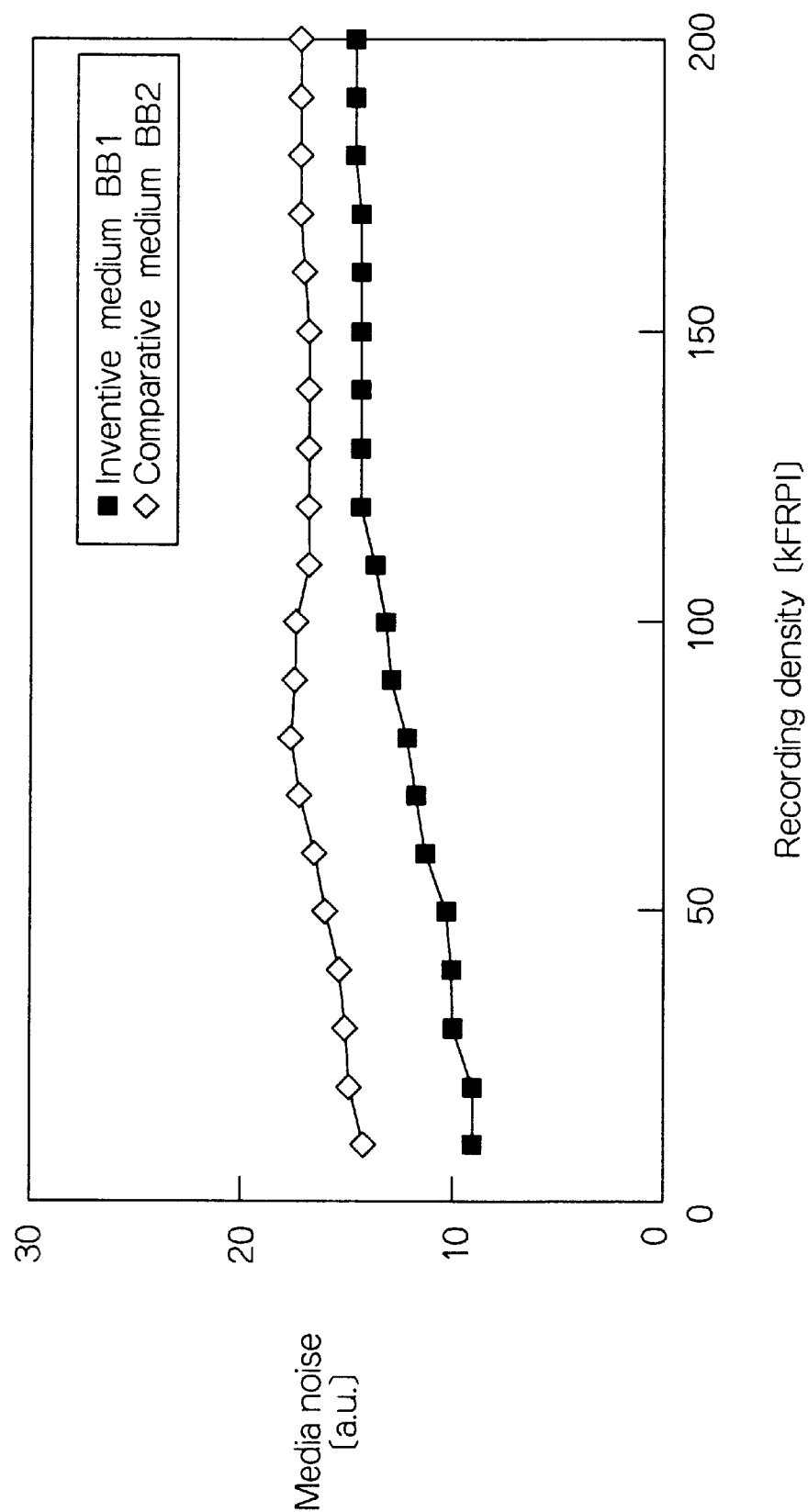
FIG. 66 is a graph showing recording density dependence of media noise in example 9 of the perpendicular magnetic recording medium of FIG. 58.

Similar to example 8, the inventive medium BB1 and the comparative medium BB2 were experimented for read and write by an ID/MR composite head. FIG. 66 shows recording density dependence of media noise. From the above, it can be seen that the inventive medium BB1 has lower media noise in all recording densities, and is much more excellent noise characteristics than the comparative BB2. That is, it is believed that, as the surface smoothness is improved for the Cr and FeSiAl films by reducing the argon gas pressure at film formation of the Cr and FeSiAl films, the surface smoothness is significantly improved for the Cr and FeSiAl films, so that low noise can be attained as in example 8.

Figure 67:
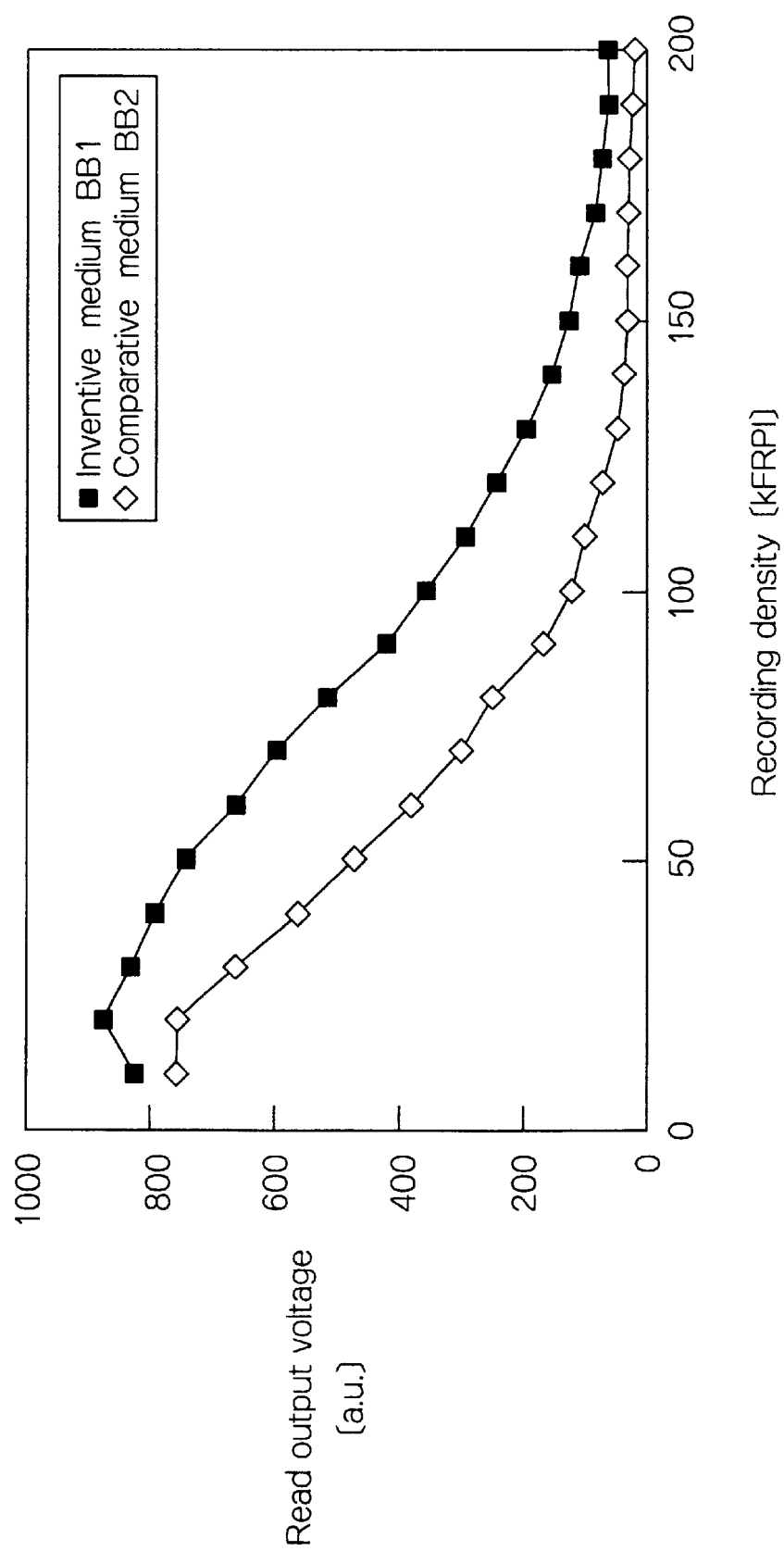
FIG. 67 is a graph showing recording density dependence of read output voltage in example 9 of the perpendicular magnetic recording medium of FIG. 58.

FIG. 67 shows recording density dependence of read output voltage. Since, in the inventive medium BB1, attenuation of output as the recording density increases delays than the comparative medium BB2, high output can be maintained to higher recording density, so that higher recording density can be easily attained. Similar to example 8, it is believed that improvement of perpendicular orientation of the perpendicular magnetizing film leads to improvement of the recording density dependence of output.

Figure 68:
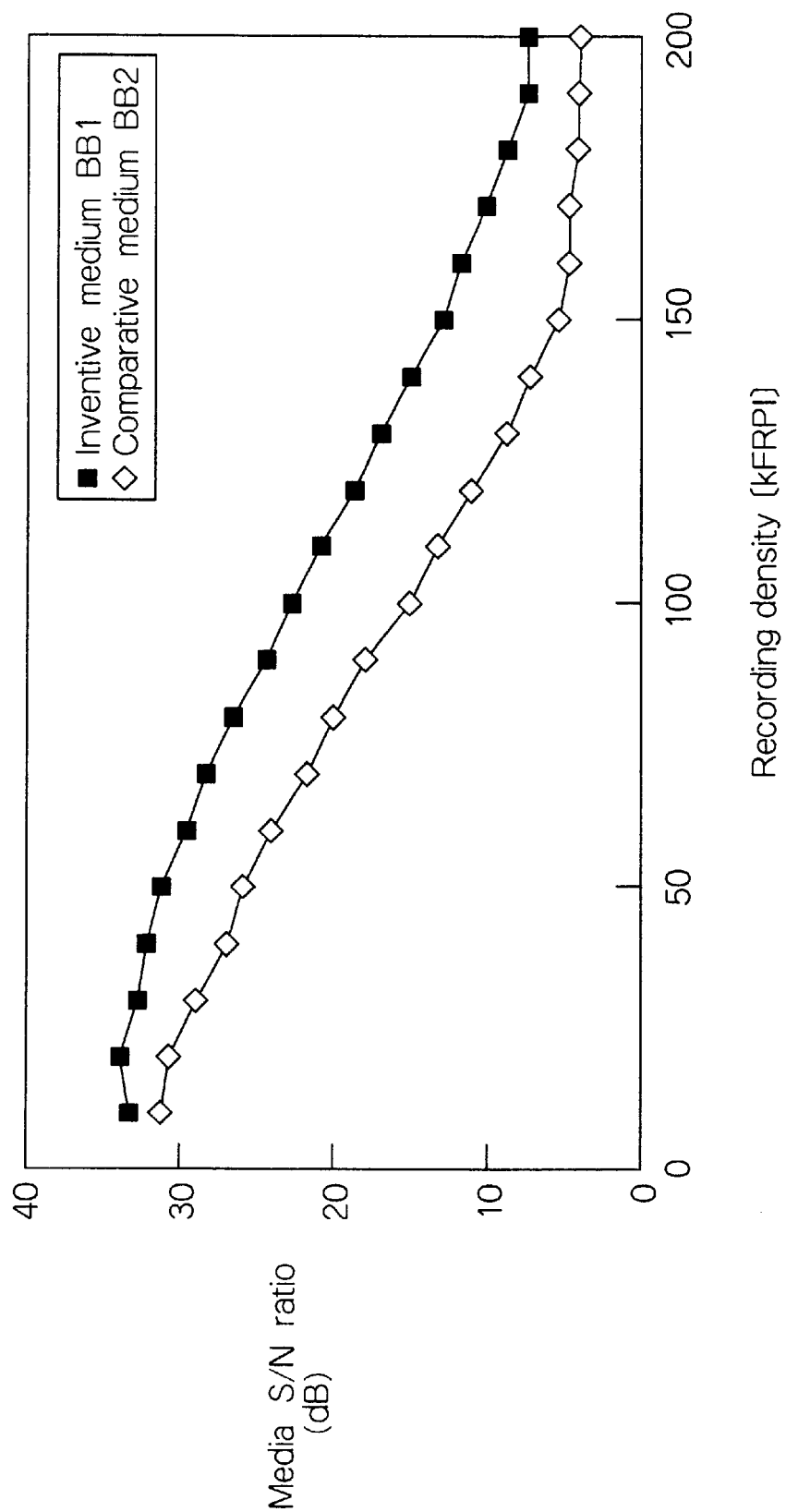
FIG. 68 is a graph showing recording density dependence of media S/N ratio in example 9 of the perpendicular magnetic recording medium of FIG. 58.

FIG. 68 shows recording density dependence of media S/N ratio. From the above, it can be seen that the inventive medium BB1 has better media S/N ratio in all recording densities than the comparative medium AA2 by 2–8 dB, so that it is an excellent medium as a magnetic disk medium accommodating the high recording density. That is, high recording density can be easily attained by using the inventive medium BB1.

Figure 70:
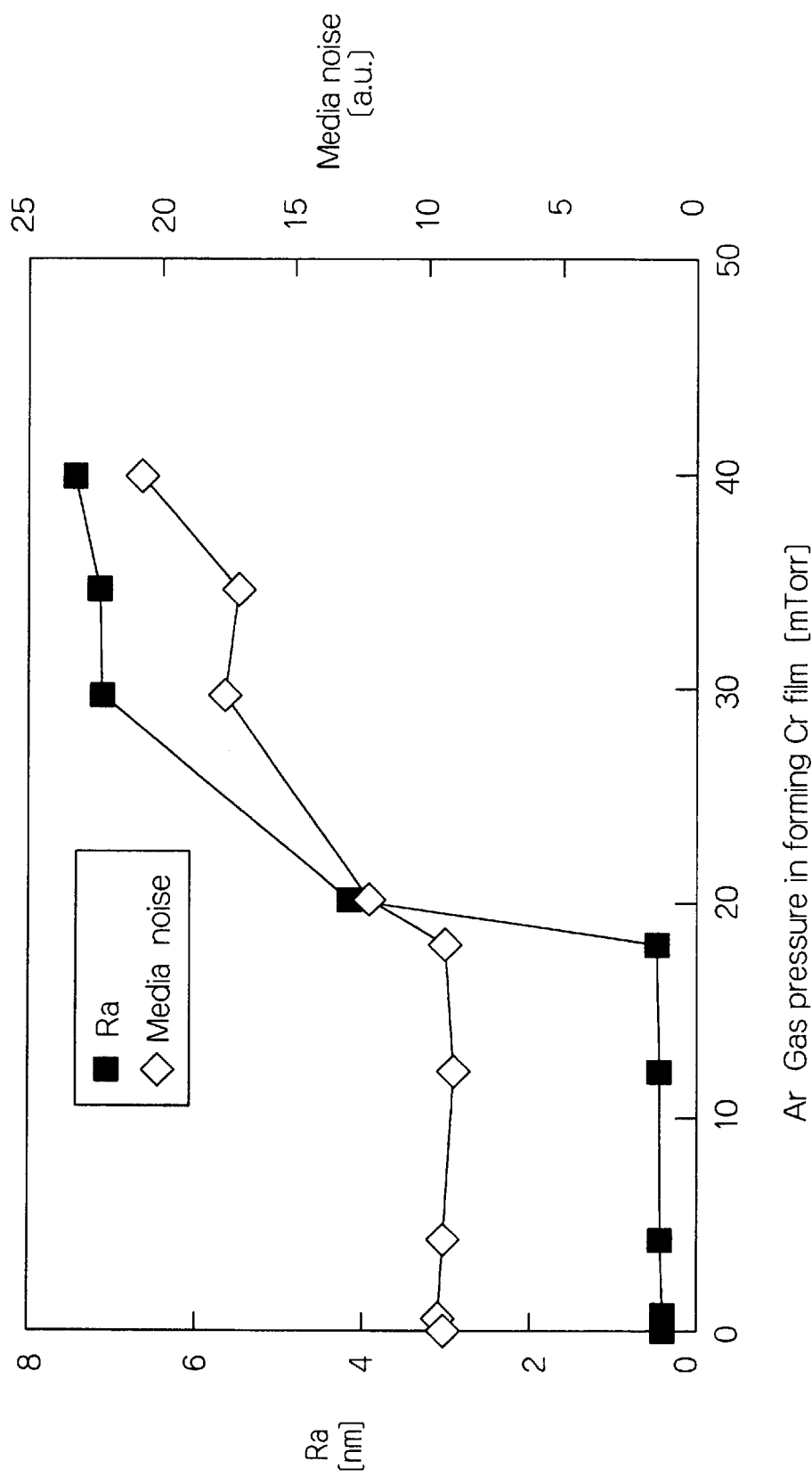
FIG. 70 is a graph showing relationship of argon gas pressure in film formation and Ra of Cr film, and media noise in example 9 of the perpendicular magnetic recording medium of FIG. 58.

FIGS. 69 and 70 show a relationship between the argon gas pressure at film formation and Ra of the Cr film when the argon gas pressure is varied between 0.5–40 mTorr, and the media noise. This makes clear that Ra rapidly increases when the argon gas pressure at film formation of the Cr film exceeds 20–30 mTorr. It is believed because there arises disturbance in the surface smoothness as tapered pillar structures grow on the film surface when the argon gas pressure exceeds 20–30 mTorr. Then, it is believed that rapid increase is observed in the media noise accordingly.

Example 10

Media in which a Cr film and an FeSiAl film are formed at supplied power 0.5 kW (film formation speed 13 nm/s) and 1 kW (film formation speed 25 nm/s) are called an inventive medium CC1 and a comparative medium CC2, respectively.

A half-width value of rocking curve ($\Delta\theta_{50}$) of hcp (002) peak was determined by using the X-ray diffraction to investigate perpendicular orientation of the perpendicular-magnetizing film of the inventive medium CC1 and the comparative medium CC2 similar to example 8. FIG. 71 shows surface roughness Ra of each medium together with their values. As seen from FIG. 71, the surface smoothness of Cr and FeSiAl films can be improved by reducing the supplied power at film formation of Cr and FeSiAl films. Then, it can be seen that, as the surface smoothness of the FeSiAl film is improved, the half-width value of rocking curve of hcp (002) peak of the CoCrTa film is reduced from 9.9 to 3.9, leading to improvement of the perpendicular orientation and surface smoothness of the perpendicular magnetizing film.

Figure 72:
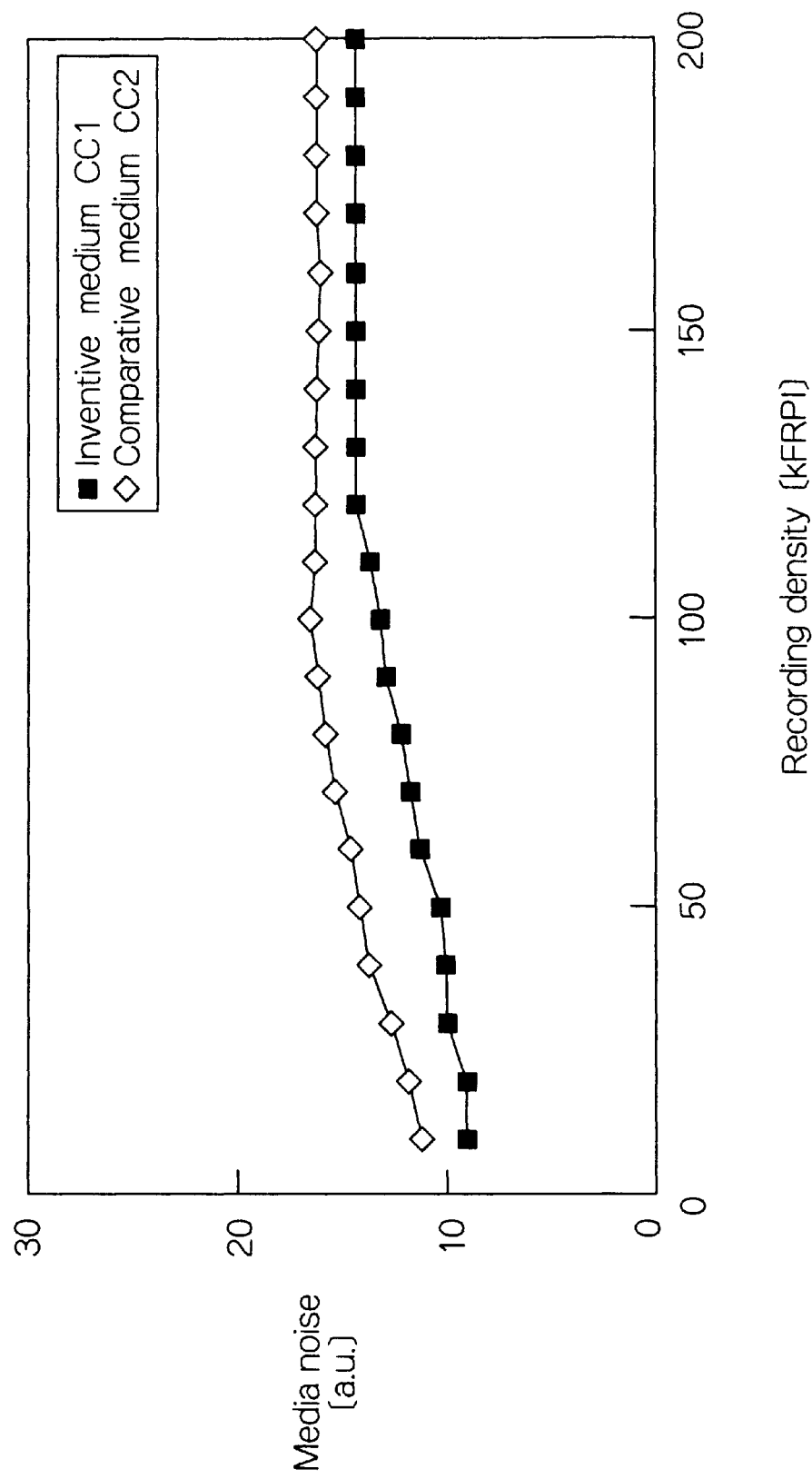
FIG. 72 is a graph showing recording density dependence of media noise in example 10 of the perpendicular magnetic recording medium of FIG. 58.

Similar to example 8, the inventive medium CC1 and the comparative medium CC2 were experimented for read and write by an ID/MR composite head. FIG. 72 shows recording density dependence of media noise. From the above, it can be seen that the inventive medium CC1 has lower media noise in all recording densities, and is much more excellent noise characteristics than the comparative CC2. That is, it is believed that, as the surface smoothness is improved for the Cr and FeSiAl films by reducing the supplied power at film formation of the Cr and FeSiAl films, the surface smoothness is significantly improved for the Cr and FeSiAl films, so that low noise can be attained as in example 8.

Figure 73:
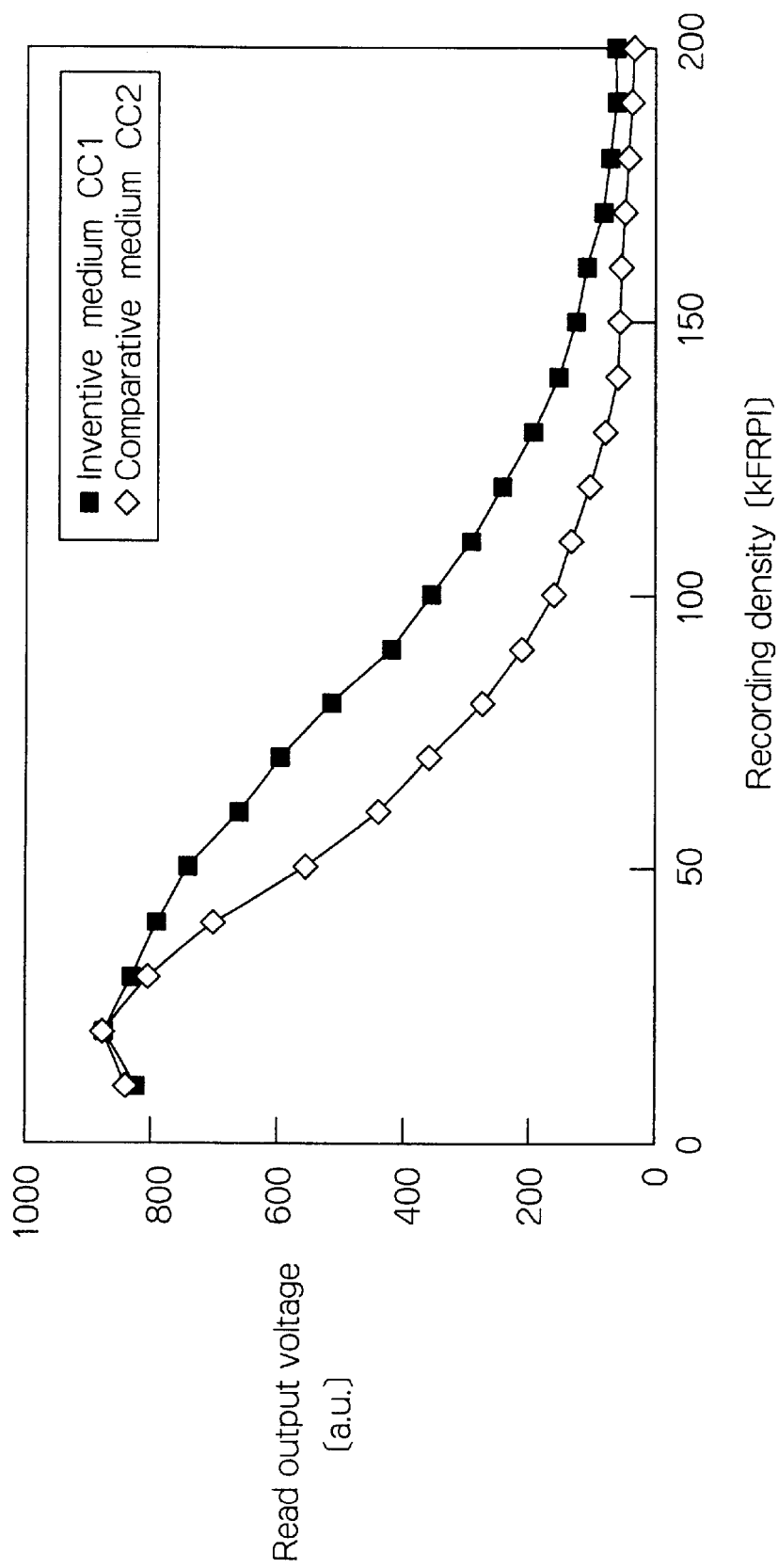
FIG. 73 is a graph showing recording density dependence of read output voltage in example 10 of the perpendicular magnetic recording medium of FIG. 58.

FIG. 73 shows recording density dependence of read output voltage, Since, in the inventive medium CC1, attenuation of output as the recording density increases delays than the comparative medium CC2, high output can be maintained to higher recording density, so that higher recording density can be easily attained. It is believed that, similar to example 8, improvement of perpendicular orientation of the perpendicular magnetizing film leads to improvement of the recording density dependence of output.

Figure 74:
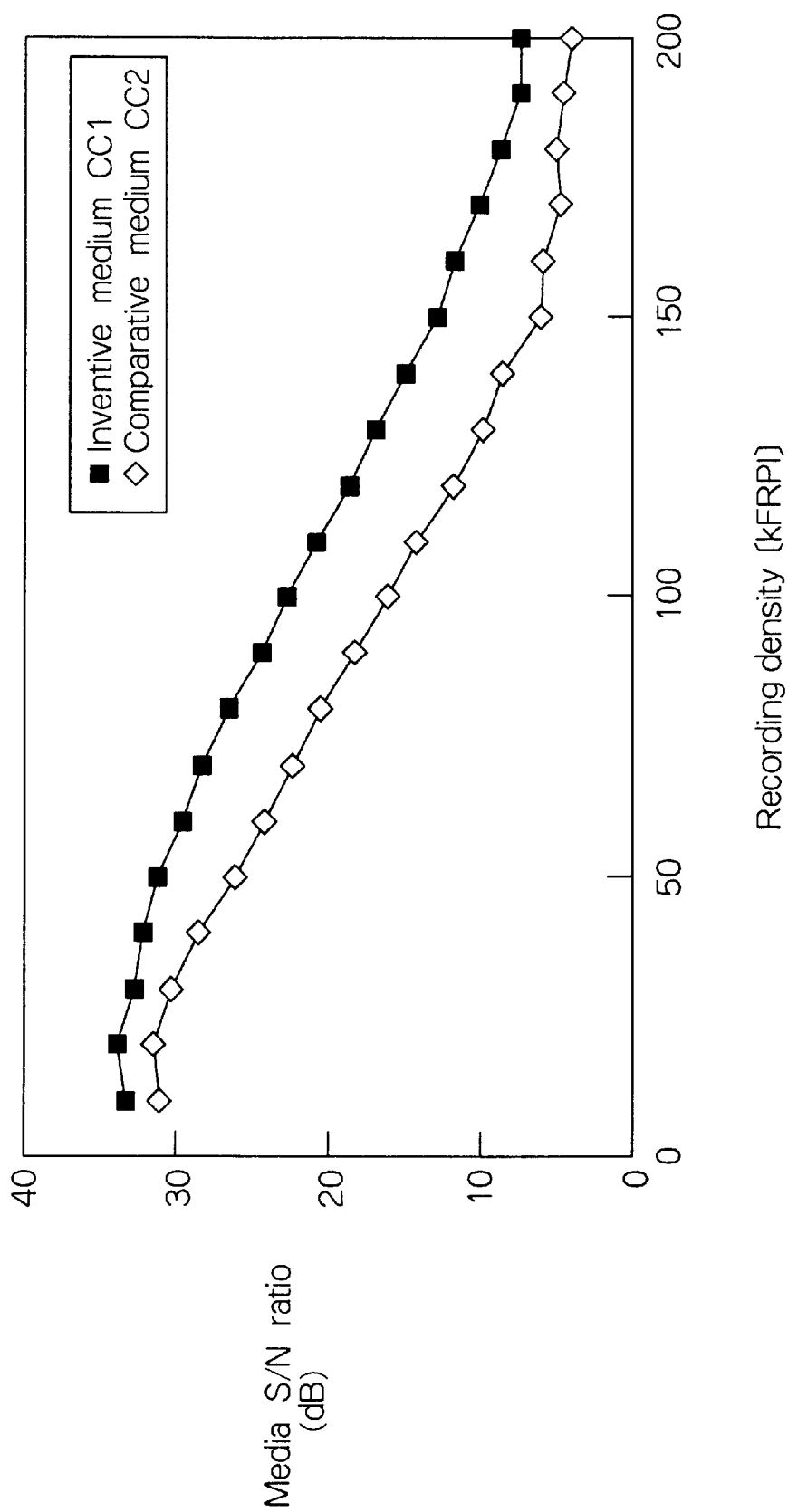
FIG. 74 is a graph showing recording density dependence of media S/N ratio in example 10 of the perpendicular magnetic recording medium of FIG. 58.

FIG. 74 shows recording density dependence of media S/N ratio. From the above, it can be seen that the inventive medium CC1 has better media S/N ratio in all recording densities than the comparative medium CC2 by 1–6 dB, so that it is an excellent medium as a magnetic disk medium accommodating the high recording density. That is, high recording density can be easily attained by using the inventive medium CC1.

FIGS. 75 and 76 show a relationship between the film formation speed and Ra when the Cr film is varied between 0.1 nm/s–25 nm/s, and media noise. This makes clear that Ra rapidly increases when the film formation speed exceeds 18–20 nm/s. It is believed because there arises disturbance in the surface smoothness as crystal grains grow on the film surface when the film formation speed exceeds 18–20 nm/s. Then, it is believed that rapid increase is observed in the media noise accordingly.

Example 11

Media corresponding to the inventive medium AA1 and the comparative medium AA2 using a an FeTaN film in place of the FeSiAl film in example 8 are called an inventive medium DD1 and a comparative medium DD2, respectively.

A half-width value of rocking curve ($\Delta\theta_{50}$) of hcp (002) peak was determined by using the X-ray diffraction to investigate perpendicular orientation of the perpendicular magnetizing film of the inventive medium DD1 and the comparative medium DD2, FIG. 77 shows surface roughness Ra of each medium together with their values. As described for example 8, surface smoothness of the Cr film is significantly improved by reducing the film thickness of Cr film. Then, it can be seen that surface smoothness of the FeTaN film can be improved with this improvement. Then, similar to example 8, it can be seen that, as the surface smoothness of the FeTaN film is improved, the half-width value of rocking curve of hcp (002) peak of the CoCrTa film is reduced from 6.8 to 3.6, leading to improvement of the perpendicular orientation and surface smoothness of the perpendicular magnetizing film.

Figure 78:
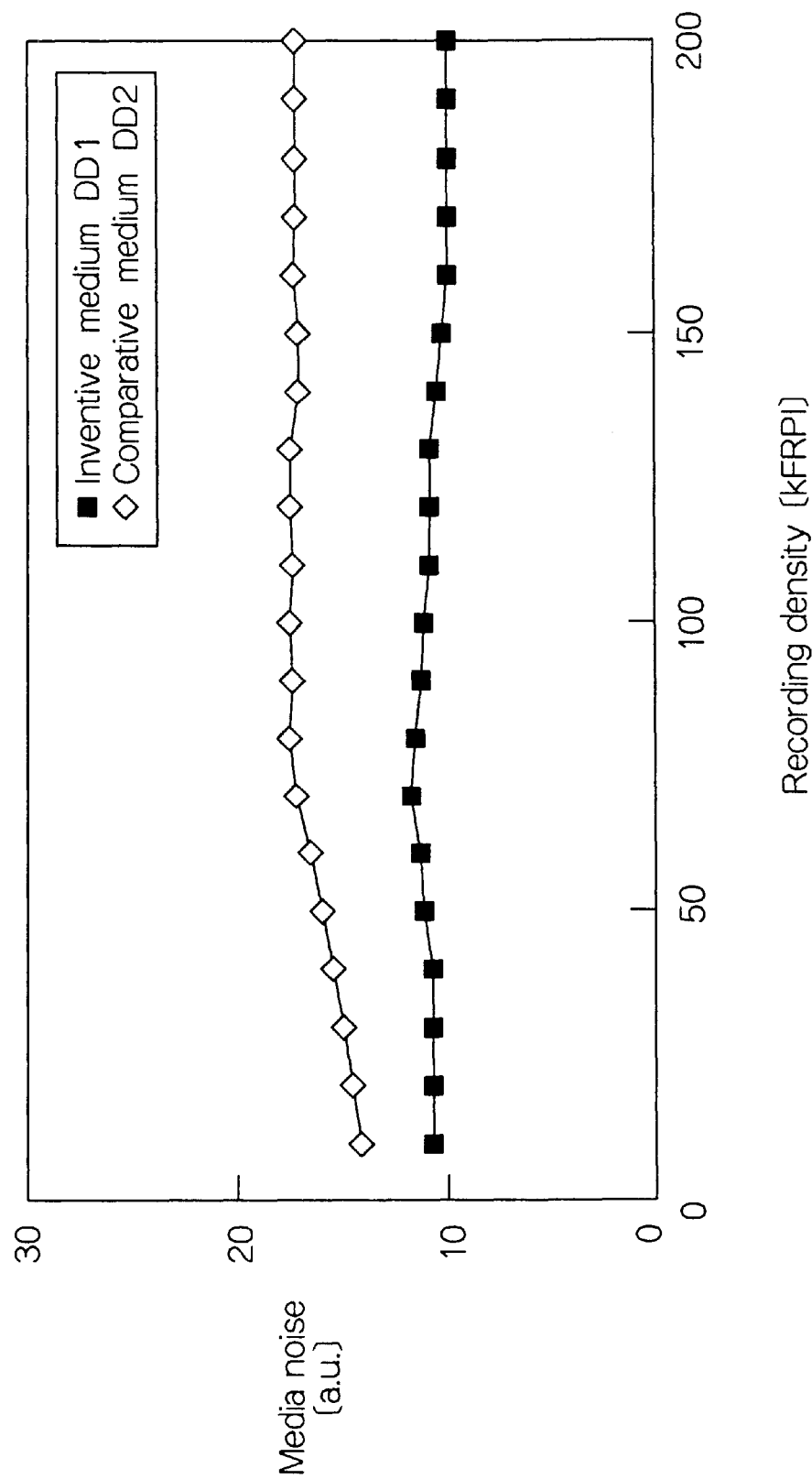
FIG. 78 is a graph showing recording density dependence of media noise in example 11 of the perpendicular magnetic recording medium of FIG. 58.

Similar to example 8, the inventive medium DD1 and the comparative medium DD2 were experimented for read and write by an ID/MR composite head. FIG. 78 shows recording density dependence of media noise. From the above, it can be seen that the inventive medium DD1 has lower media noise in all recording densities, and is much more excellent noise characteristics than the comparative DD2. That is, similar to example 8, it is believed that, as the surface smoothness is improved for the FeSiN film by reducing the film thickness of the Cr film, the film thickness can be reduced for the initial layer of the perpendicular magnetizing film, so that low noise can be attained.

Figure 79:
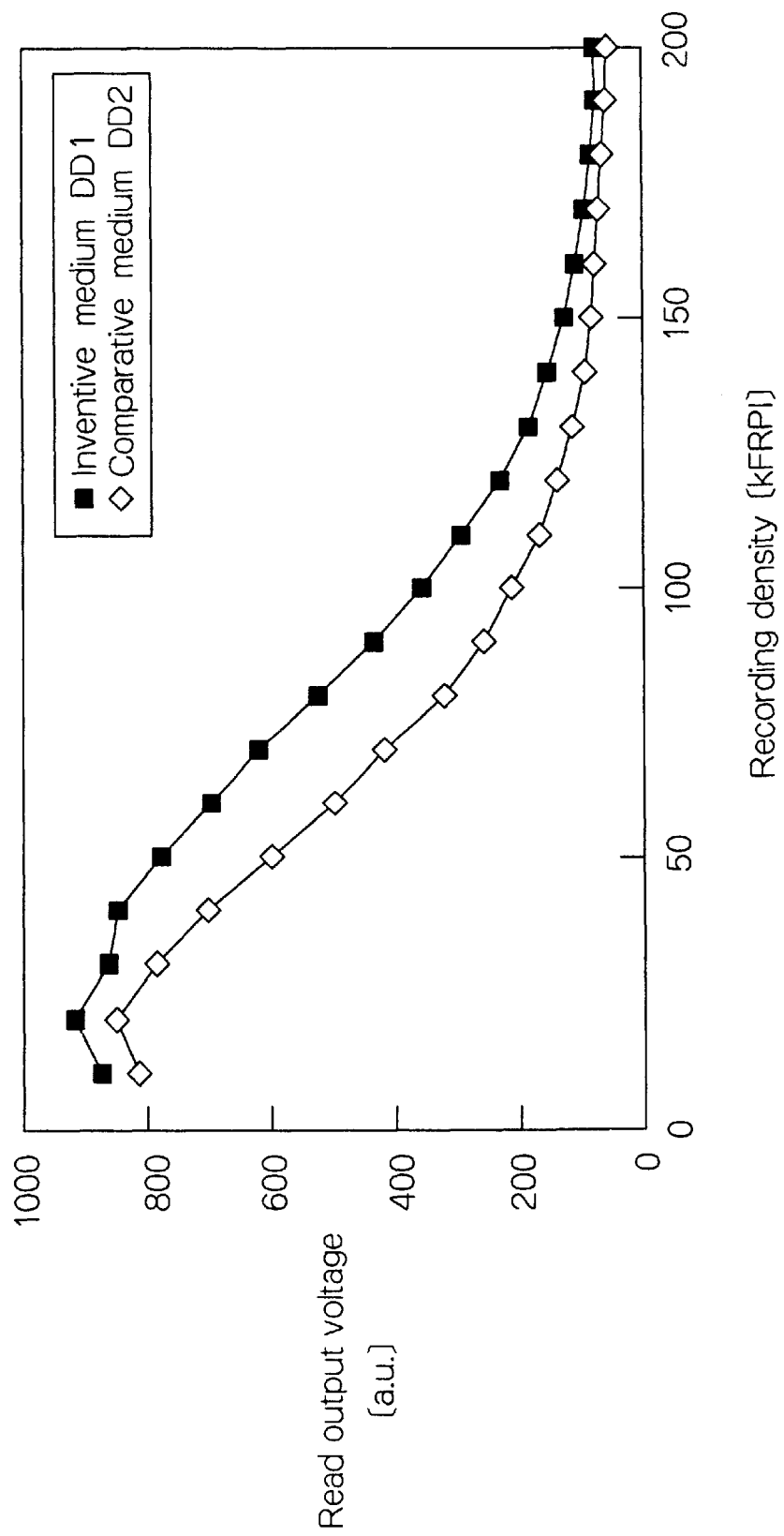
FIG. 79 is a graph showing recording density dependence of read output voltage in example 11 of the perpendicular magnetic recording medium of FIG. 58.

FIG. 79 shows recording density dependence of read output signal. Since, in the inventive medium DD1, attenuation of output as the recording density increases delays than the comparative medium DD2, high output can be maintained to higher recording density, so that higher recording density can be easily attained. It is believed that, similar to example 8, improvement of perpendicular orientation of the perpendicular magnetizing film leads to improvement of the recording density dependence of output.

Figure 80:
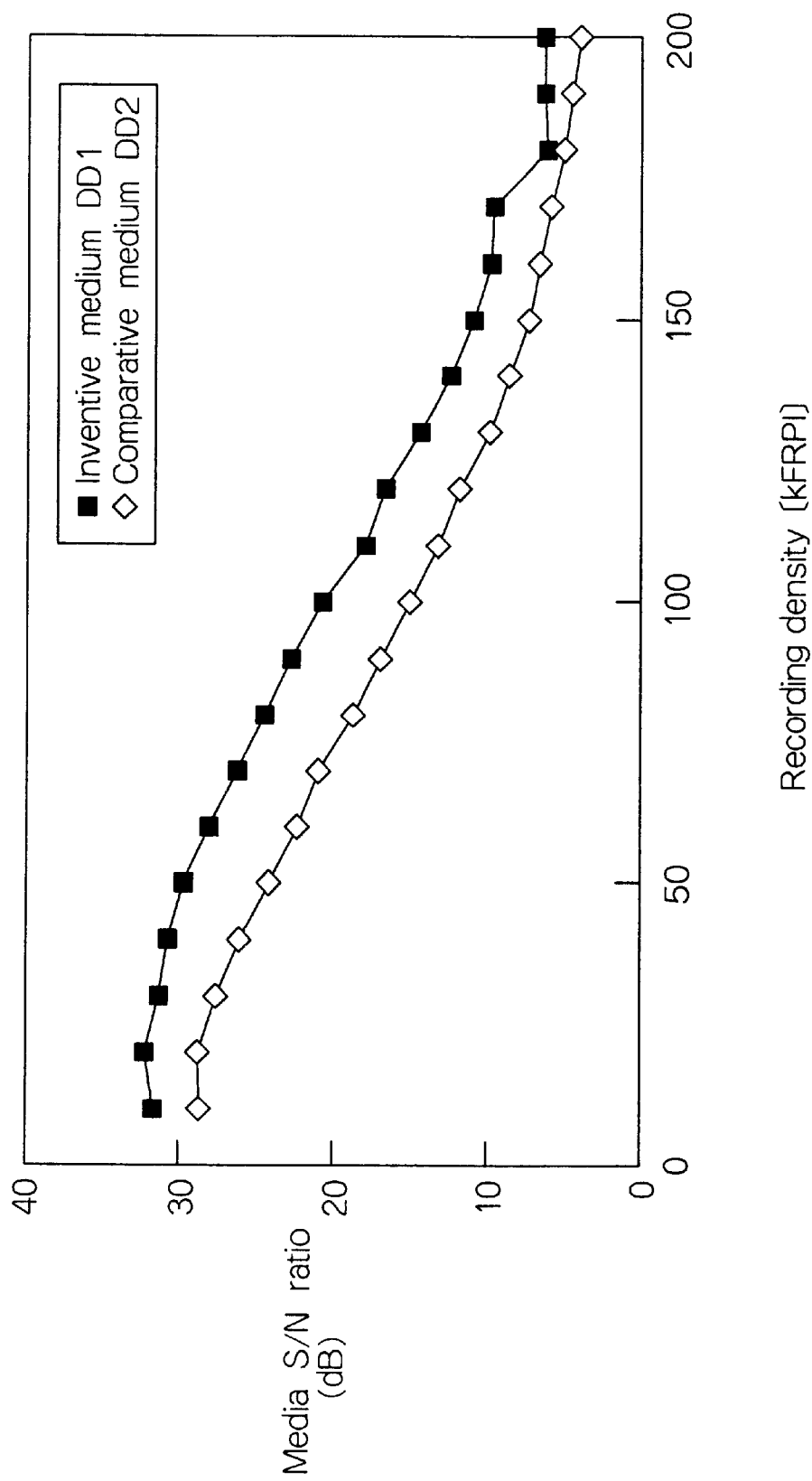
FIG. 80 is a graph showing recording density dependence of media S/N ratio in example 11 of the perpendicular magnetic recording medium of FIG. 58.
Figure 82:
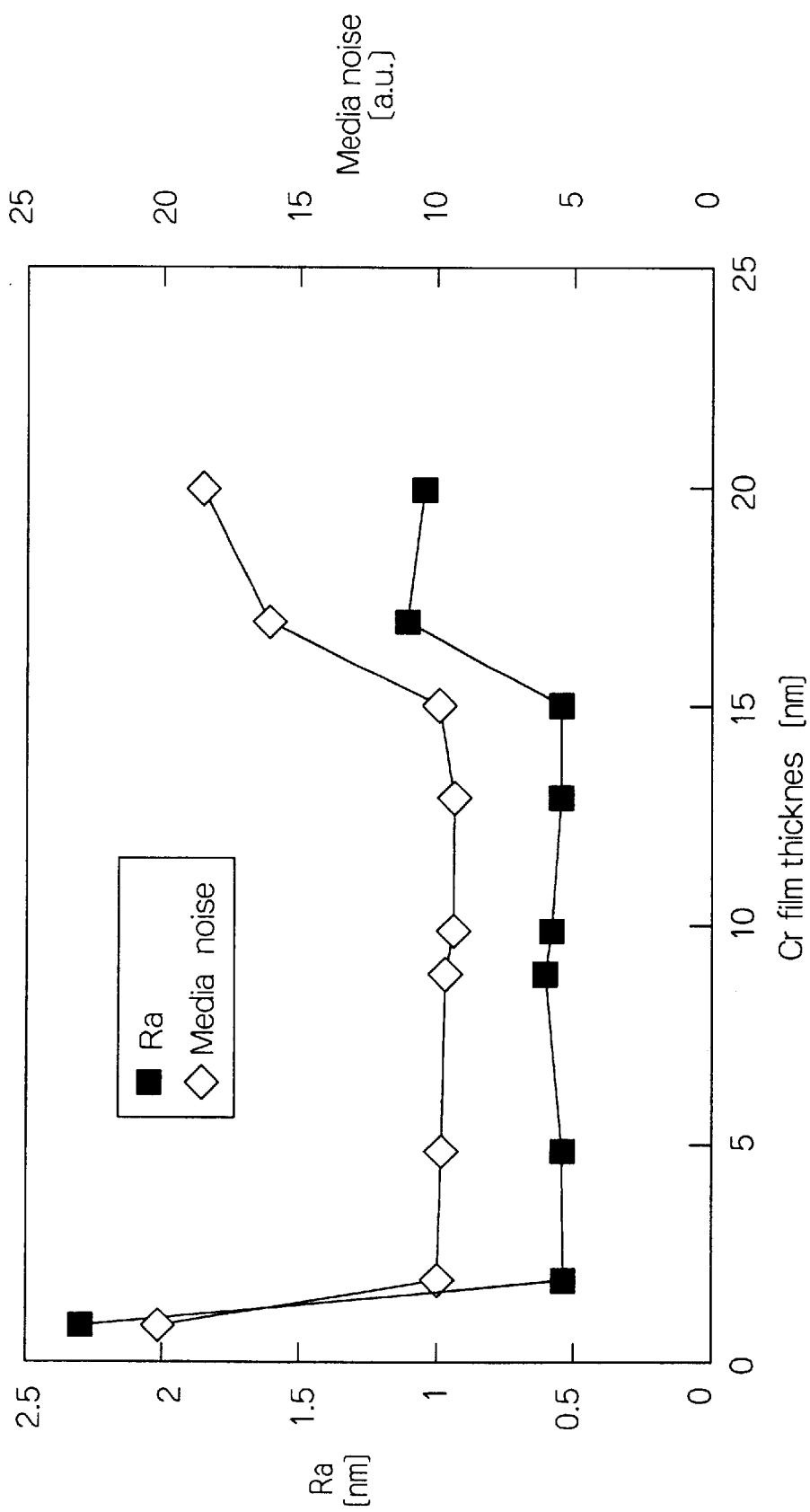
FIG. 82 is a graph showing relationship of film thickness and Ra of Cr film, and media noise in example 11 of the perpendicular magnetic recording medium of FIG. 58.

FIG. 80 shows recording density dependence of media S/N ratio. From the above, it can be seen that the inventive medium DD1 has better media S/N ratio in all recording densities than the comparative medium DD2 by 2–5 dB, so that it is an excellent medium as a magnetic disk medium accommodating the high recording density. That is, high recording density can be easily attained by using the inventive medium DD1.

FIGS. 81 and 22 show a relationship between the film thickness and surface roughness Ra of the Cr film when the Cr film thickness is varied between 1–20 nm, and the media noise. It can be seen that Ra rapidly increases if the film thickness of Cr film exceeds 15–17 nm. It is believed because there arises disturbance in the surface smoothness as crystal grains grow on the film surface when the film thickness exceeds 15–17 nm. Then, rapid increase is observed in the media noise accordingly. In addition, Ra would increase if the film thickness of Cr film is made too thin to 1–2 nm. It is believed that a uniform film is not formed on the substrate at the film thickness of 1–2 nm, so that an island structure is caused to degrade the surface smoothness. Increase of media noise is also observed according to it.

Example 12

Media formed using FeTaN in place of FeSiAl in example 8 and under the film formation conditions where the argon gas pressure is 4 and 20 mTorr for the Cr and FeTaN films are called an inventive example EE1 and a comparative example EE2.

A half-width value of rocking curve ($\Delta\theta_{50}$) of hcp (002) peak was determined by using the X-ray diffraction to investigate perpendicular orientation of the perpendicular magnetizing film of the inventive medium EE1 and the comparative medium EE2 similar to example 8. FIG. 83 shows surface roughness Ra of each medium together with their values. As seen from FIG. 83, the surface smoothness of Cr and FeTaN films can be significantly improved by reducing the argon gas pressure at film formation of Cr and FeTaN films. Then, it can be seen that, as the surface smoothness of the FeTaN film is improved, the half-width value of rocking curve of hcp (002) peak of the CoCrTa film is reduced from 12.6 to 3.6, leading to improvement of the perpendicular orientation and surface smoothness of the perpendicular magnetizing film.

Figure 84:
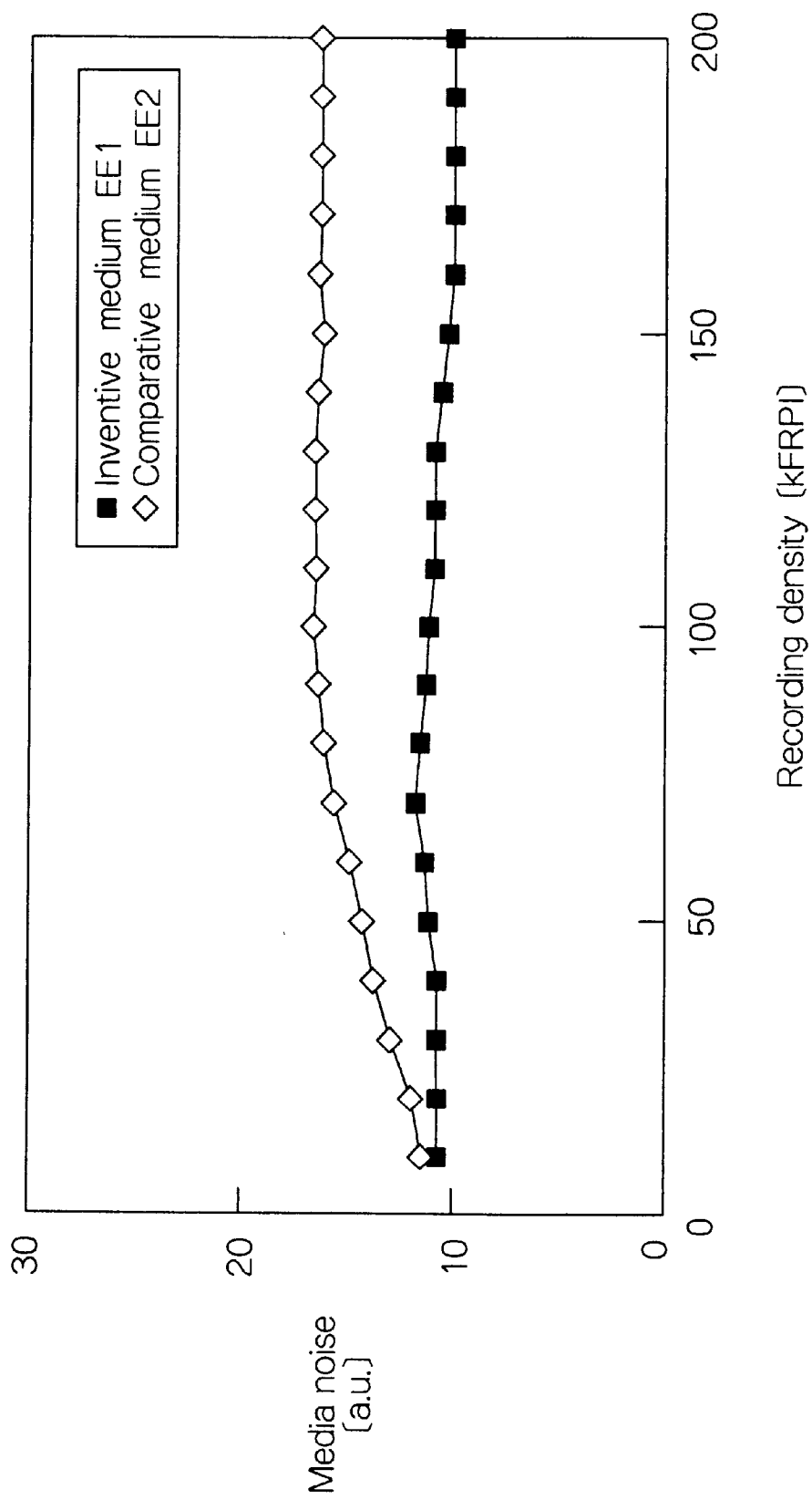
FIG. 84 is a graph showing recording density dependence of media noise in example 12 of the perpendicular magnetic recording medium of FIG. 58.

Similar to example 8, the inventive medium EE1 and the comparative medium EE2 were experimented for read and write by an ID/MR composite head. FIG. 84 shows recording density dependence of media noise. From the above, it can be seen that the inventive medium EE1 has lower media noise in all recording densities, and is much more excellent noise characteristics than the comparative EE2. That is, it is believed that, as the surface smoothness is improved for the Cr and FeTaN films by reducing the argon gas pressure at film formation of the Cr and FeTaN films, the surface smoothness is significantly improved for the Cr and FeTaN films, so that low noise can be attained as in example 8.

Figure 85:
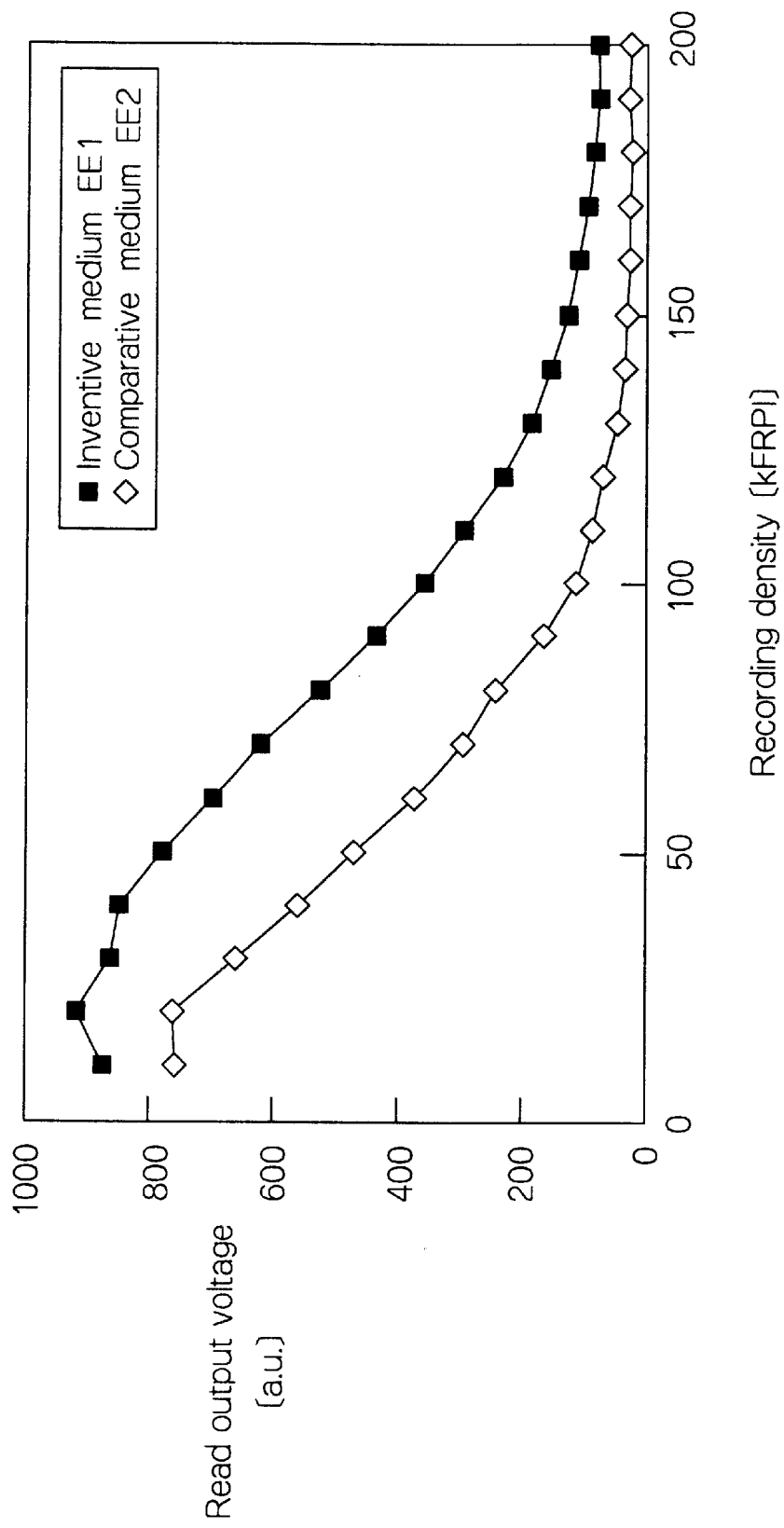
FIG. 85 is a graph showing recording density dependence of read output voltage in example 12 of the perpendicular magnetic recording medium of FIG. 58.

FIG. 85 shows recording density dependence of read output voltage. Since, in the inventive medium EE1, attenuation of output as the recording density increases delays than the comparative medium EE2, high output can be maintained to higher recording density, so that higher recording density can be easily attained. Similar to example 8, it is believed that improvement of perpendicular orientation of the perpendicular magnetizing film leads to improvement of the recording density dependence of output.

Figure 86:
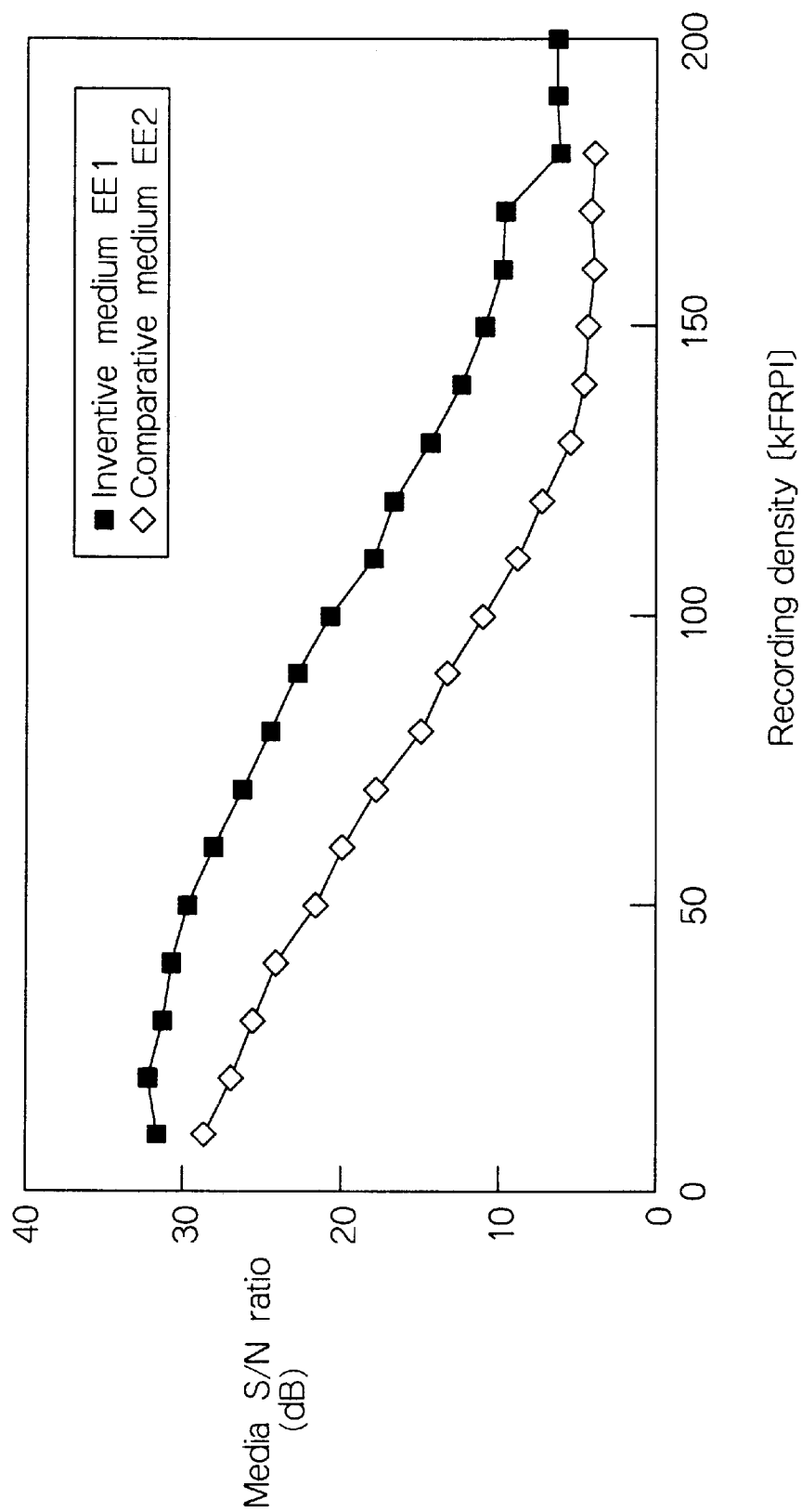
FIG. 86 is a graph showing recording density dependence of media S/N ratio in example 12 of the perpendicular magnetic recording medium of FIG. 58.

FIG. 86 shows recording density dependence of media S/N ratio. From the above, it can be seen that the inventive medium EE1 has better media S/N ratio in all recording densities than the comparative medium EE2 by 2–8 dB, so that it is an excellent medium as a magnetic disk medium accommodating the high recording density. That is, high recording density can be easily attained by using the inventive medium EE1.

Figure 88:
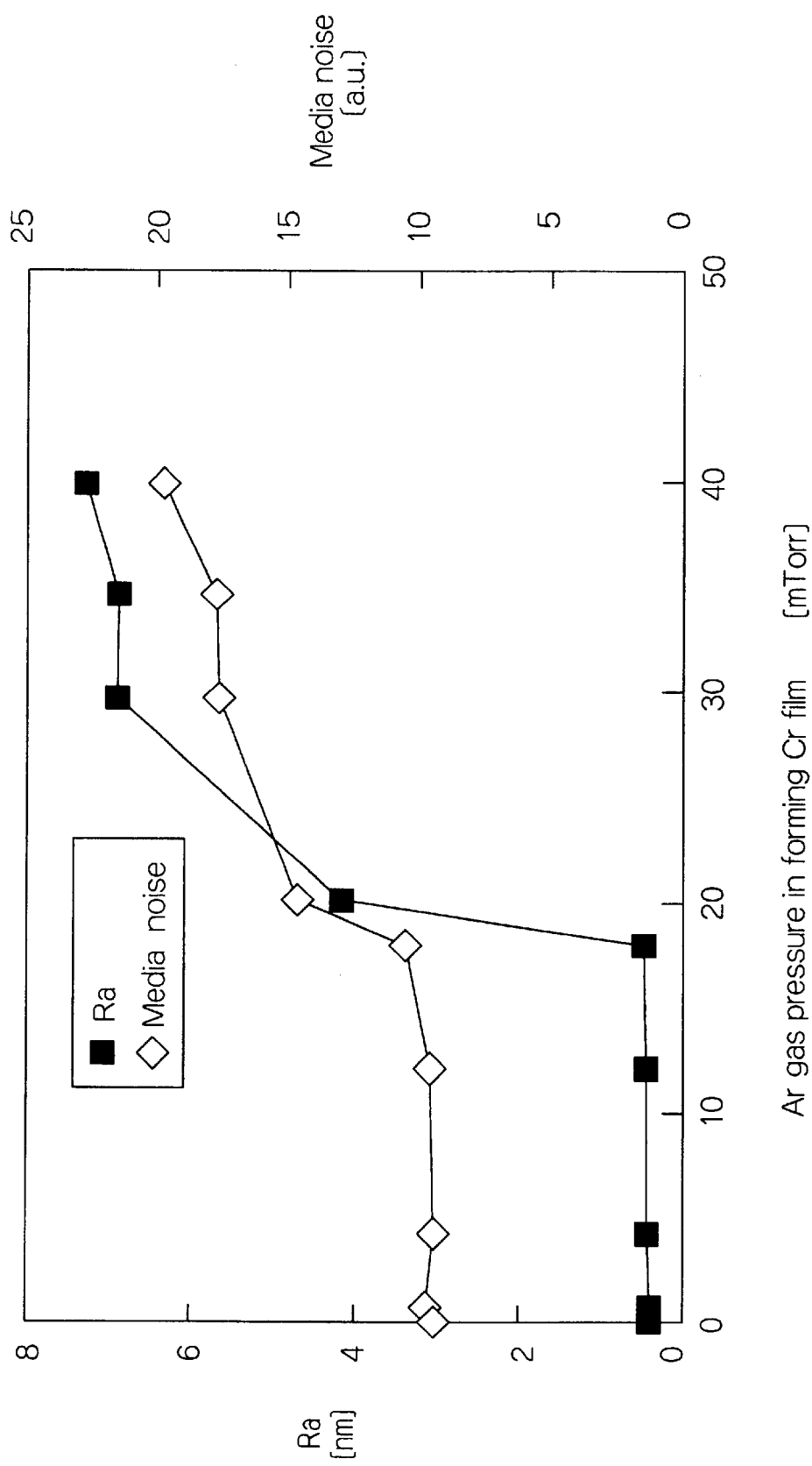
FIG. 88 is a graph showing relationship of argon gas pressure in film formation and Ra of Cr film, and media noise in example 12 of the perpendicular magnetic recording medium of FIG. 58.

FIGS. 87 and 88 show a relationship between the argon gas pressure at film formation and Ra of the Cr film when the argon gas pressure is varied between 0.5–40 mTorr, and the media noise. This makes clear that Ra rapidly increases when the argon gas pressure at film formation of the Cr film exceeds 20–30 mTorr. It is believed because there arises disturbance in the surface smoothness as tapered pillar structures grow on the film surface when the argon gas pressure exceeds 20–30 mTorr. Then, it is believed that rapid increase is observed in the media noise accordingly.

Example 13

Media using an FeTaN film in place of the FeSiAl film in example 8, with the Cr and FeTaN films formed at supplied power at film formation 0.5 kW (film formation speed 13 nm/s) and 1 kW (film formation speed 25 nm/s) are called an inventive medium FF1 and a comparative medium FF2, respectively.

A half-width value of rocking curve ($\Delta\theta_{50}$) of hcp (002) peak was determined by using the X-ray diffraction to investigate perpendicular orientation of the inventive medium FF1 and the comparative medium FF2 similar to example 8. FIG. 89 shows surface roughness Ra of each medium together with their values. As seen from FIG. 89, the surface smoothness of Cr and FeTaN films can be significantly improved by reducing the supplied power at film formation of Cr and FeTaN films. Then, it can be seen that, as the surface smoothness of the FeTaN film is improved, the half-width value of rocking curve of hcp (002) peak of the CoCrTa film is reduced from 10.9 to 3.6, leading to improvement of the perpendicular orientation and surface smoothness of the perpendicular magnetizing film.

Figure 90:
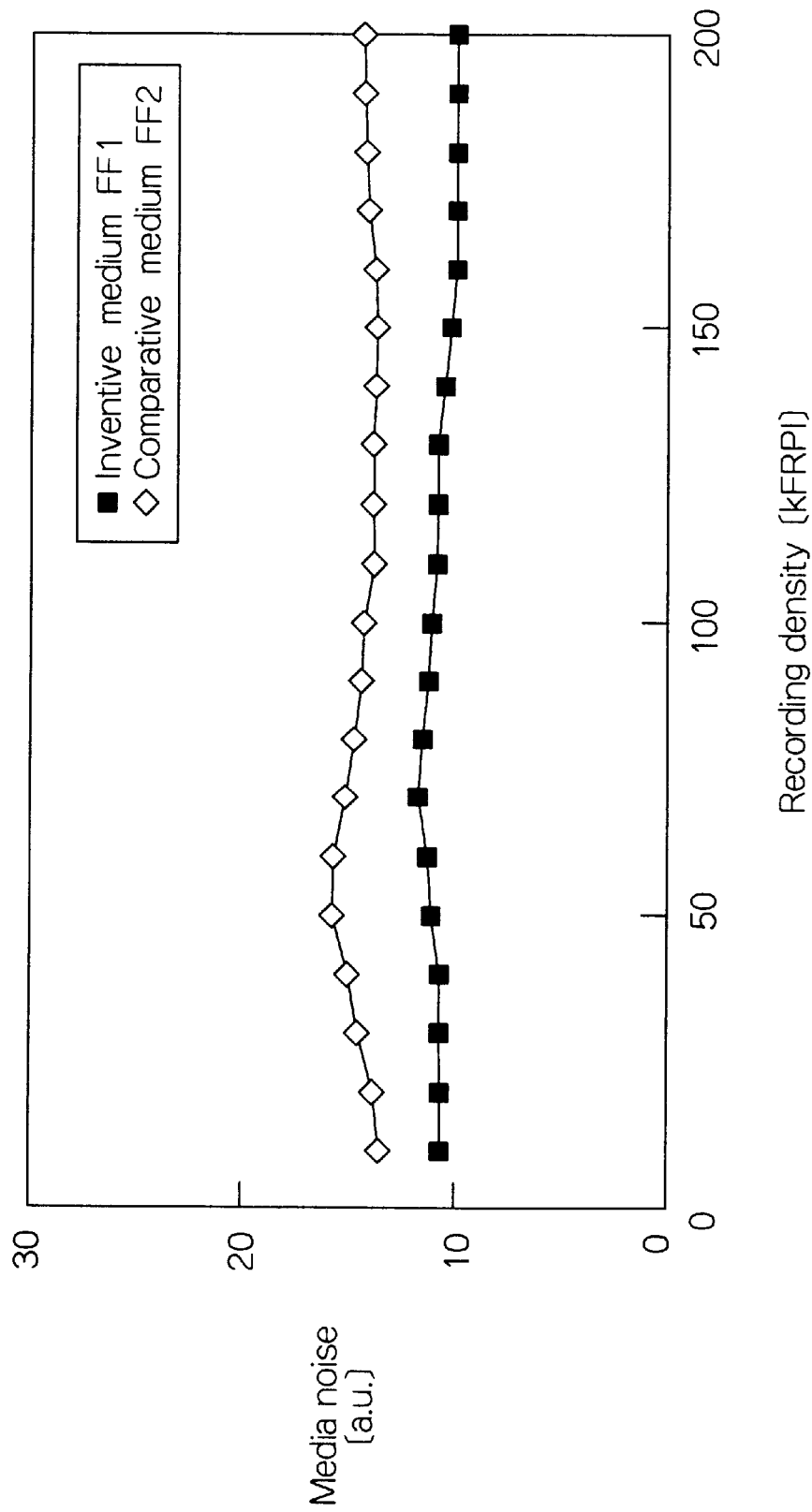
FIG. 90 is a graph showing recording density dependence of media noise in example 13 of the perpendicular magnetic recording medium of FIG. 58.

Similar to example 8, the inventive medium FF1 and the comparative medium FF2 were experimented for read and write by an ID/MR composite head. FIG. 90 shows recording density dependence of media noise. From the above, it can be seen that the inventive medium FF1 has lower media noise in all recording densities, and is much more excellent noise characteristics than the comparative FF2. That is, it is believed that, as the surface smoothness is improved for the Cr and FeTaN films by reducing the supplied power at film formation of the Cr and FeTaN films, the surface smoothness is significantly improved for Cr and FeTaN films, so that low noise can be attained as in example 8.

FIG. 91 shows recording density dependence of read output voltage. Since, in the inventive medium FF1, attenuation of output as the recording density increases delays than the comparative medium FF2, high output can be maintained to higher recording density, so that higher recording density can be easily attained. Similar to example 8, it is believed that improvement of perpendicular orientation of the perpendicular magnetizing film leads to improvement of the recording density dependence of output.

FIG. 92 shows recording density dependence of media S/N ratio. From the above, it can be seen that the inventive medium FF1 has better media S/N ratio in all recording densities than the comparative medium FF2 by 1–10 dB, so that it is an excellent medium as a magnetic disk medium accommodating the high recording density. That is, high recording density can be easily attained by using the inventive medium FF1.

FIGS. 93 and 94 show a relationship between the film formation speed and Ra when the Cr film is varied between 0.1 nm/s–25 nm/s, and media noise. This makes clear that Ra rapidly increases when the film formation speed exceeds 18–20 nm/s. It is believed because there arises disturbance in the surface smoothness as crystal grains grow on the film surface when the film formation speed exceeds 18–20 nm/s. Then, it is believed that rapid increase is observed in the media noise accordingly.

According to the perpendicular magnetic recording medium of the present invention and its manufacturing process, since the surface smoothness of the soft magnetic underlayer film can be significantly improved by inserting a Cr film with a specific film thickness between the substrate and the soft magnetic underlayer film, it is possible to improve the perpendicular orientation and the surface smoothness of the perpendicular magnetizing film. Therefore, the media noise can be reduced, so that the recording density dependence of read output voltage can be improved.

What is claimed is:

1. A perpendicular magnetic recording medium comprising a soft magnetic underlayer film, and a perpendicular magnetizing film, said films being formed on a substrate in this order, wherein an elemental Cr film is inserted between said substrate and said soft magnetic underlayer film.

2. The perpendicular magnetic recording medium as set forth in claim 1, wherein said soft magnetic underlayer film is an FeSiAl film.

3. The perpendicular magnetic recording medium as set forth in claim 2, wherein said perpendicular magnetizing film is a CoCrTa film.

4. The perpendicular magnetic recording medium as set forth in claim 2, wherein a Ti film or non-magnetic CoCr film is inserted between said soft magnetic underlayer film and said perpendicular magnetizing film.

5. The perpendicular magnetic recording medium as set forth in claim 1, wherein the average roughness on the centerline on the surface of said soft magnetic underlayer film is 2 nm or less.

6. The perpendicular magnetic recording medium as set forth in claim 1, wherein the average roughness on the centerline on the surface of said soft magnetic underlayer film is 0.9 nm or less.

7. The perpendicular magnetic recording medium as set forth in claim 1, wherein the average roughness on the centerline on the surface of said soft magnetic underlayer film is 0.5 nm or less.

8. The perpendicular magnetic recording medium as set forth in claim 1, wherein said soft magnetic underlayer film is sputter formed under a gas pressure of less than 20 mTorr.

9. The perpendicular magnetic recording medium as set forth in claim 1, wherein said soft magnetic underlayer film is sputter formed under a gas pressure of 4 mTorr or less.

10. The perpendicular magnetic recording film as set forth in claim 8, wherein the type of said gas is argon.

11. The perpendicular magnetic recording film as set forth in claim 9, wherein the type of said gas is argon.

12. The perpendicular magnetic recording medium as set forth in claim 1, wherein said perpendicular magnetizing film has a film thickness of more than 20 nm but 150 nm or less.

13. The perpendicular magnetic recording medium as set forth in claim 1, wherein said perpendicular magnetizing film has a film thickness of 50 nm or more but 150 nm or less.

14. A process for manufacturing the perpendicular magnetic recording medium as set forth in claim 8 comprising the steps of sputter forming said soft magnetic underlayer film on said substrate under a gas pressure less than 20 mTorr, and then forming said perpendicular magnetizing film on said soft magnetic underlayer film.

15. A process for manufacturing the perpendicular magnetic recording medium as set forth in claim 9 comprising the steps of sputter forming said soft magnetic underlayer film on said substrate under a gas pressure 4 mTorr or less, and then forming said perpendicular magnetizing film on said soft magnetic underlayer film.

16. The process for manufacturing perpendicular magnetic recording film as set forth in claim 14, wherein the type of said gas is argon.

17. The process for manufacturing perpendicular magnetic recording film as set forth in claim 15, wherein the type of said gas is argon.

18. A perpendicular magnetic recording medium comprising a soft magnetic underlayer film, and a perpendicular magnetizing film, said films being formed on a substrate in this order, wherein
   a smoothness control film is inserted between said substrate and said soft magnetic underlayer film, said smoothness control film consisting of elemental Cr.

19. A perpendicular magnetic recording medium comprising a soft magnetic underlayer film, and a perpendicular magnetizing film, said films being formed on a substrate in this order, wherein
   a smoothness control film is inserted between said substrate and said soft magnetic underlayer film, said smoothness control film consisting of an alloy containing at least one of Cr and C, and
   the soft magnetic underlayer film is an FeSiAl film or an FeTaN film.

20. The perpendicular magnetic recording medium as set forth in claim 18, wherein said soft magnetic underlayer film is an FeSiAl film or an FeTaN film.

21. The perpendicular magnetic recording medium as set forth in claim 18, wherein the average roughness on the centerline on the surface of said soft magnetic underlayer film is 2 nm or less.

22. The perpendicular magnetic recording medium as set forth in claim 19, wherein the average roughness on the centerline on the surface of said soft magnetic underlayer film is 2 nm or less.

23. The perpendicular magnetic recording medium as set forth in claim 18, wherein the average roughness on the centerline on the surface of said soft magnetic underlayer film is 0.9 nm or less.

24. The perpendicular magnetic recording medium as set forth in claim 19, wherein the average roughness on the centerline on the surface of said soft magnetic underlayer film is 0.9 nm or less.

25. The perpendicular magnetic recording medium as set forth in claim 18, wherein the average roughness on the centerline on the surface of said soft magnetic underlayer film is 0.5 nm or less.

26. The perpendicular magnetic recording medium as set forth in claim 19, wherein the average roughness on the centerline on the surface of said soft magnetic underlayer film is 0.5 nm or less.

27. The perpendicular magnetic recording medium as set forth in claim 18, wherein said smoothness control film has a film thickness of more than 1 nm but less than 17 nm.

28. The perpendicular magnetic recording medium as set forth in claim 19, wherein said smoothness control film has a film thickness of more than 1 nm but less than 17 nm.

29. The perpendicular magnetic recording medium as set forth in claim 18, wherein said smoothness control film has a film thickness of 2 nm or more but 15 nm or less.

30. The perpendicular magnetic recording medium as set forth in claim 19, wherein said smoothness control film has a film thickness of 2 nm or more but 15 nm or less.

31. The perpendicular magnetic recording medium as set forth in claim 18, wherein said smoothness control film is sputter formed under a gas pressure of less than 20 mTorr.

32. The perpendicular magnetic recording medium as set forth in claim 19, wherein said smoothness control film is sputter formed under a gas pressure of less than 20 mTorr.

33. The perpendicular magnetic recording medium as set forth in claim 18, wherein said smoothness control film is sputter formed under a gas pressure of 18 mTorr or less.

34. The perpendicular magnetic recording medium as set forth in claim 19, wherein said smoothness control film is sputter formed under a gas pressure of 18 mTorr or less.

35. The perpendicular magnetic recording medium as set forth in claim 18, wherein said smoothness control film is sputter formed at a film formation speed of less than 20 nm/s.

36. The perpendicular magnetic recording medium as set forth in claim 19, wherein said smoothness control film is sputter formed at a film formation speed of less than 20 nm/s.

37. The perpendicular magnetic recording medium as set forth in claim 18, wherein said smoothness control film is sputter formed at a film formation speed of 18 nm/s or less.

38. The perpendicular magnetic recording medium as set forth in claim 19, wherein said smoothness control film is sputter formed at a film formation speed of 18 nm/s or less.

39. The perpendicular magnetic recording medium as set forth in claim 31, wherein argon is the gas used for said sputter film formation.

40. The perpendicular magnetic recording medium as set forth in claim 32, wherein argon is the gas used for said sputter film formation.

41. A process for manufacturing the perpendicular magnetic recording medium as set forth in claim 31 comprising the steps of sputter forming said smoothness control film on said substrate under a gas pressure less than 20 mTorr, forming said soft magnetic underlayer film on said smoothness control film, and then forming said perpendicular magnetizing film on said soft magnetic underlayer film.

42. A process for manufacturing the perpendicular magnetic recording medium as set forth in claim 32 comprising the steps of sputter forming said smoothness control film on said substrate under a gas pressure less than 20 mTorr, forming said soft magnetic underlayer film on said smoothness control film, and then forming said perpendicular magnetizing film on said soft magnetic underlayer film.

43. A process for manufacturing the perpendicular magnetic recording medium as set forth in claim 33 comprising the steps of sputter forming said smoothness control film on said substrate under a gas pressure of 18 mTorr or less, forming said soft magnetic underlayer film on said smoothness control film, and then forming said perpendicular magnetizing film on said soft magnetic underlayer film.

44. A process for manufacturing the perpendicular magnetic recording medium as set forth in claim 34 comprising the steps of sputter forming said smoothness control film on said substrate under a gas pressure of 18 mTorr or less, forming said soft magnetic underlayer film on said smoothness control film, and then forming said perpendicular magnetizing film on said soft magnetic underlayer film.

45. A process for manufacturing the perpendicular magnetic recording medium as set forth in claim 35 comprising the steps of sputter forming said smoothness control film on said substrate at a film formation speed of less than 20 nm/s, forming said soft magnetic underlayer film on said smoothness control film, and then forming said perpendicular magnetizing film on said soft magnetic underlayer film.

46. A process for manufacturing the perpendicular magnetic recording medium as set forth in claim 36 comprising the steps of sputter forming said smoothness control film on said substrate at a film formation speed of less than 20 nm/s, forming said soft magnetic underlayer film on said smoothness control film, and then forming said perpendicular magnetizing film on said soft magnetic underlayer film.

47. A process for manufacturing the perpendicular magnetic recording medium as set forth in claim 37 comprising the steps of sputter forming said smoothness control film on said substrate at a film formation speed of 18 nm/s or less, forming said soft magnetic underlayer film on said smoothness control film, and then forming said perpendicular magnetizing film on said soft magnetic underlayer film.

48. A process for manufacturing the perpendicular magnetic recording medium as set forth in claim 38 comprising the steps of sputter forming said smoothness control film on said substrate at a film formation speed of 18 nm/s or less, forming said soft magnetic underlayer film on said smoothness control film, and then forming said perpendicular magnetizing film on said soft magnetic underlayer film.

49. The process for manufacturing the perpendicular magnetic recording medium as set forth in claim 31, wherein argon is the gas used for said sputter film formation.

50. The process for manufacturing the perpendicular magnetic recording medium as set forth in claim 32, wherein argon is the gas used for said sputter film formation.

51. A perpendicular magnetic recording medium comprising a soft magnetic underlayer film, and a perpendicular magnetizing film, said films being formed on a substrate in this order, wherein
an elemental Cr film is inserted between said substrate and said soft magnetic underlayer film, said Cr film having a film thickness of more than 1 nm but less than 17 nm.

52. A perpendicular magnetic recording medium comprising a soft magnetic underlayer film, and a perpendicular magnetizing film, said films being formed on a substrate in this order, wherein
an elemental Cr film is inserted between said substrate and said soft magnetic underlayer film, said Cr film having a film thickness of 2 nm or more but 15 nm or less.

53. The perpendicular magnetic recording medium as set forth in claim 51, wherein said soft magnetic underlayer film is an FeSiAl film or an FeTaN film.

54. The perpendicular magnetic recording medium as set forth in claim 52, wherein said soft magnetic underlayer film is an FeSiAl film or an FeTaN film.

55. The perpendicular magnetic recording medium as set forth in claim 51, wherein the average roughness on the centerline on the surface of the soft magnetic underlayer film is 2 nm or less.

56. The perpendicular magnetic recording medium as set forth in claim 52, wherein the average roughness on the centerline on the surface of the soft magnetic underlayer film is 2 nm or less.

57. The perpendicular magnetic recording medium as set forth in claim 51, wherein the average roughness on the centerline on the surface of the soft magnetic underlayer film is 0.9 nm or less.

58. The perpendicular magnetic recording medium as set forth in claim 52, wherein the average roughness on the centerline on the surface of the soft magnetic underlayer film is 0.9 nm or less.

59. The perpendicular magnetic recording medium as set forth in claim 51, wherein the average roughness on the centerline on the surface of the soft magnetic underlayer film is 0.5 nm or less.

60. The perpendicular magnetic recording medium as set forth in claim 52, wherein the average roughness on the centerline on the surface of the soft magnetic underlayer film is 0.5 nm or less.

61. The perpendicular magnetic recording medium as set forth in claim 51, wherein said Cr film is sputter formed under a gas pressure less than 20 mTorr.

62. The perpendicular magnetic recording medium as set forth in claim 53, wherein said Cr film is sputter formed under a gas pressure less than 20 mTorr.

63. The perpendicular magnetic recording medium as set forth in claim 51, wherein said Cr film is sputter formed under a gas pressure of 18 mTorr or less.

64. The perpendicular magnetic recording medium as set forth in claim 52, wherein said Cr film is sputter formed under a gas pressure of 18 mTorr or less.

65. The perpendicular magnetic recording medium as set forth in claim 51, wherein said Cr film is sputter formed at a film formation speed of less than 20 nm/s.

66. The perpendicular magnetic recording medium as set forth in claim 52, wherein said Cr film is sputter formed at a film formation speed of less than 20 nm/s.

67. The perpendicular magnetic recording medium as set forth in claim 51, wherein said Cr film is sputter formed under at a film formation speed of 18 nm/s or less.

68. The perpendicular magnetic recording medium as set forth in claim 52, wherein said Cr film is sputter formed at a film formation speed of 18 nm/s or less.

69. The perpendicular magnetic recording medium as set forth in claim 51, wherein argon is the gas used for said sputter film formation.

70. The perpendicular magnetic recording medium as set forth in claim 52, wherein argon is the gas used for said sputter film formation.

71. A process for manufacturing the perpendicular magnetic recording medium as set forth in claim 61 comprising the steps of sputter forming said Cr film on said substrate under a gas pressure less than 20 mTorr, forming said soft magnetic underlayer film on said Cr film, and then forming said perpendicular magnetizing film on said soft magnetic underlayer film.

72. A process for manufacturing the perpendicular magnetic recording medium as set forth in claim 62 comprising the steps of sputter forming said Cr film on said substrate under a gas pressure less than 20 mTorr, forming said soft magnetic underlayer film on said Cr film, and then forming said perpendicular magnetizing film on said soft magnetic underlayer film.

73. A process for manufacturing the perpendicular magnetic recording medium as set forth in claim 63 comprising the steps of sputter forming said Cr film on said substrate under a gas pressure of 18 mTorr or less, forming said soft magnetic underlayer film on said Cr film, and then forming said perpendicular magnetizing film on said soft magnetic underlayer film.

74. A process for manufacturing the perpendicular magnetic recording medium as set forth in claim 64 comprising the steps of sputter forming said Cr film on said substrate under a gas pressure of 18 mTorr or less, forming said soft magnetic underlayer film on said Cr film, and then forming said perpendicular magnetizing film on said soft magnetic underlayer film.

75. A process for manufacturing the perpendicular magnetic recording medium as set forth in claim 65 comprising the steps of sputter forming said Cr film on said substrate at a film formation speed of less than 20 nm/s, forming said soft magnetic underlayer film on said Cr film, and then forming said perpendicular magnetizing film on said soft magnetic underlayer film.

76. A process for manufacturing the perpendicular magnetic recording medium as set forth in claim 66 comprising the steps of sputter forming said Cr film on said substrate at a film formation speed of less than 20 nm/s, forming said soft magnetic underlayer film on said Cr film, and then forming said perpendicular magnetizing film on said soft magnetic underlayer film.

77. A process for manufacturing the perpendicular magnetic recording medium as set forth in claim 67 comprising the steps of sputter forming said Cr film on said substrate at a film formation speed of 18 nm/s or less, forming said soft magnetic underlayer film on said Cr film, and then forming said perpendicular magnetizing film on said soft magnetic underlayer film.

78. A process for manufacturing the perpendicular magnetic recording medium as set forth in claim 68 comprising the steps of sputter forming said Cr film on said substrate at a film formation speed of 18 nm/s or less, forming said soft magnetic underlayer film on said Cr film, and then forming said perpendicular magnetizing film on said soft magnetic underlayer film.

79. The process for manufacturing the perpendicular magnetic recording medium as set forth in claim 71, wherein argon is the gas used for said sputter film formation.

80. The process for manufacturing the perpendicular magnetic recording medium as set forth in claim 72, wherein argon is the gas used for said sputter film formation.

* * * * *